United States Patent
Eguchi

(10) Patent No.: US 8,638,506 B2
(45) Date of Patent: Jan. 28, 2014

(54) PHOTOGRAPHIC OPTICAL SYSTEM AND IMAGE PICKUP APPARATUS EQUIPPED WITH THE SAME

(75) Inventor: Kaoru Eguchi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/550,267

(22) Filed: Jul. 16, 2012

(65) Prior Publication Data
US 2013/0021513 A1 Jan. 24, 2013

(30) Foreign Application Priority Data
Jul. 21, 2011 (JP) .................................. 2011-159788

(51) Int. Cl.
*G02B 9/12* (2006.01)
(52) U.S. Cl.
USPC .......................................... 359/784; 359/737
(58) Field of Classification Search
CPC .................. G02B 9/12–9/56; G02B 9/60–9/64
USPC .......... 359/726–736, 737, 754–758, 763–766, 359/771–775, 784, 785
See application file for complete search history.

(56) References Cited

U.S. PATENT DOCUMENTS

2011/0299179 A1* 12/2011 Maetaki ........................ 359/754

FOREIGN PATENT DOCUMENTS

| JP | 8-327897 A | 12/1996 |
| JP | 9-145996 A | 6/1997 |
| JP | 2009-271354 A | 11/2009 |

* cited by examiner

*Primary Examiner* — Darryl J Collins
(74) *Attorney, Agent, or Firm* — Canon USA Inc IP Division

(57) ABSTRACT

A photographic optical system includes, in order from an object side to an image side, a first lens unit having positive refractive power, a second lens unit having negative refractive power configured to move in an optical axis direction to perform focusing, and a third lens unit having positive or negative refractive power, wherein the position of an optical element (A) satisfies a predetermined condition.

16 Claims, 32 Drawing Sheets

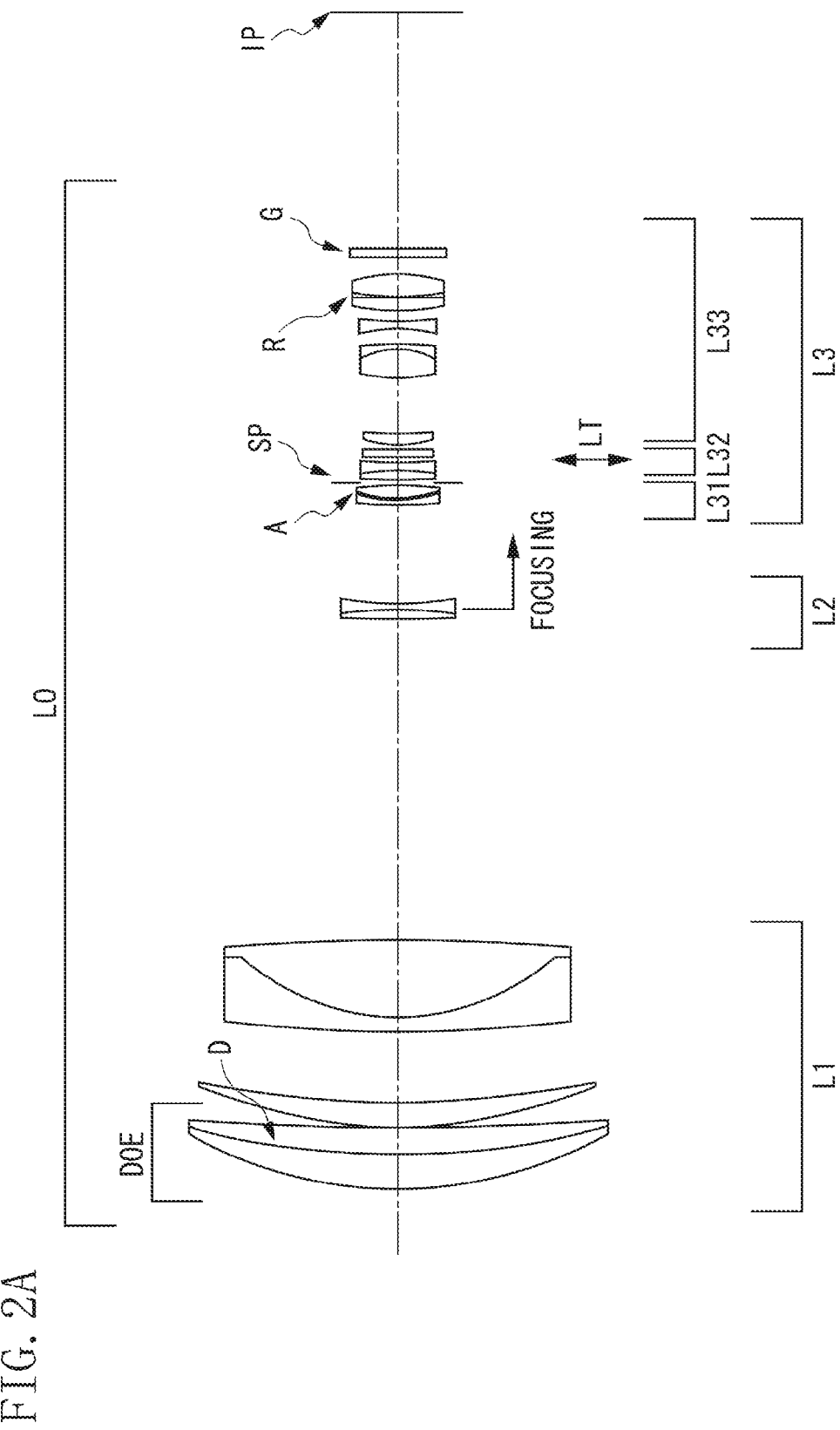

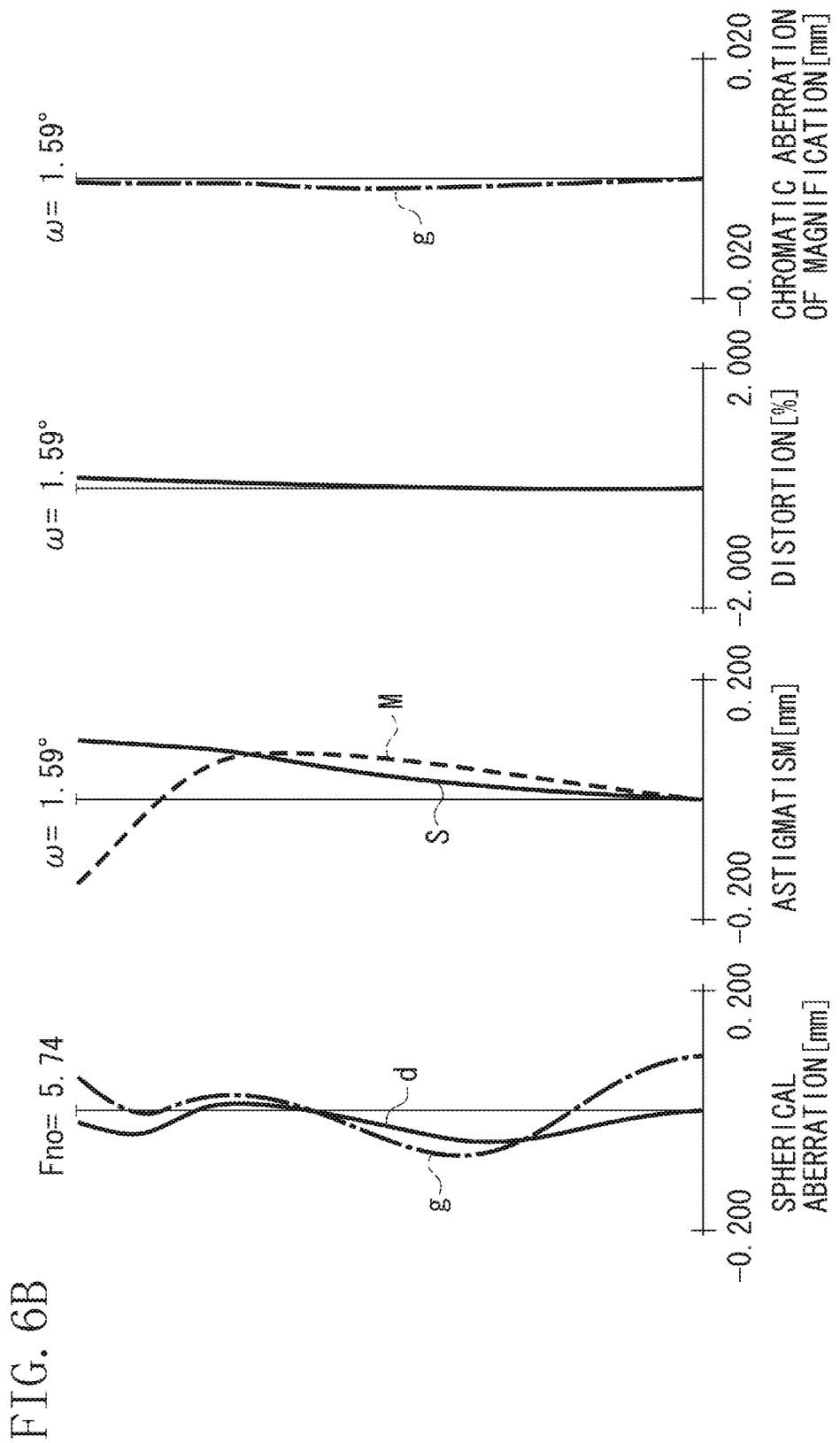

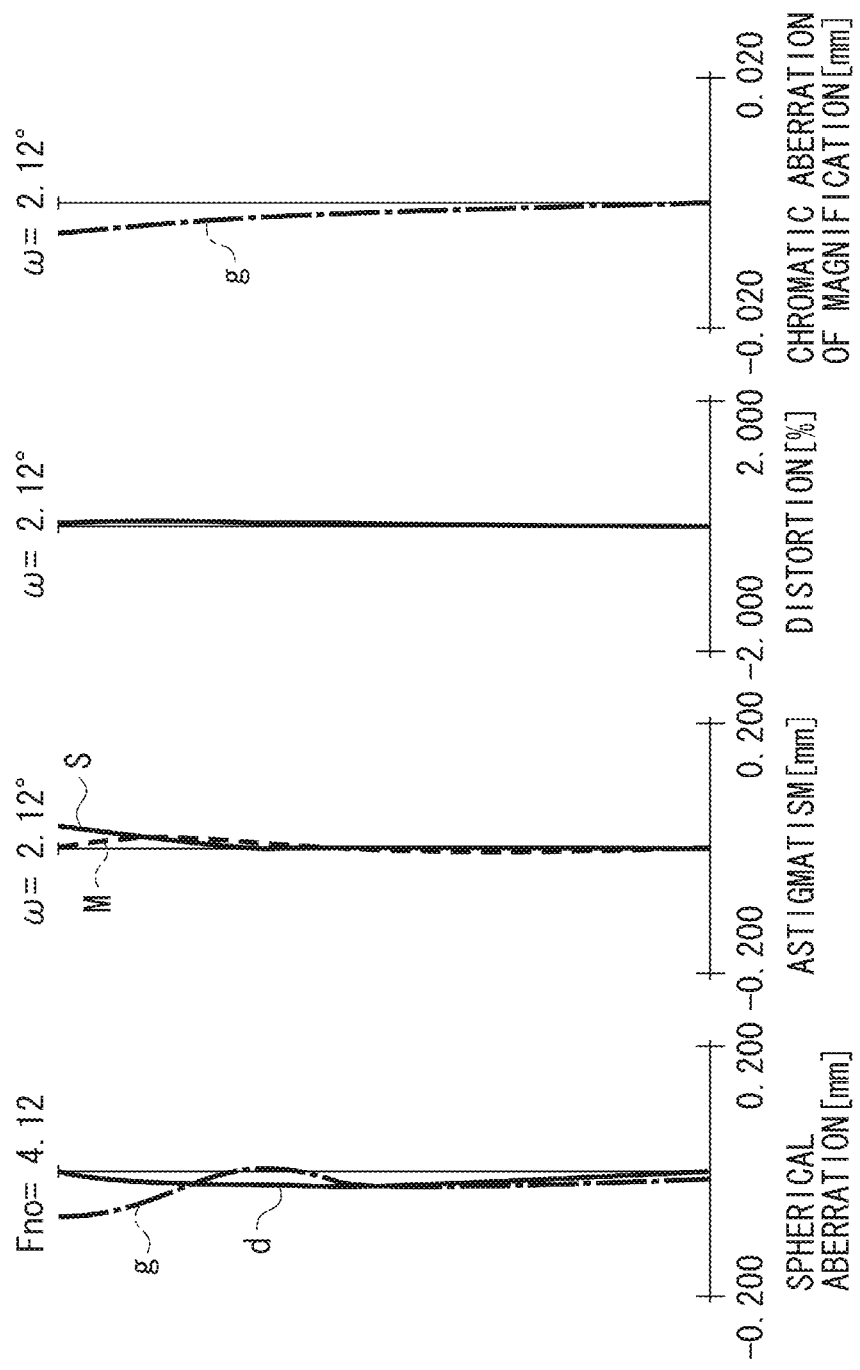

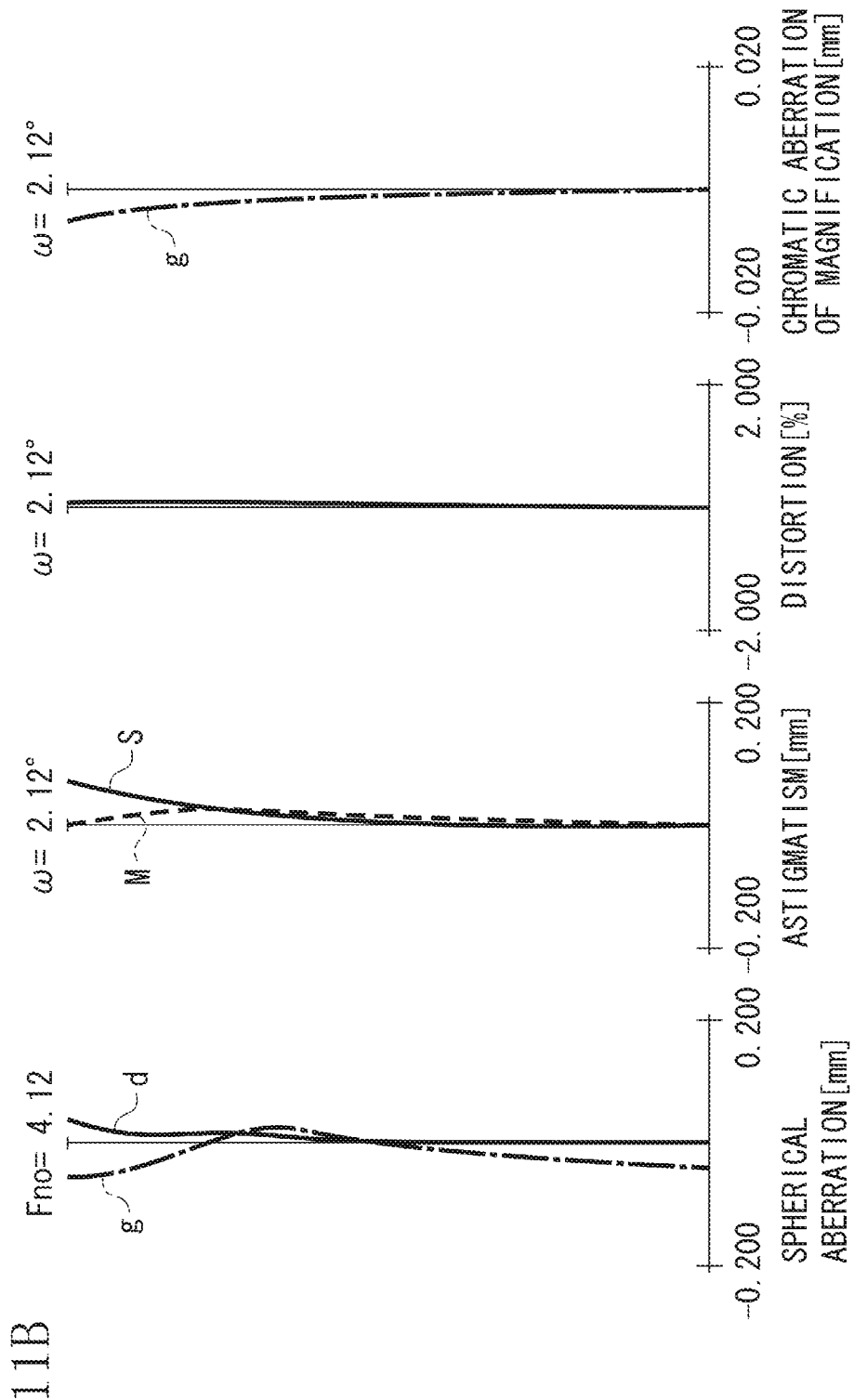

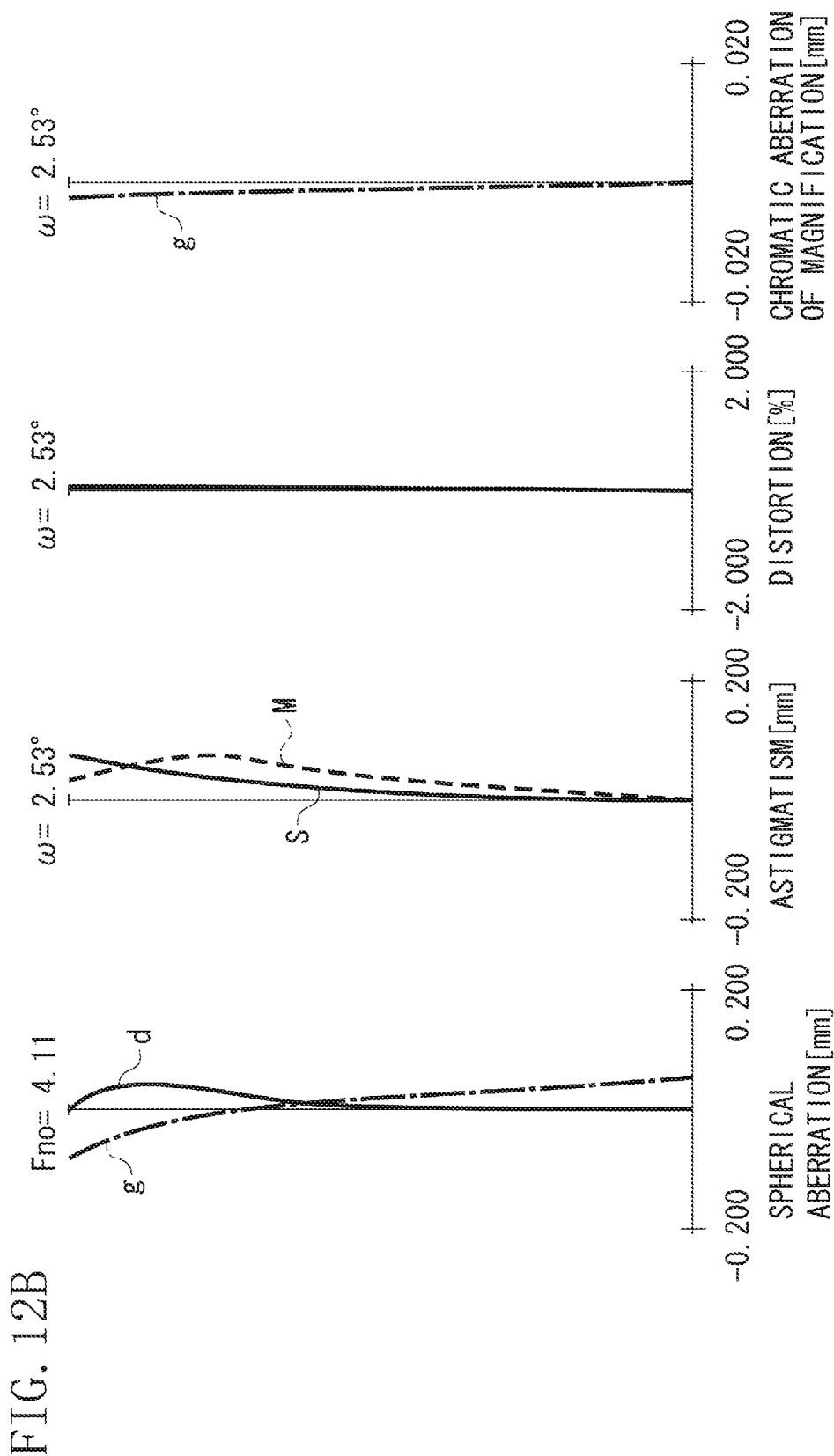

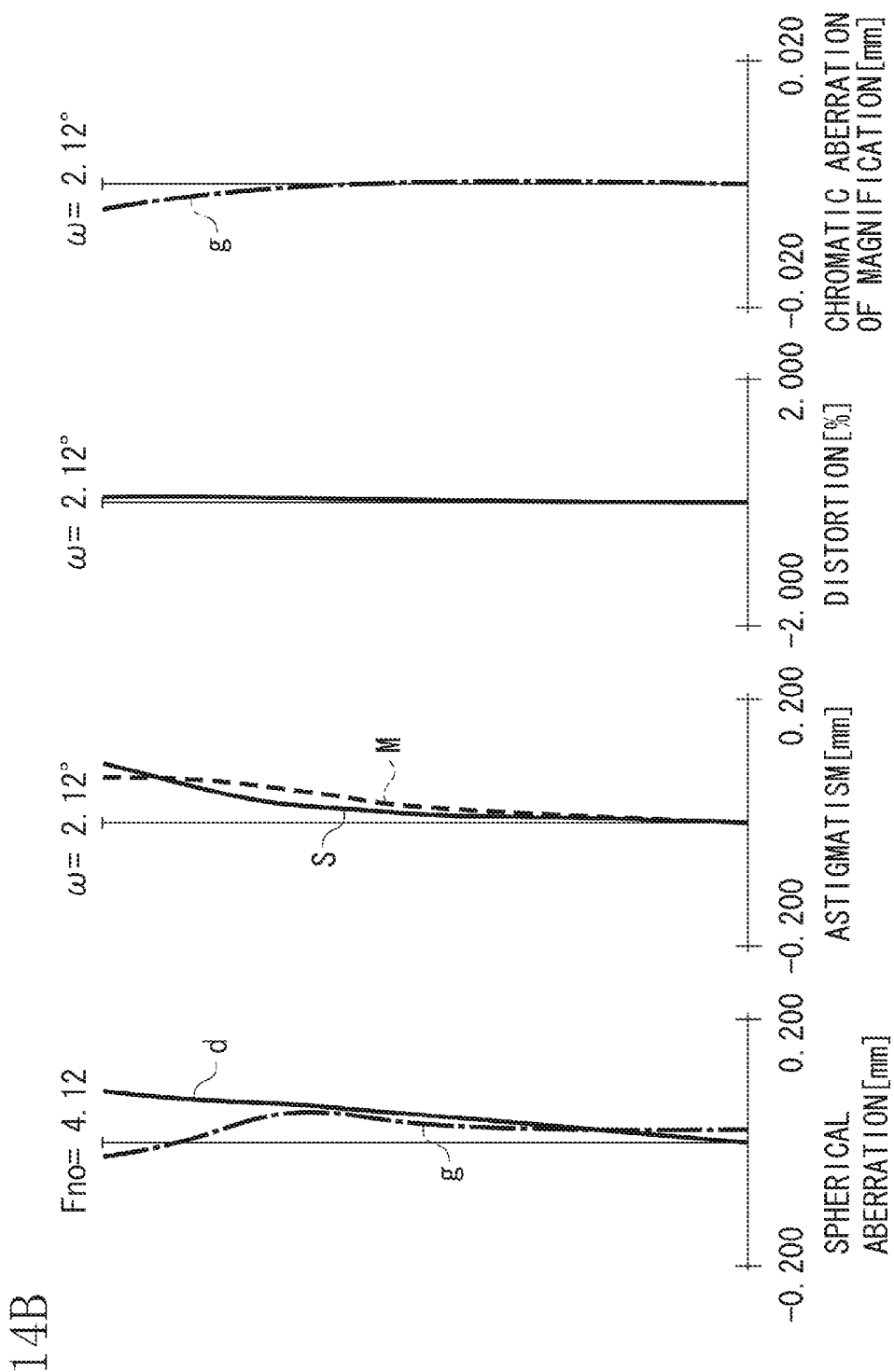

PHOTOGRAPHIC OPTICAL SYSTEM AND IMAGE PICKUP APPARATUS EQUIPPED WITH THE SAME

BACKGROUND OF THE INVENTION

1. Field of the Invention

The present invention relates to a photographic optical system and an image pickup apparatus equipped with the photographic optical system, and is suitable for, for example, video cameras, digital still cameras, TV cameras, monitoring cameras, and silver-halide film cameras which use solid-state image sensors.

2. Description of the Related Art

As a photographic optical system for a long focal length, a telephoto type photographic optical system including a front lens unit having positive refractive power and a rear lens unit having negative refractive power in order from an object side to an image side is known. Here, a long focal length refers to a focal length long, for example, as compared with the size of an effective imaging range. In general, in a telephoto lens having a long focal length, as the focal length extends, chromatic aberrations such as, particularly, axial chromatic aberration and chromatic aberration of magnification occur among various aberrations.

Japanese Patent Application Laid-Open No. 9-145996 discusses a telephoto lens where aberration is corrected (removed) by combining a positive lens using a low-dispersion material, such as fluorite or a product named S-FPL51 (a product of OHARA INC.), which has anomalous partial dispersion, with a negative lens using a high-dispersion material. The telephoto lens has a focal length of 294 mm to 392 mm and an F-number of approximately 4.08 to 5.6.

In a telephoto lens having a small F-number, as the F-number decreases, spherical aberration and coma occur frequently in particular among various aberrations. Thus, Japanese Patent Application Laid-Open No. 8-327897 discusses a telephoto lens which increases a degree of freedom of aberration correction by increasing the number of lens elements, to correct spherical aberration or coma in a telephoto lens having a small F-number. The telephoto lens has a large relative aperture and has a focal length of 294 mm to 588 mm and an F-number of approximately 2.88 to 4.08.

Meanwhile, as a method of lightening a weight of a lens while correcting various aberrations including chromatic aberration of an optical system, a method of using a diffractive optical element where a diffractive optical unit having a diffraction function is mounted on a substrate, on a lens surface or a portion of an optical system is known. Japanese Patent Application Laid-Open No. 2009-271354 discusses an optical system where an overall lens weight is lightened by shortening an entire lens length while correcting chromatic aberration or forming a lens made of a glass material whose specific gravity is relatively low through the method. The optical system is a telephoto lens of a large relative aperture having a focal length of 293 mm to 391 mm and an F-number of approximately 2.9 to 4.1. The optical system corrects aberration of a mono color with an aspheric surface by an optical power of a first lens unit increased by shortening an entire lens length and corrects chromatic aberration with the diffractive optical element. Accordingly, correction of various aberrations and small-scale size and light weight of the system are promoted.

In addition, in many photographic lenses (optical systems), focusing from an infinitely distant object to a close object is performed by moving an entire photographic lens or some lens units of a photographic lens. Among them, in the case of a telephoto lens having a long focal length, as the entire lens becomes large-sized and heavy, it is mechanically difficult to perform focusing by moving the entire telephoto lens.

Accordingly, in the related art, there are many telephoto lenses that perform focusing by moving some lens units. Among them, an inner focus type where focusing is performed by moving some central lens units of a relatively small and light optical system other than a front lens unit is used. In Japanese Patent Application Laid-Open No. 9-145996, Japanese Patent Application Laid-Open No. 8-327897, and Japanese Patent Application Laid-Open No. 2009-271354, each of which includes a first lens unit having positive refractive power and a second lens unit having negative refractive power in order from an object side, focusing is performed by moving the second lens unit to an image plane side along the optical axis.

In general, as the focal length of a telephoto lens becomes longer, an entire lens system becomes large-sized. Accordingly, in a telephoto lens, it is important to promote a small size of an entire lens system of a telephoto lens, and appropriately correct chromatic aberration in particular, among various aberrations occurring as the focal length becomes longer. In addition, it is important to perform focusing promptly with a small-sized and light lens unit other than a front lens unit, and by lessening a burden of a driving unit.

In general, as the focal length of a telephoto lens becomes longer, a front lens unit having positive refractive power in particular becomes large-sized and heavy. Accordingly, in a telephoto lens, it is important to appropriately set the configuration of lenses of a front lens unit having positive refractive power to promote a small size and a light weight of an entire photographic optical system, appropriately correct chromatic aberration, and obtain a high optical performance. If the configuration of lenses of the front lens unit is inappropriate, as the entire photographic optical system becomes large-sized and various aberrations increase, it becomes very difficult to obtain a high optical performance.

SUMMARY OF THE INVENTION

According to an aspect of the present invention, a photographic optical system includes, in order from an object side to an image side, a first lens unit having a positive refractive power, a second lens unit having negative refractive power configured to move in an optical axis direction to perform focusing, a third lens unit having positive or negative refractive power, an aperture portion (SP) disposed on the image side as compared with the first lens unit to determine an axial maximum light flux diameter, and an optical element (A) in which at least an object-side surface vertex thereof is located within the range of a distance ($d_{sp-A}$) satisfying the following condition, where the distance ($d_{sp-A}$) is a distance in the optical axis direction from the aperture portion (SP) to the object-side surface vertex of the optical element (A) and a length on an optical axis from an object-side surface vertex of a lens closest to the object side to an image plane is L, $$0.00 < d_{sp-A}/L < 0.12$$

wherein, when a focal length of the entire photographic optical system is f, an optical power of the entire photographic optical system is $\phi$, a focal length of the first lens unit is $f_1$, a full-aperture F-number when an infinitely distant object is focused is Fno, a length on the optical axis from an object-side surface vertex of a lens closest to the object side in the first lens unit to an image-side surface vertex of a lens closest to the image side in the first lens unit is $d_1$, an optical power of the optical element (A) is $\phi_A$, a d-line-based Abbe number of a material constituting the optical element (A) is $\nu_{dA}$, and a partial dispersion ratio difference of the material constituting the optical element (A) is $\Delta\theta_{gFA}$, the following conditions are satisfied:

$$4.0 < f^2/(f_1 \times Fno \times d_1) < 10.0$$

$$-0.10 < \Delta\eta_{gFA} \times \phi_A/(\nu_{dA} \times \phi) < -0.01.$$

Further features and aspects of the present invention will become apparent from the following detailed description of exemplary embodiments with reference to the attached drawings.

BRIEF DESCRIPTION OF THE DRAWING

The accompanying drawings, which are incorporated in and constitute a part of the specification, illustrate exemplary embodiments, features, and aspects of the invention and, together with the description, serve to explain the principles of the invention.

FIGS. 2A and 2B are a lens sectional view and aberration diagrams at an infinite distance of an object of a photographic optical system according to a second exemplary embodiment of the present invention.

FIGS. 6A and 6B are a lens sectional view and aberration diagrams at an infinite distance of an object of a photographic optical system according to a sixth exemplary embodiment of the present invention.

FIGS. 10A and 10B are a lens sectional view and aberration diagrams at an infinite distance of an object of a photographic optical system according to a tenth exemplary embodiment of the present invention.

FIGS. 11A and 11B are a lens sectional view and aberration diagrams at an infinite distance of an object of a photographic optical system according to an eleventh exemplary embodiment of the present invention.

FIGS. 12A and 12B are a lens sectional view and aberration diagrams at an infinite distance of an object of a photographic optical system according to a twelfth exemplary embodiment of the present invention.

FIGS. 14A and 14B are a lens sectional view and aberration diagrams at an infinite distance of an object of a photographic optical system according to a fourteenth exemplary embodiment of the present invention.

DESCRIPTION OF THE EMBODIMENTS

Various exemplary embodiments, features, and aspects of the invention will be described in detail below with reference to the drawings.

Photographic optical systems according to exemplary embodiments of the present invention include a first lens unit having positive refractive power, a second lens unit having negative refractive power configured to move in an optical axis direction to performing focusing, and a third lens unit having positive or negative refractive power, in order from an object side to an image side.

Figure 14A:
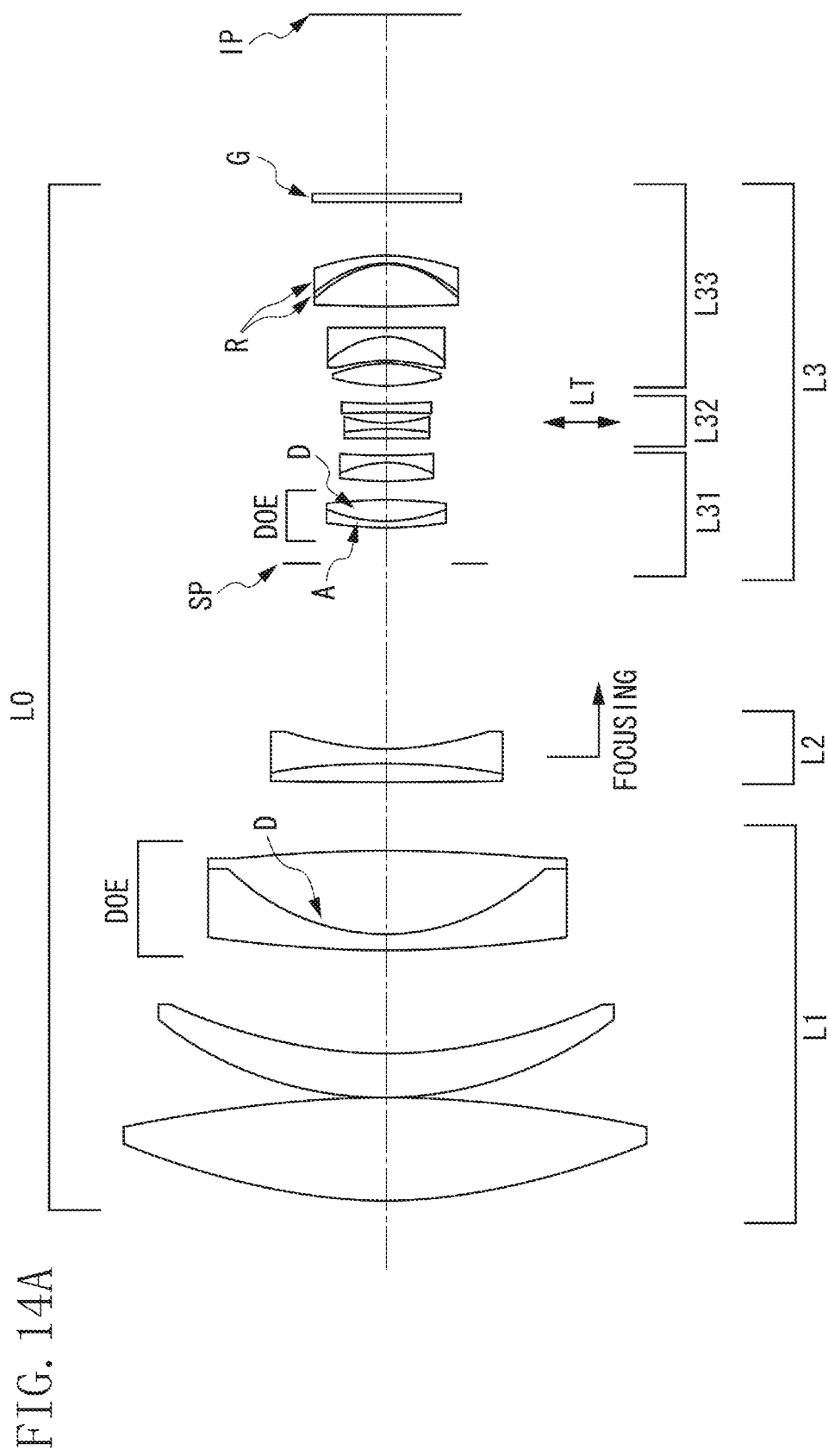
Figure 15:
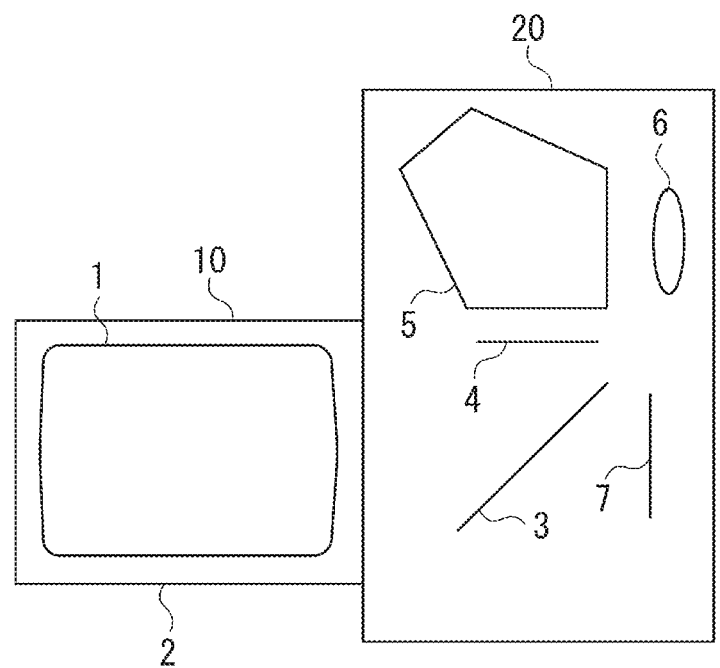
FIG. 15 is an explanatory view of an image pickup apparatus according to an exemplary embodiment of the present invention.

FIGS. 1A to 14A are lens sectional views of the photographic optical systems according to the first to fourteenth exemplary embodiments of the present invention. FIGS. 1B to 14B are longitudinal aberration diagrams of the photographic optical systems according to the first to fourteenth exemplary embodiments of the present invention. FIG. 15 is a schematic view illustrating main portions of a single lens reflex camera system (image pickup apparatus) where a photographic optical system according to an exemplary embodiment of the present invention is mounted on a camera body.

In the lens sectional views, L0 denotes a photographic optical system. SP denotes an aperture portion which determines an axial maximum light flux diameter. The photographic optical system L0 includes a first lens unit L1 having positive refractive power, a second lens unit L2 having negative refractive power, and a third lens unit L3 having positive or negative refractive power.

The third lens unit L3 includes a stationary first lens subunit L31, a second lens subunit L32 configured to move to have a component perpendicular to an optical axis and displace an image perpendicularly to the optical axis direction, and a stationary third lens subunit L33, in order from the object side to the image side.

IP denotes an image plane, and corresponds to an imaging surface of an image sensor (photoelectric conversion element), such as a CCD sensor or a CMOS sensor, which receives an image, in the case of a photographic optical system of a video camera or a digital camera, and a film surface in the case of a photographic optical system of a camera for silver-halide film.

In the aberration diagrams, d and g denote Fraunhofer d line and g line, respectively. M and S denote a meridional image plane and a sagittal image plane, respectively. Chromatic aberration of aberration (lateral chromatic aberration) is expressed with respect to g line. Fno denotes an F-number, and φ denotes a half angle of view. In all the aberration diagrams, when the below-described numerical examples are represented by a unit of mm, it is illustrated that spherical aberration has a scale of 0.2 mm, astigmatism has a scale of 0.2 mm, distortion has a scale of 2%, and chromatic aberration of magnification has a scale of 0.02 mm.

The photographic optical systems L0 of the exemplary embodiments include a telephoto lens, and the configuration having the feature is as follows.

In the exemplary embodiments, at least one lens surface of the first lens unit L1 has an aspheric shape. An aperture portion (aperture stop) SP for determining an axial maximum light flux diameter is disposed on the image side of the first lens unit L1. The photographic optical system L0 further includes at least one optical element A. A distance in the optical axis direction from the aperture portion SP to an object-side surface vertex of the optical element A is $d_{sp-A}$, and a length on an optical axis from an object-side surface vertex of a lens closest to the object side object to an image plane is L. Then, at least one optical element A is located within the range of the distance $d_{sp-A}$ satisfying $$0.00 < d_{sp-A}/L < 0.12 \quad (2).$$

A focal length of the entire photographic optical system is f, an optical power of the entire photographic optical system is φ, a focal length of the first lens unit L1 is $f_1$, and a full-aperture F-number when focusing is performed on an infinitely distant object is Fno. A length on the optical axis from an object-side surface vertex of a lens closest to the object side in the first lens unit L1 to an image-side surface vertex of a lens closest to the image side in the first lens unit L1 is $d_1$. An optical power of the optical element A is $\phi_A$, a d-line-based Abbe number of a material constituting the optical element A is $v_{dA}$, and a partial dispersion ratio difference of the material constituting the optical element A is $\Delta\theta_{gFA}$. Then, the following conditions are satisfied:

$$4.0 < f^2/(f_1 \times Fno \times d_1) < 10.0 \quad (1)$$

$$-0.10 < \Delta\theta_{gFA} \times \phi_A/(v_{dA} \times \phi) < -0.01 \quad (3)$$

The Abbe number $v_{dA}$ and the partial dispersion ratio difference $\Delta\theta_{gFA}$ are defined in the following equations when a refractive index of the material constituting the optical element A at d line is $N_{dA}$, a refractive index of the material at g line is $N_{gA}$, a refractive index of the material at C line is $N_{CA}$, and a refractive index of the material at F line is $N_{FA}$:

$$v_{dA} = (N_{dA} - 1)/(N_{FA} - N_{CA})$$

$$\theta_{gFA} = (N_{gA} - N_{FA})/(N_{FA} - N_{CA})$$

$$\Delta\theta_{gFA} = \theta_{gFA} - (-1.61783 \times 10^{-3} \times v_{dA} + 0.64146)$$

Figure 18:
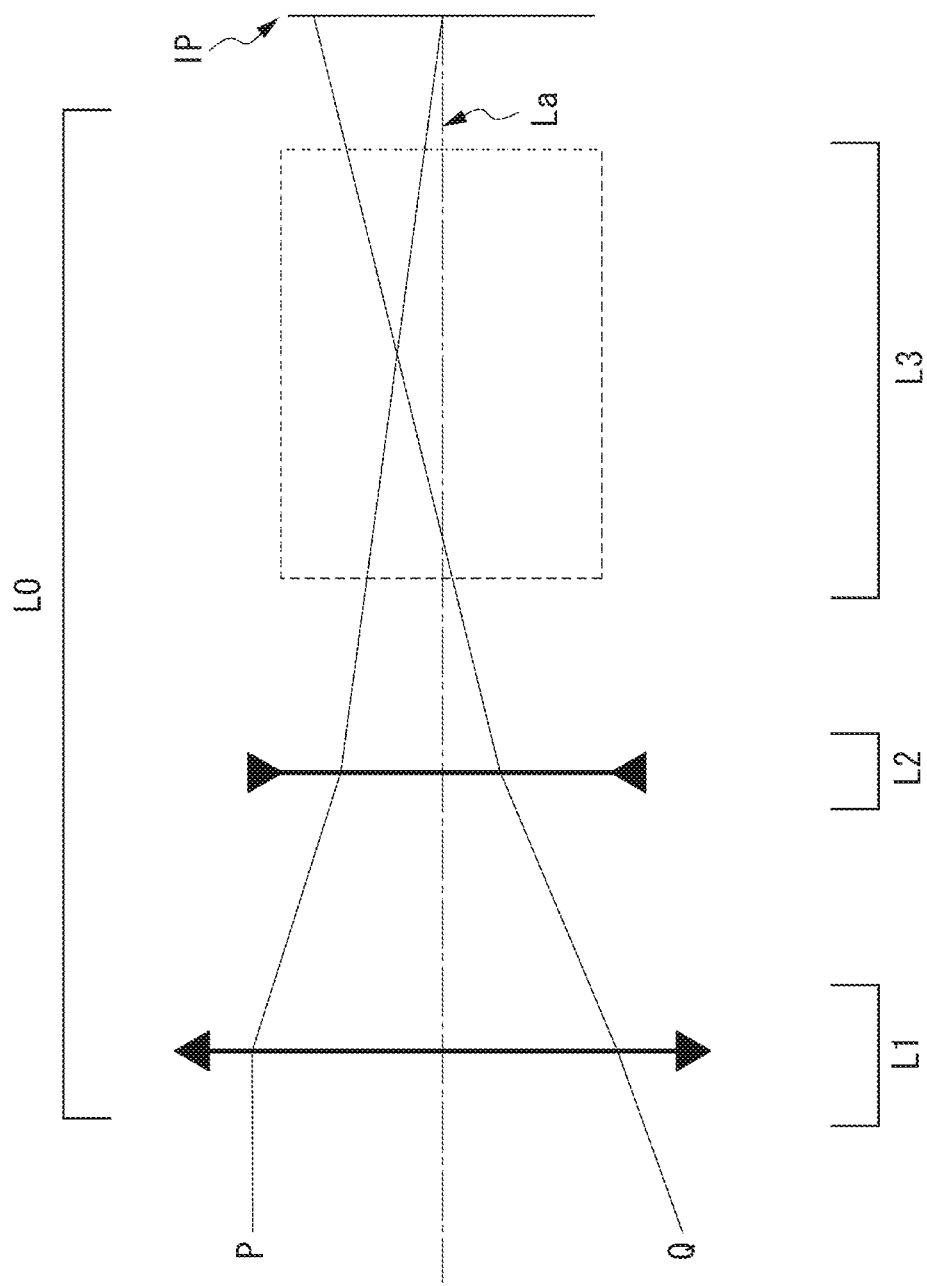
FIG. 18 is a paraxial arrangement diagram for explaining an optical function of a photographic optical system according to an exemplary embodiment of the present invention.

FIG. 18 is a schematic diagram of a paraxial refractive power arrangement of the telephoto lens L0. FIG. 18 illustrates a paraxial refractive power arrangement for explaining an optical function in a reference state (infinitely distant object in-focus state) when assuming rear focusing (inner focusing) in the telephoto lens L0.

In FIG. 18, L1 denotes a first lens unit having positive refractive power, and L2 denotes a second lens unit having negative refractive power, configured to move in the optical axis direction for focusing. L3 denotes a third lens unit having positive or negative refractive power, but details thereof will be omitted in FIG. 18. La denotes an optical axis. IP denotes an image plane. P denotes an axial paraxial ray, and Q denotes a paraxial chief ray.

In general, in a telephoto lens, an incident height of an axial paraxial ray P to a lens is higher than a point SPa where an optical axis La and a paraxial chief ray Q cross each other on the object side and lower than the point SPa on the image side. A telephoto lens takes a configuration of a telephoto type (telescopic type). In this case, if a large aperture diameter (an F-number is small) is effectively achieved, the F-number (full-aperture F-number) is determined as a lens diameter near the object side.

However, then, an effective diameter becomes larger as, among the telephoto lenses, the lens is a lens closer to the object side. In particular, as the F-number becomes smaller, the effective diameter of the lens increases, and thus, the outer diameter of the lens also increases, causing the weight of the lens to increase by approximately cube thereof. Accordingly, as the lens is a telephoto lens having a large relative aperture, the weight of a lens is apt to increase on the object side rather than on the image side. For this reason, it is important to promote a light weight of the entire photographic optical system in a telephoto lens having a large relative aperture.

Thus, to lessen the weight of the entire lens system in this circumstance, it is necessary to shorten the entire lens length (a distance from a first lens surface to an image plane), reduce the number of lenses of a first lens unit, or reduce an effective diameter of a lens, without changing a specification or an image forming performance.

In the exemplary embodiments, the entire length of a lens is shortened to lessen the weight of the entire lens system in this lens type. A method for achieving this includes strengthening an optical power of the first lens unit having positive optical power (refractive power) or making a thickness (length in the optical axis direction) of the first lens unit itself thin. However, generally, spherical aberration or coma of a telephoto lens having a small F-number (F-number 4 to 6) as compared with a focal length increase as compared with a telephoto lens having a large F-number (F-number 8 to 12). Thus, in a telephoto lens according to the related art, aberrations are corrected by increasing the number of lenses of the first lens unit.

Next, a method for shortening the entire length of a lens is considered in a telephoto lens having a small F-number (full-aperture F-number) as compared with a focal length. As in a telephoto lens having a large F-number in the related art, if the entire length of a lens is to be shortened only by strengthening an optical power of the first lens unit, the thickness (central thickness) of a positive lens increases as an effective diameter of the first lens unit is large as compared with a telephoto lens having a large F-number.

Accordingly, as the weight of the first lens unit increases, a telephoto lens having a small F-number cannot show an effect of light weight suitable for shortening the entire length of the lens. In addition, as the number of lenses is large, an air distance for shortening the entire length of a lens is small, and an effect of shortening the length of the entire lens cannot be obtained sufficiently.

Thus, in the exemplary embodiments, the thickness of the first lens unit is made thin by reducing the number of lenses of the first lens unit while disposing at least one aspheric lens surface in the first lens unit and maintaining optical characteristics excellently. Further, the entire lens length is shortened by strengthening an optical power of the first lens unit.

If the entire length of a telephoto lens having a long focal length f and a small F-number Fno (whose ratio of the focal length f to the F-number Fno is large) is shortened, the following problems occur. Here, in the telephoto lens, for example, a focal length f is 600 mm and an F-number Fno is 4.0, or a focal length f is 800 mm and an F-number Fno is 5.6.

If the entire lens length is shortened to more than a degree by making an optical power of the first lens unit strong while correcting chromatic aberration using fluorite or a diffractive optical element in the first lens unit, a correction balance of axial chromatic aberration and chromatic aberration of magnification collapses. For example, if chromatic aberration of magnification is to be corrected sufficiently, axial chromatic aberration is corrected excessively. In particular, axial chromatic aberration between g line and F line cannot be corrected sufficiently.

In the case of an image quality corresponding to a general full high-definition television (the number of pixels 1920× 1080, the size of pixels: μm), some chromatic aberration is allowed. However, considering a high image quality due to an increase in the number of pixels and a reduction in pixel size, it is necessary to sufficiently correct axial chromatic aberration.

Thus, in the exemplary embodiments, the following measures are taken in addition to making the thickness of the first lens unit thin and strengthening an optical power of the first lens unit to shorten the entire lens length. At least one optical element A satisfying Conditions (1) and (3) is disposed near the aperture portion SP disposed at a location satisfying Condition (2) for determining an axial maximum light flux diameter. Accordingly, axial chromatic aberration between g line and F line is corrected.

Next, a mechanism of correcting chromatic aberration at that time will be described. In the telephoto lens L0 illustrated in a model of a paraxial refractive power arrangement of FIG. 18, since the axial paraxial ray P passes a location high from the optical axis La on a lens surface rather than a location SPa where the paraxial chief ray Q crosses the optical axis La on the object side, axial chromatic aberration occurs more frequently than in an image-side lens. Further, since an off-axis principal ray passes a peripheral portion of the lens as it goes from the location SPa where the paraxial chief ray Q crosses the optical axis La to the object side (or the image side), chromatic aberration of magnification occurs frequently.

Accordingly, both axial chromatic aberration and chromatic aberration of magnification can be corrected by disposing a lens formed of a material having anomalous dispersion characteristics or an optical element for chromatic aberration correction such as a diffractive optical element on the object side (in particular, the first lens unit) rather than at the location SPa where the paraxial chief ray Q crosses the optical axis La. With this arrangement, chromatic aberration between C line and F line of axial chromatic aberration and chromatic aberration of magnification and chromatic aberration between g line and F line can be corrected.

Figure 17:
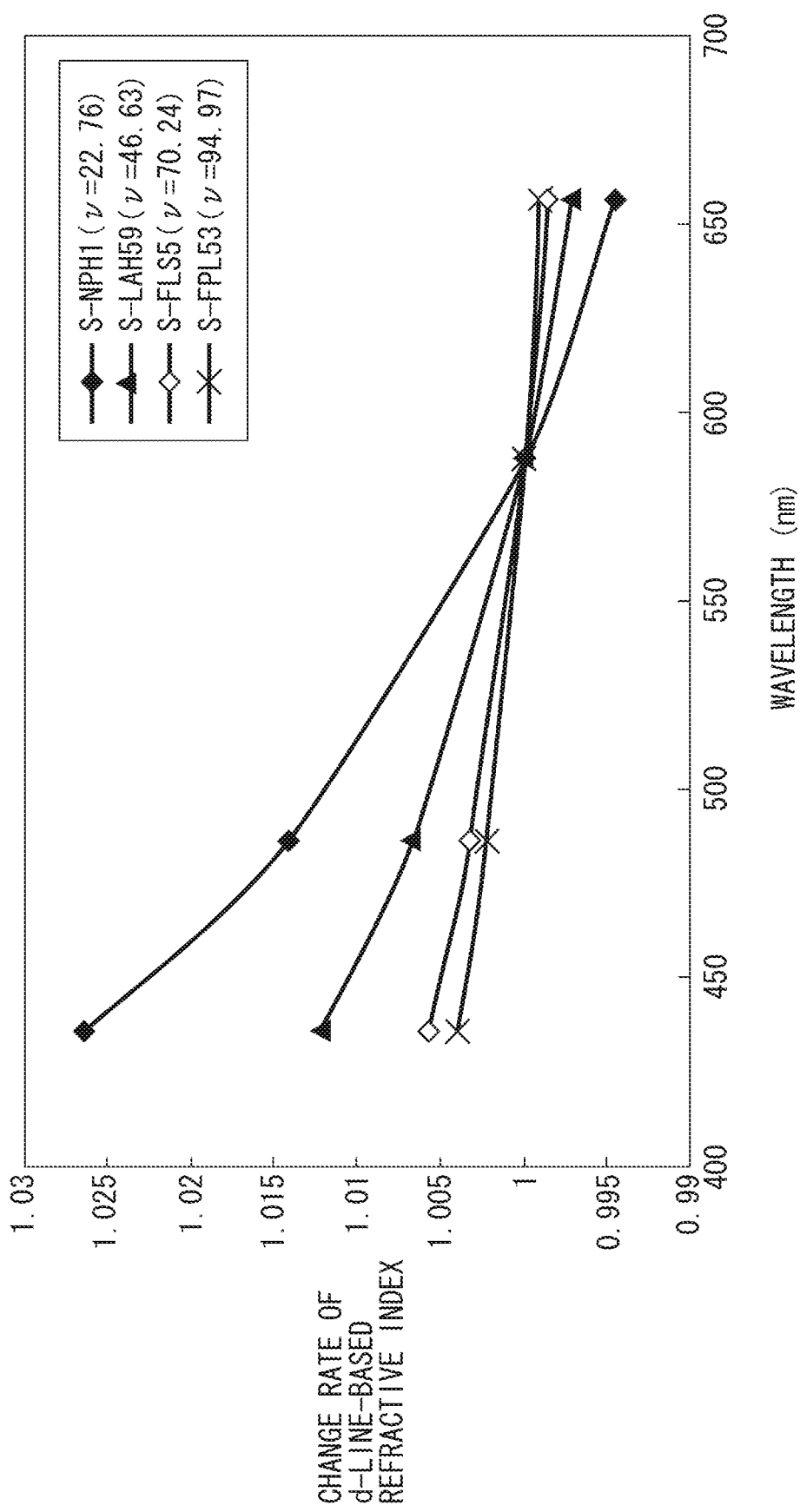
FIG. 17 is a graph representing refractive index changes by wavelengths of a general glass material.

However, if an optical power of the first lens unit is strengthened to shorten the entire lens length, an amount of chromatic aberration between g line and F line particularly increases. This is, as illustrated in FIG. 17, because a refractive index change in a general optical material used in a lens increases in the case of short wavelengths due to a dispersion difference even if the wavelengths are different. In general, a positive lens in the first lens unit is mainly formed of a material having a high anomalous dispersion by correcting chromatic aberrations between C line and F line, and g line and F line of both axial chromatic aberration and chromatic aberration of magnification with a good balance.

Since contributions to corrections of axial chromatic aberration and chromatic aberration of magnification become different if an optical power of the first lens unit is further strengthened, it becomes difficult to correct both axial chromatic aberration and chromatic aberration of magnification of four wavelengths of d, g, C and F only with a glass material or a diffractive optical element disposed in the first lens unit. In particular, if chromatic aberration of magnification is to be corrected sufficiently, axial chromatic aberration between g line and F line is corrected excessively.

This is the reason why a chromatic aberration correction between g line and F line is not sufficient only with a material or a diffractive optical element disposed in the first lens unit if an optical power of the first lens unit is strengthened to shorten the entire lens length.

Thus, at least one optical element A satisfying Conditions (1) and (3) is disposed near the aperture portion SP for determining an axial maximum light flux diameter. Accordingly, chromatic aberration is corrected excellently with the entire photographic optical system by reversely correcting axial chromatic aberration between g line and F line while reducing an influence on chromatic aberration of magnification. In this way, in the exemplary embodiments, the photographic optical systems having a light weight and capable of obtaining an image of high quality are constituted.

In this case, the aperture portion SP is disposed on the image side as compared with the first lens unit. With this configuration, light fluxes around a screen can be sufficiently received without enlarging a lens effective diameter of the first lens unit. In addition, focusing in many photographic optical systems is performed by moving the entire photographic optical system, or moving some lens units of the photographic optical system. Among them, in the case of a telephoto lens having a long focal length and a small F-number (full-aperture F-number), the entire lens system becomes large-sized and has a heavy weight as compared with a telephoto lens having a large F-number. Accordingly, it becomes mechanically difficult to move the entire telephoto lens to perform focusing.

Thus, the photographic optical systems of the exemplary embodiments move the second lens unit L2, which is a small-sized and light lens unit located on the image side as compared with the first lens unit L1, along the optical axis to perform focusing. Accordingly, focusing can be easily performed by a very small driving device as compared with focusing performed by moving the entire photographic system or the entire first lens unit L1.

Further, the first lens unit includes at least one aspheric surface. With this configuration, the number of lenses of the first lens unit is reduced without significantly deteriorating spherical aberration or coma. Further, even when a high optical power is applied to a low-dispersion glass material such as fluorite to correct chromatic aberration, spherical aberration or coma generated from the high optical power can be easily corrected by the aspheric surface.

Further, in the photographic optical systems of the exemplary embodiments, the third lens unit L3 is disposed on the image side as compared with the second lens unit L2. As the third lens unit L3 is disposed on the image side as compared with the second lens unit L2, a lens surface can be disposed at places where an entrance height to a lens of an axial ray is low and an off-axis principal ray passes a high location. Accordingly, correction of curvature of field or chromatic aberration of magnification can be easily performed.

Next, the technical meanings of the above-described conditions will be described. Condition (1) relates to an optical power of the first lens unit L1 of the photographic optical system L0 and a thickness of the first lens unit. If the upper limit of Condition (1) is exceeded, an optical power of the first lens unit L1 becomes too strong or a thickness of the first lens unit L1 becomes too thin. This shortens the entire lens length, but accordingly, it becomes difficult to correct spherical aberration or coma generated in the first lens unit L1 within the first lens unit L1, and spherical aberration and coma cannot be corrected sufficiently in the entire photographic optical system, which is undesirable.

On the other hand, if the lower limit of Condition (1) is exceeded, since an optical power of the first lens unit L1 becomes weak or a thickness of the first lens unit L1 becomes thick, it is difficult to shorten the entire lens length, which is undesirable.

More desirably, Condition (1) may be set as follows.

$$4.5 < f^2/(f_1 \times Fno \times d_1) < 9.0 \tag{1a}$$

More desirably, Condition (1a) may be set as follows.

$$4.95 < f^2/(f_1 \times Fno \times d_1) < 8.00 \tag{1b}$$

Condition (2) relates to an arrangement location of the optical element A satisfying Condition (3), which is disposed in the photographic optical system L0. If the upper limit of Condition (2) is exceeded, the optical element A is disposed far away from the aperture portion SP to be close to the first lens unit L1 or close to the image plane.

First, when the optical element A is disposed close to the first lens unit L1, the optical element A is disposed at a location where an axial paraxial ray passes through a location of a lens surface high from the optical axis, and an off-axis principal ray passes through a peripheral portion of the lens.

If the optical element A is disposed at the above-configured location, both contributions to axial chromatic aberration and chromatic aberration of magnification increase. Then, there is no solution for taking a correction balance of axial chromatic aberration and chromatic aberration of magnification, which is undesirable. Further, when the optical element A is disposed close to the image plane, the optical element A is disposed at a location where an axial paraxial ray passes through a location of a lens surface lower from the optical axis.

Then, since a contribution to correction of axial chromatic aberration becomes smaller, axial chromatic aberration cannot be corrected unless the first lens unit A has a very high optical power. Then, there is no solution for taking a balance between chromatic aberration and a basic aberration (in particular, curvature of field and the like), which is undesirable. Further, the lower limit of Condition (2) is not exceeded. More desirably, Condition (2) may be set as follows.

$$0.00 < d_{sp-A}/L < 0.09 \tag{2a}$$

Condition (3) relates to a correction power of chromatic aberration of the optical element A. If the upper limit (or lower limit) of Condition (3) is exceeded, an absolute value of an optical power of the optical element A becomes too small (or too large), or an absolute value of a partial dispersion ratio difference of the optical element A becomes two small (or too large). Then, a correction balance of axial chromatic aberration cannot be taken, and in particular, axial chromatic aberration between g line and F line cannot be corrected sufficiently, which is undesirable. More desirably, Condition (3) may be set as follows.

$$-0.07 < \Delta\theta_{gFA} \times \phi_A/(v_{dA} \times \phi) < -0.01 \tag{3a}$$

More desirably, Condition (3a) may be set as follows.

$$-0.05 < \Delta\theta_{FA} \times \phi_A/(v_{dA} \times \phi) < -0.01 \tag{3b}$$

Although a photographic optical system aimed by the present invention is achieved by the configuration, it is more desirable that at least one of the following conditions is satisfied, and accordingly an effect of shortening the entire lens length can be improved and a high optical performance can be easily obtained.

The first lens unit L1 desirably includes a positive lens, a positive lens of meniscus shape having a convex surface facing the object side, and a cemented lens in order from the object side to the image side. With the above-configured lens, it becomes easy to converge a ray having entered the first lens unit L1 with the positive lens and the meniscus lens and correct spherical aberration and coma by using a slight difference between curvatures of an object-side surface and an image-side surface of the meniscus lens.

With this configuration, a balance of an optical power and an aberration correction is taken, which is desirable. Further, a sensitivity of a change in an image forming performance due to a manufacturing error of an arrangement location of a lens is increased by increasing an optical power of the first lens unit L1 due to the shortened entire length of the lens. However, since the first lens unit L1 has a cemented lens such that sensitivity can be easily lowered as compared with a case of taking a close arrangement without a cemented lens, the first lens unit L1 can be easily manufactured, which is desirable.

A partial dispersion ratio of a material of the optical element A is $\theta_{gFA}$, and an optical characteristic $A_{\theta1}$ of the material constituting the optical element A is $$A_{\theta1} = \theta_{gFA} - \theta_{gFB1},$$

where $\theta_{gFB1} = -1 \times 10^{-9} \times v_{dA}^4 + 5 \times 10^{-8} \times v_{dA}^3 + 7.5 \times 10^{-5} \times v_{dA}^2 - 7 \times 10^{-3} \times v_{dA} + 0.721$.

An optical characteristic $A_{\theta2}$ of the material constituting the optical element A is $$A_{\theta2} = \theta_{gFA} - \theta_{gFB2},$$

where $\theta_{gFB2} = -1.67 \times 10^{-7} \times v_{dA}^3 + 5.21 \times 10^{-5} \times v_{dA}^2 - 5.66 \times 10^{-3} \times v_{dA} + 0.7278$.

In this case, it is desirable to satisfy one or more of the following conditions.

$$0.0272 < A_{\theta1} < 0.3000 \tag{4}$$

$$-0.5000 < A_{\theta2} < -0.0272 \tag{5}$$

$$5 < v_{dA} < 60 \tag{6}$$

Figure 16:
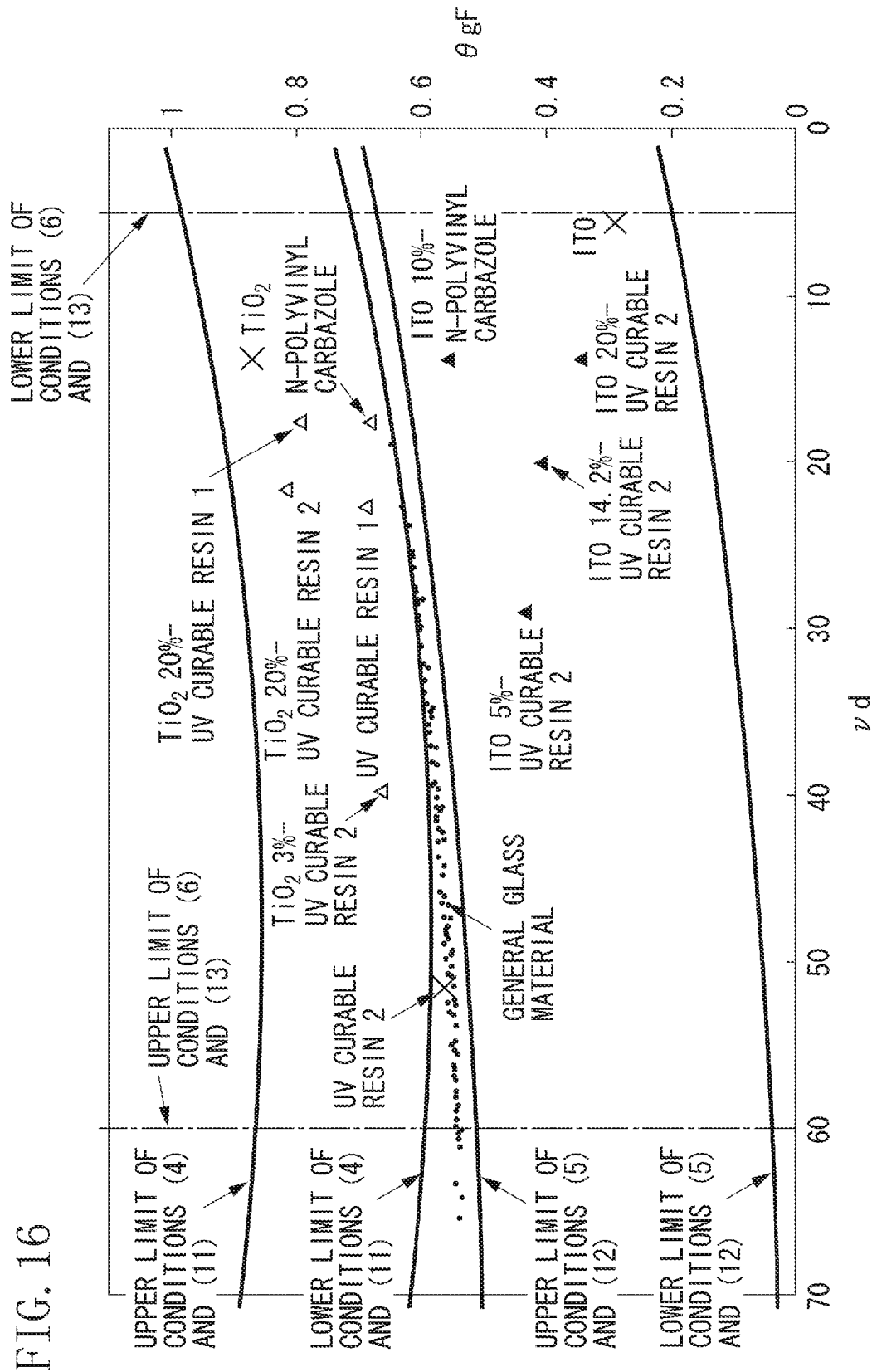
FIG. 16 is a view for explaining ranges of Conditions 4 to 6, and Conditions 11 to 13 according to an exemplary embodiment of the present invention.

FIG. 16 is an explanatory view illustrating ranges of Conditions (4), (5), and (6). Conditions (4) and (5) relate to a partial dispersion ratio $\theta_{gF}$ of the optical element A. If the upper limit of Condition (4) is exceeded, a partial dispersion ratio of the optical element A becomes too high as compared with other general materials. Then, axial chromatic aberration of a short wavelength side particularly is excessively corrected, which is undesirable.

On the other hand, if the lower limit of Condition (4) is exceeded, a partial dispersion ratio of the optical element A becomes small and an anomalous dispersion thereof becomes similar to those of other general materials, which are small in anomalous dispersion. Then, axial chromatic aberration of a short wavelength side particularly is insufficiently corrected, which is undesirable.

More desirably, Condition (4) may be set as follows.

$$0.0320 < A_{\theta1} < 0.2700 \tag{4a}$$

More desirably, Condition (4a) may be set as follows.

$$0.0400 < A_{\theta1} < 0.2500 \tag{4b}$$

More desirably, Condition (4b) may be set as follows.

$$0.0550 < A_{\theta1} < 0.2200 \tag{4c}$$

If the upper limit of Condition (5) is exceeded, a partial dispersion ratio of the optical element A becomes large and an anomalous dispersion thereof becomes similar to those of other general materials, which are small in anomalous dispersion. Then, axial chromatic aberration of a short wavelength side particularly is insufficiently corrected, which is undesirable.

If the lower limit of Condition (5) is exceeded, a partial dispersion ratio of the optical element A becomes too low as compared with other general materials. Then, axial chromatic aberration of a short wavelength side particularly is excessively corrected, which is undesirable.

More desirably, Condition (5) may be set as follows.

$$-0.5000 < A_{\theta 2} < -0.0280 \quad (5a)$$

More desirably, Condition (5a) may be set as follows.

$$-0.4700 < A_{\theta 2} < -0.0290 \quad (5b)$$

More desirably, Condition (5b) may be set as follows.

$$-0.4600 < A_{\theta 2} < -0.0300 \quad (5c)$$

Condition (6) relates to an Abbe number of the material of the optical element A.

If the upper limit of Condition (6) is exceeded, an Abbe number of the material of the optical element A becomes large and the optical element A is in a low dispersion state. Then, if axial chromatic aberration of a short wavelength side is to be corrected, a high optical power is necessary and a balance with chromatic aberration of a long wavelength side cannot be taken, which is undesirable.

If the lower limit of Condition (6) is exceeded, an Abbe number of the optical element A becomes small and the optical element A is in a high dispersion state. Then, since axial chromatic aberration on a short wavelength side particularly can be easily corrected with a weak optical power but a correction direction is reversely applied to chromatic aberration of magnification influenced to a degree, it is difficult to take a balance of axial chromatic aberration and chromatic aberration of magnification, which is undesirable.

More desirably, Condition (6) may be set as follows.

$$5 < v_{dA} < 55 \quad (6a)$$

More desirably, Condition (6a) may be set as follows.

$$7 < v_{dA} < 50 \quad (6b)$$

More desirably, Condition (6b) may be set as follows.

$$10 < v_{dA} < 45 \quad (6c)$$

A detailed example of a material (hereinafter, referred to as 'an optical material') constituting the optical element A satisfying Condition (4) or Condition (6) includes, for example, a resin. Among various resins, a UV curable resin (Nd=1.635, vd=22.7, θgF=0.69) or N-polyvinylcarbazole (Nd=1.696, vd=17.7, θgF=0.69) is an optical material satisfying Condition (4) or (6).

The resin is not limited thereto only if the resin satisfies Condition (4) or Condition (6).

Further, an optical material having a different characteristic from a general glass material includes a mixture where inorganic oxide nano particles (inorganic particles) are dispersed in a synthetic resin (transparent medium). An example of an inorganic oxide includes TiO₂ (Nd=2.304, vd=13.8) and Nb₂O₅ (Nd=2.367, vd=14.0). Further, ITO (Nd=1.8571, vd=5.68), Cr₂O₃ (Nd=2.2178, vd=13.4), BaTiO₃ (Nd=2.4362, vd=11.3), and the like.

Among the inorganic oxides, when TiO₂ (Nd=2.304, vd=13.8, θgF=0.87) particles are dispersed in a synthetic resin at an appropriate volume ratio, an optical material satisfying Condition (4) or (6) can be obtained.

TiO₂ is a material used for various purposes, and is used as a deposition material constituting an optical thin film such as a reflection preventing film in the optical field. TiO₂ particles are used as a cosmetic material as well as a photocatalyst or a white.

Among the inorganic oxides, when ITO particles (Nd=1.8571, vd=5.68, θgF=0.29) are dispersed in a synthetic resin at an appropriate volume ratio, an optical material satisfying Condition (5) or (6) can be obtained.

ITO is generally known as a material constituting a transparent electrode, and is commonly used in a liquid crystal display device, in an electroluminescence (EL) device, and in an infrared ray shielding device and an ultraviolet ray shielding device as well.

In the exemplary embodiments, an average diameter of TiO₂ particles or ITO particles dispersed in a synthetic resin may be 2 nm to 50 nm, considering an influence of scattering, and a dispersing agent may be added to suppress agglomeration.

A synthetic resin material for dispersing TiO₂ or ITO may be a polymer, and can be more efficiently mass-produced through photopolymerization or thermal polymerization by using a forming mold.

For an optical constant characteristic of a synthetic resin, a synthetic resin having a relatively large partial dispersion ratio, a synthetic resin having a relatively small Abbe number, and a synthetic resin satisfying both conditions may be used excellently, and N-polyvinylcarbazole, styrene, polymethylmethacrylate (acryl) and the like may be applied. In the below-described exemplary embodiments, a UV curable resin and N-polyvinylcarbazole are used as a synthetic resin for dispersing TiO₂ particles and ITO particles. However, the synthetic resin is not limited thereto.

A dispersion characteristic N(A) of a mixture where nanoparticles are dispersed can be simply calculated by the following equation induced from the well-known Drude Equation. That is, a refractive index N(A) at a wavelength λ is $$N(\lambda) = [1 + V\{N_M^2(\lambda) - 1\} + (1 - V)\{N_P^2(\lambda) - 1\}]^{1/2} \quad (A).$$

In equation (A), λ is an arbitrary wavelength, $N_M$ is a refractive index of TiO₂ or ITO, $N_P$ is a refractive index of a synthetic resin, V is a proportion of a total volume of TiO₂ particles or ITO particles to a volume of the synthetic resin.

Further, a diffractive optical element may be used as the optical element A. A diffractive optical element can obtain a correction effect of a large chromatic aberration while less influencing aberrations of short wavelength such as spherical aberration or coma. Accordingly, axial chromatic aberration between g line and F line can be easily corrected, which is desirable. In the exemplary embodiments, the optical element A may be a diffractive optical element.

In an indefinitely distant object in-focus state, a composite focal length of the first lens unit L1 and the second lens unit L2 is $f_{12}$. A sum of optical powers of positive lenses of the first lens unit L1 is $\lambda_{PSUM}$, and a sum of optical powers of negative lenses thereof is $\phi_{NSUM}$. The first lens unit L1 desirably includes a positive lens, a positive lens of meniscus shape having a convex surface facing the object side, and a cemented lens in order from the object side to the image side. A radius of curvature of an object-side surface of the meniscus shape positive lens is RM1, a radius of curvature of an image-side surface thereof is RM2, and an Abbe number of a material of the meniscus shape positive lens is $v_m$.

A partial dispersion ratio difference of a material of an i-th lens Gi when counted from the object side disposed in the first lens unit L1 and the second lens unit L2 is $\Delta\theta_{gFGi}$, an Abbe number thereof is $v_{dGi}$, and an optical power thereof is $\phi_{Gi}$. A length on the optical axis from an object-side surface vertex of a lens closest to the object to the aperture portion SP is $d_{-sp}$, In this case, it is desirable to satisfy one or more of the following conditions.

$$2.0 < f^2/(f_{12} \times L) < 10.0 \tag{7}$$

$$1.4 < \phi_{PSUM}/|\phi_{NSUM}| < 3.0 \tag{8}$$

$$0.1 < (RM2-RM1)/(RM1+RM2) < 0.5 \tag{14}$$

$$15 < \nu_M < 30 \tag{15}$$

$$0.005 < \sum_{i=1}^{n} \frac{\Delta\theta_{gFGi} \times \varphi_{Gi}}{\nu_{dGi} \times \varphi} < 0.020 \tag{16}$$

$$4.0 < f^2/(d_{-sp} \times L) < 8.0 \tag{17}$$

Here, $\Sigma$ denotes a sum, and n denotes the number of lenses. In $\nu_{dGi}$ and $\Delta\theta_{gFGi}$, a refractive index of d-line of a material constituting the lenses from the first lens unit L1 to the second lens unit L2 is $N_{dGi}$, a refractive index of line g thereof is $N_{gGi}$, a refractive index of line C thereof is $N_{cGi}$, and a refractive index of line F thereof is $N_{FGi}$. In this case, the optical constants are defined by the following equations.

$$\nu_{dGi} = (N_{dGi}-1)/(N_{FGi}-N_{CGi})$$

$$\theta_{gFGi} = (N_{gGi}-N_{FGi})/(N_{FGi}-N_{CGi})$$

$$\Delta\theta_{gFGi} = \theta_{gFGi} - (-1.61783 \times 10^{-3} \times \nu_{dGi} + 0.64146)$$

Condition (7) relates to a composite focal length of the first lens unit L1 and the second lens unit L2.

If the upper limit of Condition (7) is exceeded, since a composite optical power of the first lens unit L1 and the second lens unit L2 becomes two large, the entire lens length can be shortened. However, spherical aberration and coma generated in the first lens unit L1 and the second lens unit L2 increase, and the aberrations are left in the entire photographic optical system, which is undesirable. Further, if the lower limit of Condition (7) is exceeded, since a composite optical power of the first lens unit L1 and the second lens unit L2 becomes too small, it is difficult to obtain an effect of shortening the entire lens length, which is undesirable.

More desirably, Condition (7) may be set as follows.

$$2.2 < f^2/(f_{12} \times L) < 8.0 \tag{7a}$$

More desirably, Condition (7a) may be set as follows.

$$2.3 < f^2/(f_{12} \times L) < 7.0 \tag{7b}$$

Condition (8) relates to an optical power ratio of a positive lens and a negative lens of the first lens unit L1. If the upper limit of Condition (8) is exceeded, an optical power of a positive lens becomes too high as compared with an optical power of a negative lens of the first lens unit L1. Then, it becomes difficult to cancel various aberrations including chromatic aberrations generated in the positive lens with the negative lens, and in particular, both axial chromatic aberration and chromatic aberration of magnification between line C and line F are left, which is undesirable.

If the lower limit of Condition (8) is exceeded, an optical power of a positive lens becomes too low as compared with an optical power of a negative lens of the first lens unit L1. Then, a thickness of the lens unit of the first lens unit L1 becomes large, and an effect of shortening the entire lens length becomes weak, which is undesirable.

More desirably, Condition (8) may be set as follows.

$$1.4 < \phi_{PSUM}/|\phi_{NSUM}| < 2.7 \tag{8a}$$

More desirably, Condition (8a) may be set as follows.

$$1.4 < \phi_{PSUM}/|\phi_{NSUM}| < 2.4 \tag{8b}$$

More desirably, Condition (8b) may be set as follows.

$$1.4 < \phi_{PSUM}/|\phi_{NSUM}| < 2.1 \tag{8c}$$

Condition (14) relates to a lens shape of a meniscus shape positive lens of the first lens unit L1.

If the upper limit of Condition (14) is exceeded, a difference between radii of curvature of an object-side surface and an image-side surface of the positive lens of meniscus shape becomes too large. Then, since the optical power becomes high, a positive optical power can be easily distributed, whereas since an angle difference between entering light and exiting light to and from the lens becomes large, it becomes difficult to finely correct aberration, leaving spherical aberration and coma.

If the lower limit of Condition (14) is exceeded, a difference between radii of curvature of an object-side surface and an image-side surface of the meniscus shape positive lens becomes too small, and an effect of correcting aberration becomes weak, which is undesirable.

More desirably, Condition (14) may be set as follows.

$$0.11 < (RM2-RM1)/(RM1+RM2) < 0.4 \tag{14a}$$

Condition (15) relates to an Abbe number of a material of a meniscus shape positive lens of the first lens unit L1. If the upper limit of Condition (15) is exceeded, the meniscus shape positive lens is in a low-dispersion state. Then, axial chromatic aberration between line C and line F particularly is corrected excessively, and cannot be corrected sufficiently with a balance with chromatic aberration of magnification, which is undesirable.

Further, if the lower limit of Condition (15) is exceeded, the meniscus shape positive lens is in a too high dispersion state. Then, axial chromatic aberration between line g and line F is corrected excessively, and axial chromatic aberration between line C and line F is corrected insufficiently, which is undesirable.

More desirably, Condition (15) may be set as follows.

$$17 < \nu_M < 30 \tag{15a}$$

More desirably, Condition (15a) may be set as follows.

$$23 < \nu_M < 30 \tag{15b}$$

Condition (16) relates to a chromatic aberration correcting power of an i-th lens Gi when counted from the object side disposed in the first lens unit L1 and the second lens unit L2.

In the lenses of the first lens unit L1 and the second lens unit L2, an axial paraxial ray passes a location high from the optical axis and an off-axis principal ray passes a peripheral portion of the lens. Since contributions to both axial chromatic aberration and chromatic aberration of magnification are high in correction of aberrations in the location, the lenses in the lens units are desirably constituted by a material having a high chromatic aberration correction power and an appropriate optical power.

However, if a chromatic aberration correction power increases extremely, chromatic aberrations are left in the entire photographic optical system, and thus it is desirable to control the chromatic aberration correction force within an appropriate range. If the upper limit or the lower limit of Condition (16) is exceeded, a balance of both axial chromatic aberration and chromatic aberration of magnification between g line and F line and both axial chromatic aberration and chromatic aberration of magnification between C line and F line cannot be taken, and thus chromatic aberration is left in the entire photographic optical system, which is undesirable.

More desirably, Condition (16) may be set as follows.

$$0.006 < \sum_{i=1}^{n} \frac{\Delta\theta_{gFGi} \times \varphi_{Gi}}{v_{dGi} \times \varphi} < 0.016 \quad (16a)$$

More desirably, Condition (16a) may be set as follows.

$$0.007 < \sum_{i=1}^{n} \frac{\Delta\theta_{gFGi} \times \varphi_{Gi}}{v_{dGi} \times \varphi} < 0.014 \quad (16b)$$

Condition (17) relates to a location of the aperture portion SP. If the upper limit (or the lower limit) of Condition (17) is exceeded, the aperture portion SP becomes too close to the object side (or the image side). Then, since a lens effective diameter of the first lens unit L1 becomes large if an off-axis light flux is to be received, the weight of the first lens unit L1 increases, which is undesirable.

Further, the aperture portion SP may be an aperture stop which can mechanically change an aperture diameter. More desirably, Condition (17) may be set as follows.

$$4.5 < f^2/(d_{-sp} \times L) < 7.5 \quad (17a)$$

More desirably, Condition (17a) may be set as follows.

$$5.0 < f^2/(d_{-sp} \times L) < 7.0 \quad (17b)$$

The photographic optical system further includes an optical element R. A distance from the aperture portion SP to an object-side surface vertex of the optical element R in the optical axis direction is $d_{sp-R}$ and a length on the optical axis from the aperture portion SP to the image plane is $d_{sp-img}$. Then, at least one optical element R in which at least an object-side surface vertex thereof is located within the range of the distance $d_{sp-R}$ satisfying $$0.30 < d_{sp-R}/d_{sp-img} < 1.00.$$

An optical power of the optical element R is $\phi_R$, a d-line-based Abbe number of a material constituting the optical element R is $v_{dR}$, and a partial dispersion ratio difference of the material constituting the optical element R is $\Delta\theta_{gFR}$. When a plurality of optical elements A is provided, an optical power of an i-th optical element Ai when counted from the object side is $\phi_{Ai}$, an Abbe number of a material thereof is $v_{dAi}$, and a partial dispersion ratio difference thereof is $\Delta\theta_{gFAi}$. When a plurality of optical elements R is provided, an optical power of a k-th optical element Rk when counted from the object side is $\phi_{Rk}$, an Abbe number of a material thereof is $v_{dRk}$, and a partial dispersion ratio difference thereof is $\Delta\theta_{gFRk}$.

A partial dispersion ratio of the optical element R is $\theta_{gFR}$ and an optical characteristic $R_{\theta 1}$ of a material constituting the optical element R is $$R_{\theta 1} = \theta_{gFR} - \theta_{gFBR1},$$

where $\theta_{gFBR1} = -1 \times 10^{-9} \times v_{dR}^4 + 5 \times 10^{-8} \times v_{dR}^3 + 7.5 \times 10^{-5} \times v_{dR}^2 - 7 \times 10^{-3} \times v_{dR} + 0.721$.

An optical characteristic $R_{\theta 2}$ of a material constituting the optical element R is $$R_{\theta 2} = \theta_{gFR} - \theta_{gFBR2},$$

where $\theta_{gFBR2} = -1.67 \times 10^{-7} \times v_{dR}^3 + 5.21 \times 10^{-5} \times v_{dR}^2 - 5.66 \times 10^{-3} \times v_{dR} + 0.7278$.

In this case, it is desirable to satisfy one or more of the following conditions.

$$1.0 \times 10^{-5} < \sum_{i=1}^{n} \frac{\Delta\theta_{gFAi} \times \varphi_{Ai}}{v_{dAi} \times \varphi} \times \sum_{k=1}^{m} \frac{\Delta\theta_{gFRk} \times \varphi_{Rk}}{v_{dRk} \times \varphi} < 1.0 \times 10^{-3} \quad (10)$$

$$0.0272 < R_{\theta 1} < 0.3000 \quad (11)$$

$$-0.5000 < R_{\theta 2} < -0.0272 \quad (12)$$

$$5 < v_{dR} < 60 \quad (13)$$

Here, Σ denotes a sum, n and m denote the numbers of optical elements A and optical elements R, and i and k denote numbers given in order from the object side when a plurality of optical elements A or a plurality of optical elements R is provided. It means that when a plurality of optical elements A or a plurality of optical elements R is provided, a sum thereof is taken and multiplied.

Further, $v_{dRk}$ and $\Delta\theta_{gFRk}$ are defined by the following equations when a refractive index in d line of the optical element R is $N_{dRk}$, a refractive index in g line of an optical element R is $N_{gRk}$, a refractive index in C line of the optical element R is $N_{CRk}$, and a refractive index in F line of the optical element R is $N_{FRk}$.

$$v_{dRk} = (N_{dRk} - 1)/(N_{FRk} - N_{CRk})$$

$$\theta_{gFRk} = (N_{gRk} - N_{FRk})/(N_{FRk} - N_{CRk})$$

$$\Delta\theta_{gFRk} = \theta_{gFRk} - (-1.61783 \times 10^{-3} \times v_{dRk} + 0.64146)$$

If the optical element R satisfying Conditions (9) to (12) is disposed at a location on the image side rather than the aperture portion SP and far away from the aperture portion SP in the optical axis direction, chromatic aberration of magnification can be corrected without influencing axial chromatic aberration greatly, and thus it is desirable for a progressed improvement of an image forming performance.

First, it is desirable that the optical element R is disposed at a location within the range satisfying Condition (9). As an arrangement location of the optical element R is far away from the aperture portion SP, an off-axis principal ray passes through a further peripheral portion of a lens, and thus it becomes easy to correct chromatic aberration of magnification with low optical power. Accordingly, it becomes easy to correct chromatic aberration of magnification while minimally restraining an influence on monochromatic aberration.

Since the upper limit of Condition (9) corresponds to the image plane, there is no possibility of exceeding the upper limit. On the other hand, if the lower limit of Condition (9) is exceeded, a location of the optical element R becomes close to the aperture portion SP, and is a location where an off-axis principal ray passes through a vicinity of a central portion of the lens. In this location, if chromatic aberration of magnification is to be corrected, a strong optical power is necessary, which influences monochromatic aberration. Then, it becomes difficult to take a balance of chromatic aberration of magnification and monochromatic aberration, which is undesirable.

More desirably, Condition (9) may be set as follows.

$$0.35 < d_{sp-R}/d_{sp-img} < 0.900 \quad (9a)$$

More desirably, Condition (9a) may be set as follows.

$$0.40 < d_{sp-R}/d_{sp-img} < 0.900 \quad (9b)$$

Condition (10) relates to an optical power balance of the optical element A and the optical element R.

If the upper limit or the lower limit of Condition (10) is exceeded, it becomes difficult to take a balance of axial chromatic aberration and chromatic aberration of magnification between g line and F line and some aberrations are left, which is undesirable.

More desirably, Condition (10) may be set as follows.

$$5.0 \times 10^{-5} < \sum_{i=1}^{n} \frac{\Delta \theta_{gFAi} \times \varphi_{Ai}}{v_{dAi} \times \varphi} \times \sum_{k=1}^{m} \frac{\Delta \theta_{gFRk} \times \varphi_{Rk}}{v_{dRk} \times \varphi} < 6.0 \times 10^{-4} \quad (10a)$$

FIG. 16 is an explanatory view illustrating ranges of Conditions (11), (12), and (13). Conditions (11) and (12) relate to a partial dispersion ratio of a material of the optical element R. If the upper limit of Condition (11) is exceeded, a partial dispersion ratio of the optical element R becomes too high as compared with other general materials. Then, chromatic aberration of magnification of a short wavelength side particularly is excessively corrected, which is undesirable.

On the other hand, if the lower limit of Condition (11) is exceeded, a partial dispersion ratio of the optical element R becomes small and an anomalous dispersion thereof becomes similar to those of other general materials, which are small in anomalous dispersion. Then, chromatic aberration of magnification of a short wavelength side particularly is insufficiently corrected, which is undesirable. More desirably, Condition (11) may be set as follows.

$$0.0320 < R_{\theta 1} < 0.2700 \quad (11a)$$

More desirably, Condition (11a) may be set as follows.

$$0.0400 < R_{\theta 1} < 0.2500 \quad (11b)$$

More desirably, Condition (11b) may be set as follows.

$$0.0550 < R_{\theta 1} < 0.2200 \quad (11c)$$

If the upper limit of Condition (12) is exceeded, a partial dispersion ratio of the optical element R becomes large and an anomalous dispersion thereof becomes similar to those of other general materials, which are small in anomalous dispersion. Then, chromatic aberration of magnification of a short wavelength side particularly is insufficiently corrected, which is undesirable.

If the lower limit of Condition (12) is exceeded, a partial dispersion ratio of the optical element R becomes too low as compared with other general materials. Then, chromatic aberration of magnification of a short wavelength side particularly is excessively corrected, which is undesirable.

More desirably, Condition (12) may be set as follows.

$$-0.5000 < R_{\theta 2} < -0.0280 \quad (12a)$$

More desirably, Condition (12a) may be set as follows.

$$-0.4700 < R_{\theta 2} < -0.0290 \quad (12b)$$

More desirably, Condition (12b) may be set as follows.

$$-0.4600 < R_{\theta 2} < -0.0300 \quad (12c)$$

Condition (13) relates to an Abbe number of the material of the optical element R.

If the upper limit of Condition (13) is exceeded, an Abbe number of the material of the optical element R becomes large and the optical element A is in a low dispersion state. Then, if chromatic aberration of magnification of a short wavelength side is to be corrected, a high optical power is necessary and a balance with chromatic aberration of a long wavelength side cannot be taken, which is undesirable.

If the lower limit of Condition (13) is exceeded, an Abbe number of the material of the optical element R becomes small and the optical element R is in a high dispersion state. Then, since chromatic aberration of magnification on a short wavelength side particularly can be easily corrected with a low optical power but a correction direction is reversely applied to axial chromatic aberration influenced to a degree, it is difficult to take a balance of axial chromatic aberration and chromatic aberration of magnification, which is undesirable.

More desirably, Condition (13) may be set as follows.

$$5 < v_{dR} < 55 \quad (13a)$$

More desirably, Condition (13a) may be set as follows.

$$7 < v_{dR} < 50 \quad (13b)$$

More desirably, Condition (13b) may be set as follows.

$$10 < v_{dR} < 45 \quad (13c)$$

A detailed example of the material constituting the optical element R satisfying Conditions (11), (12), and (13) is similar to the material constituting the above-mentioned optical element A.

According to the exemplary embodiments, a photographic optical system capable of correcting chromatic aberrations over the entire screen and showing high optical performance may be obtained.

Next, features of the lens configurations of the exemplary embodiments will be described. The lenses of the reference numerals given to the lenses correspond to the lenses of the reference numerals given to the above-described lenses. First, a lens configuration common in the exemplary embodiments will be described.

The photographic optical system of the exemplary embodiments includes a first lens unit L1 having positive optical power (refractive power), a second lens unit L2 having negative optical power, and a third lens unit L3 having positive or negative optical power in order from the object side. An aperture portion SP is provided on the image side as compared with the first lens unit L1. The third lens unit L3 includes a first lens subunit L31 having positive or negative optical power, a second lens subunit L32 having negative optical power, and a third lens subunit L33 having positive optical power.

Further, in corrections (vibration compensations) of a photographic image when the photographic optical system is vibrated, the second lens subunit L32 is a movable lens unit (image displacing correction unit). A movement is made to have a component in a direction perpendicular to the optical axis as in an arrow LT.

In the exemplary embodiments except for the seventh exemplary embodiment, a diffractive optical element DOE is used in the first lens unit L1. In the fourteenth exemplary embodiment, a diffractive optical element DOE is used as the optical element A.

In the lens sectional view, DOE denotes a diffractive optical element. D denotes a diffractive optical section (diffractive optical surface) constituting a part of the diffractive optical element DOE. Among the diffractive light beams generated from the diffractive optical section D, the order of diffraction m of the diffractive light used in the exemplary embodiments is 1 and a design wavelength $\lambda_0$ thereof is a wavelength (587.56 nm) of d line. The diffractive optical surface D provided in the photographic optical system L0 is not limited to one diffractive optical surface but may be plural, and accordingly, excellent optical performance can be obtained. The diffractive optical surface D is not limited to a spherical surface but an aspheric surface may be a base. A material of the base may be glass or plastic if light can transmit it.

In the shape of the diffraction grating, a phase φ(H) at a distance H from the optical axis when a phase coefficient of a 2i-th term is $C_{2i}$ is represented by the following equation (a). In Equation (a), m is an order of diffraction and $\lambda_0$ is a reference wavelength.

$$\phi(H) = \left(2\pi \frac{m}{\lambda_s}\right) \cdot (C_2 \cdot H^2 + C_4 \cdot H^4 + C_6 \cdot H^6 \ldots + C_{2i} \cdot H^{2i}) \quad (a)$$

Generally, an Abbe number (dispersion value) $v_d$ of a refractive optical material, such as a lens, a prism, and the like, is defined in the following equation when refractive powers thereof with respect to wavelengths of d, C, and F lines are $N_d$, $N_C$, and $N_F$.

$$v_d = (N_d - 1)/(N_F - N_C) > 0 \quad (b)$$

When the wavelengths of d, C, and F lines are $\lambda_d$, $\lambda_C$, and $\lambda_F$, an Abbe number $v_d$ of the diffractive optical section is represented by $$v_d = \lambda_d/(\lambda_F - \lambda_c) \quad (c),$$

and $v_d$ is −3.453.

A partial dispersion ratio $\theta_{gF}$ is represented by $$\theta_{gF} = (\lambda_g - \lambda_F)/(\lambda_F - \lambda_C) \quad (d),$$

and $\theta_{gF}$ is 0.2956.

A partial dispersion ratio difference is $$\Delta\theta_{gF} = \theta_{gF} - (-1.61783 \times 10^{-3} \times v_d + 0.64146) \quad (e).$$

$\Delta\theta_{gF}$ is −0.35145 from the above definition equation.

Accordingly, a dispersion at an arbitrary wavelength has a reverse interaction with a refractive optical element. When a coefficient of a quadratic term is $C_2$ from the former Equation (a) representing a phase of the diffractive optical section, a refractive power $\phi_D$ of a paraxial temporary diffractive light (m=1) at a reference wavelength of a diffractive optical section is represented by $\phi_D = -2 \cdot C_2$. Accordingly, a focal length $f_{DOE}$ obtained by only a diffractive component of the diffractive optical element DOE is $$f_{DOE} = \frac{1}{\phi_D} = -\frac{1}{2 \cdot C_2}. \quad (f)$$

Further, when an arbitrary wavelength is λ and a reference wavelength is $\lambda_0$, a change in refractive power for the reference wavelength of the arbitrary wavelength satisfies the following equation.

$$\phi_D' = (\lambda/\lambda_0) \times (-2 \times C_2) \quad (g)$$

Accordingly, as a feature of the diffractive optical section, a high dispersion can be obtained by a weak paraxial refractive power change, by changing a phase coefficient $C_2$ of the former equation (a). This means that chromatic aberration is corrected without greatly influencing various aberrations other than chromatic aberration. For a high order coefficient after the phase coefficient $C_4$, a change in refractive power for a change in a ray entrance height of the diffractive optical section may have a similar effect to an aspheric surface. At the same time, a refractive power of an arbitrary wavelength may be changed for a reference wavelength as a ray entrance height is changed. Accordingly, it is effective to correct chromatic aberration of magnification.

As in the photographic optical system of the exemplary embodiments, if a diffractive optical element is disposed on a surface passing through a high location from the optical axis when an axial ray passes through a lens surface, it is also effective to correct axial chromatic aberration. Next, detailed configurations of the exemplary embodiments will be described.

Figure 1A:
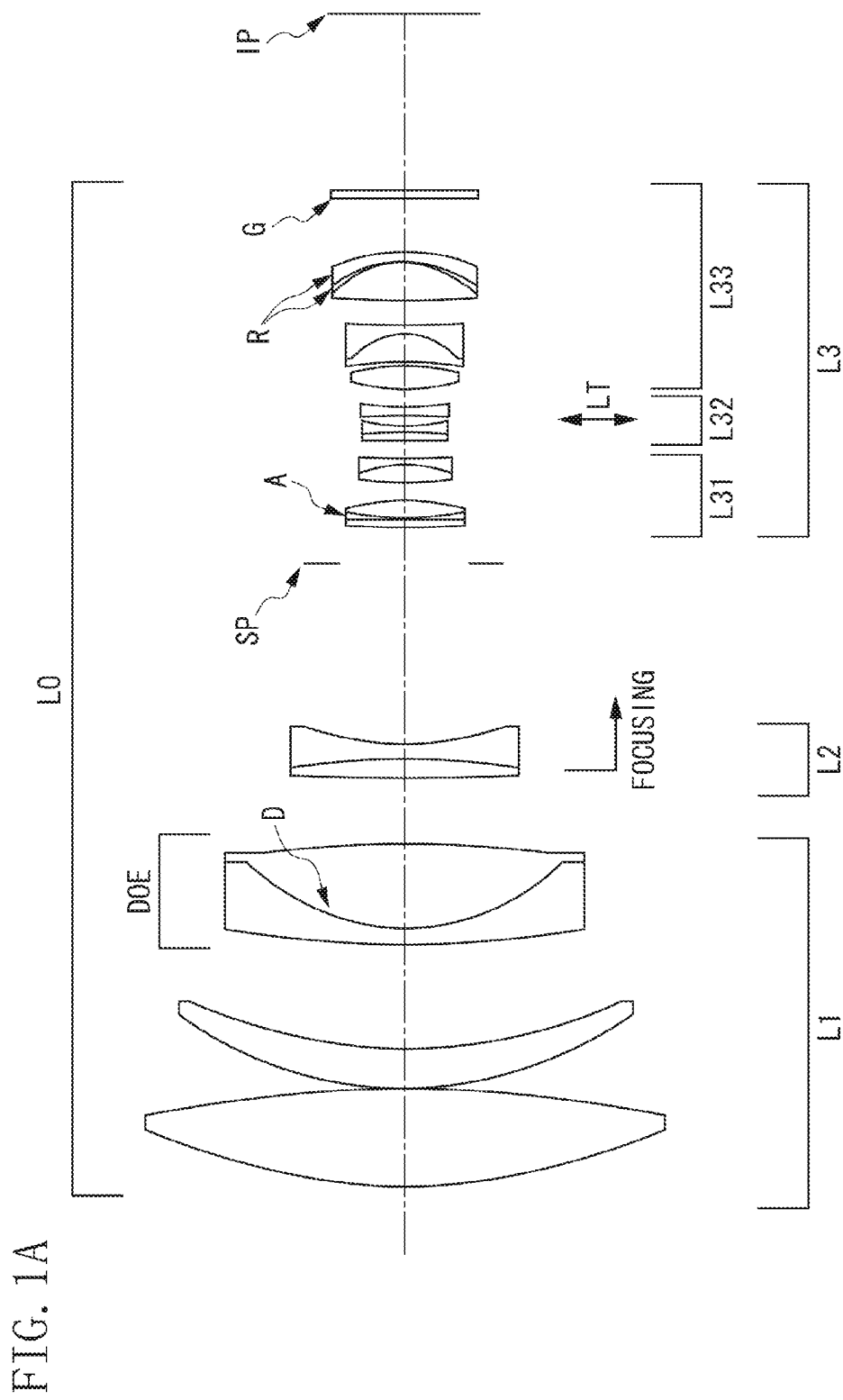
FIGS. 1A and 1B are a lens sectional view and aberration diagrams at an infinite distance of an object of a photographic optical system according to a first exemplary embodiment of the present invention.
Figure 1B:
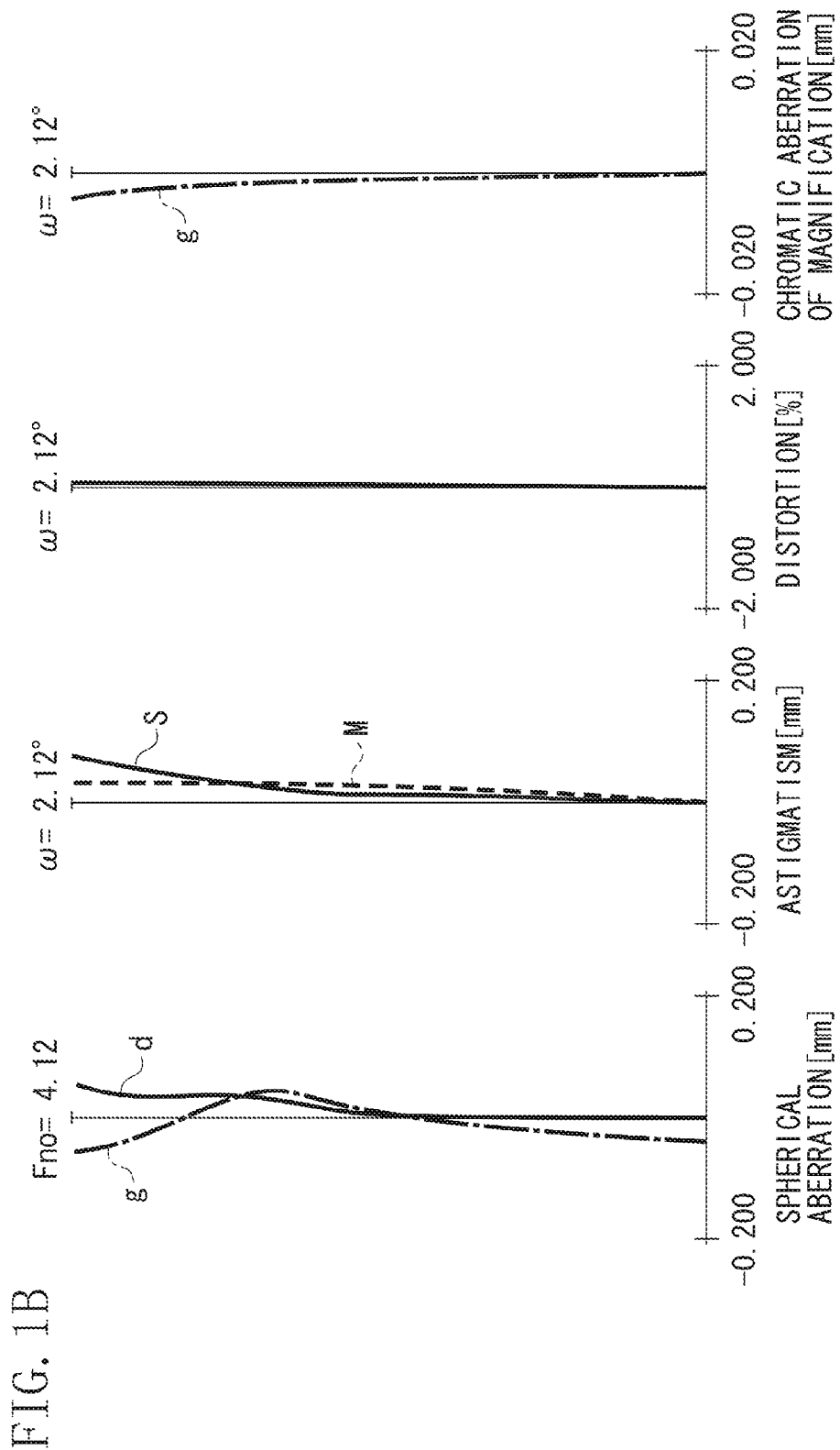

The photographic optical system L0 according to the first exemplary embodiment illustrated in FIG. 1A will be described. The first lens unit L1 includes three positive lenses, including a meniscus shape positive lens, and one negative lens. One cemented lens is included, and the cemented lens includes a diffractive optical element DOE. The diffractive optical section D constituting the diffractive optical element DOE is disposed on a cemented surface of the cemented lens. The meniscus shape positive lens corresponding to Conditions (14) and (15) is the second positive lens when counted from the object side.

A lens surface of the positive lens closest to the object side of the first lent unit L1 and a lens surface of the meniscus shape positive lens which contact air on the object side are aspheric. The second lens unit L2 includes a cemented lens where a positive lens and a negative lens are cemented to each other. The aperture portion SP for determining an axial maximum light flux diameter is an aperture stop having a variable aperture diameter and is disposed between the second lens unit L2 and the third lens unit L3. In the third lens unit L3, the first lens subunit L31 includes two cemented lenses. The cemented lens on the object side is a cemented lens including two positive lenses and one negative lens, and the negative lens corresponds to the optical element A.

The cemented lens on the image side is a cemented lens including one positive lens and one negative lens. A surface of the cemented lens on the image side which is closest to the object side is aspheric. The second lens subunit L32 includes one cemented lens where a positive lens and a negative lens are cemented to each other, and one negative lens. The third lens subunit L33 includes one positive lens and two cemented lenses. The cemented lens on the object side is a cemented lens including one positive lens and one negative lens. The cemented lens on the image side is a cemented lens including one positive lens and two negative lenses, and both the two negative lenses correspond to the optical element R.

An object-side surface of a positive lens closest to the object side of the third lens subunit L33, and a most-image-side surface of the cemented lens on the object side of the two cemented lenses have an aspheric shape. Further, focusing from an infinitely distant object to a close object is performed by moving the second lens unit L2 towards the image plane side along the optical axis.

Figure 2B:
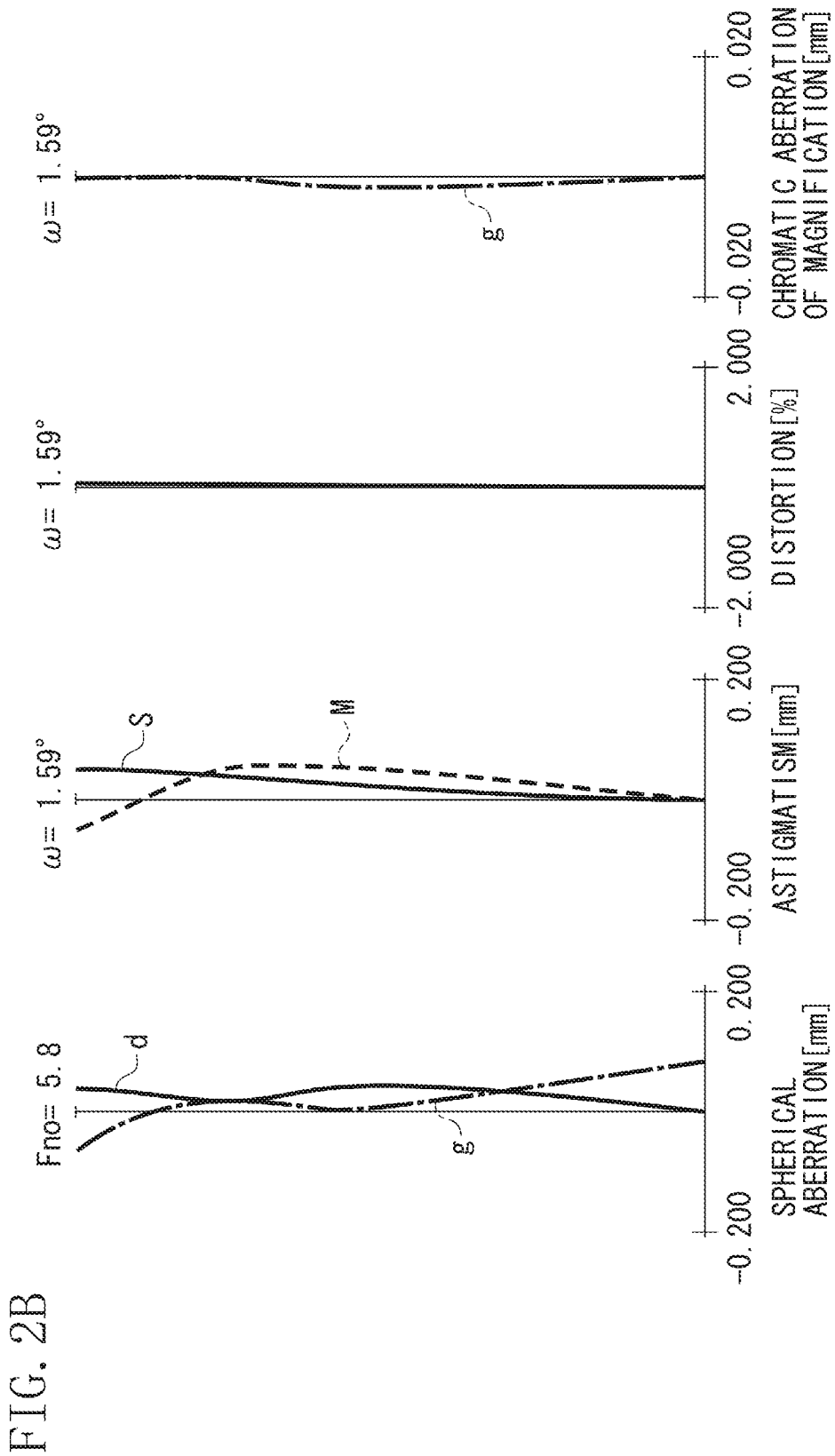

The photographic optical system L0 according to the second exemplary embodiment illustrated in FIG. 2A will be described. The first lens unit L1 includes four positive lenses, including a meniscus shape positive lens, and one negative lens. Two cemented lenses are provided, and the cemented lens composed of positive lenses on the object side includes a diffractive optical element DOE. The diffractive optical section D constituting the diffractive optical element DOE is disposed on a cemented surface of that cemented lens.

The meniscus shape positive lenses corresponding to Condition (14) are the first and third positive lenses when counted from the object side. The meniscus shape positive lens corresponding to Condition (15) is the third positive lens when counted from the object side. The lens surfaces of the cemented lenses and the single lens of the first lens unit L1 which contact air on the object side have an aspheric shape.

The second lens unit L2 is a cemented lens composed of a positive lens and a negative lens.

In the third lens unit L3, the first lens subunit L31 includes one cemented lens including two negative lenses and one positive lens, and the negative lens at the center of the cemented lens corresponds to the optical element A. The second lens subunit L32 includes one cemented lens where a positive lens and a negative lens are cemented to each other, and one negative lens. The aperture portion SP for determining an axial maximum light flux diameter is an aperture stop having a variable aperture diameter and is disposed between the first lens subunit L31 and the second lens subunit L32. The third lens subunit L33 includes a positive lens, one negative lens, and two cemented lenses.

The cemented lens on the object side of the two cemented lenses is a cemented lens including one positive lens and one negative lens. The cemented lens on the image side is a cemented lens including two positive lenses and one negative lens, and the negative lens corresponds to the optical element R. The most-object-side surface of the positive lens of the third lens subunit L33 has an aspheric shape. Further, focusing from an infinitely distant object to a close object is performed by moving the second lens unit L2 towards the image plane side along the optical axis.

Figure 3A:
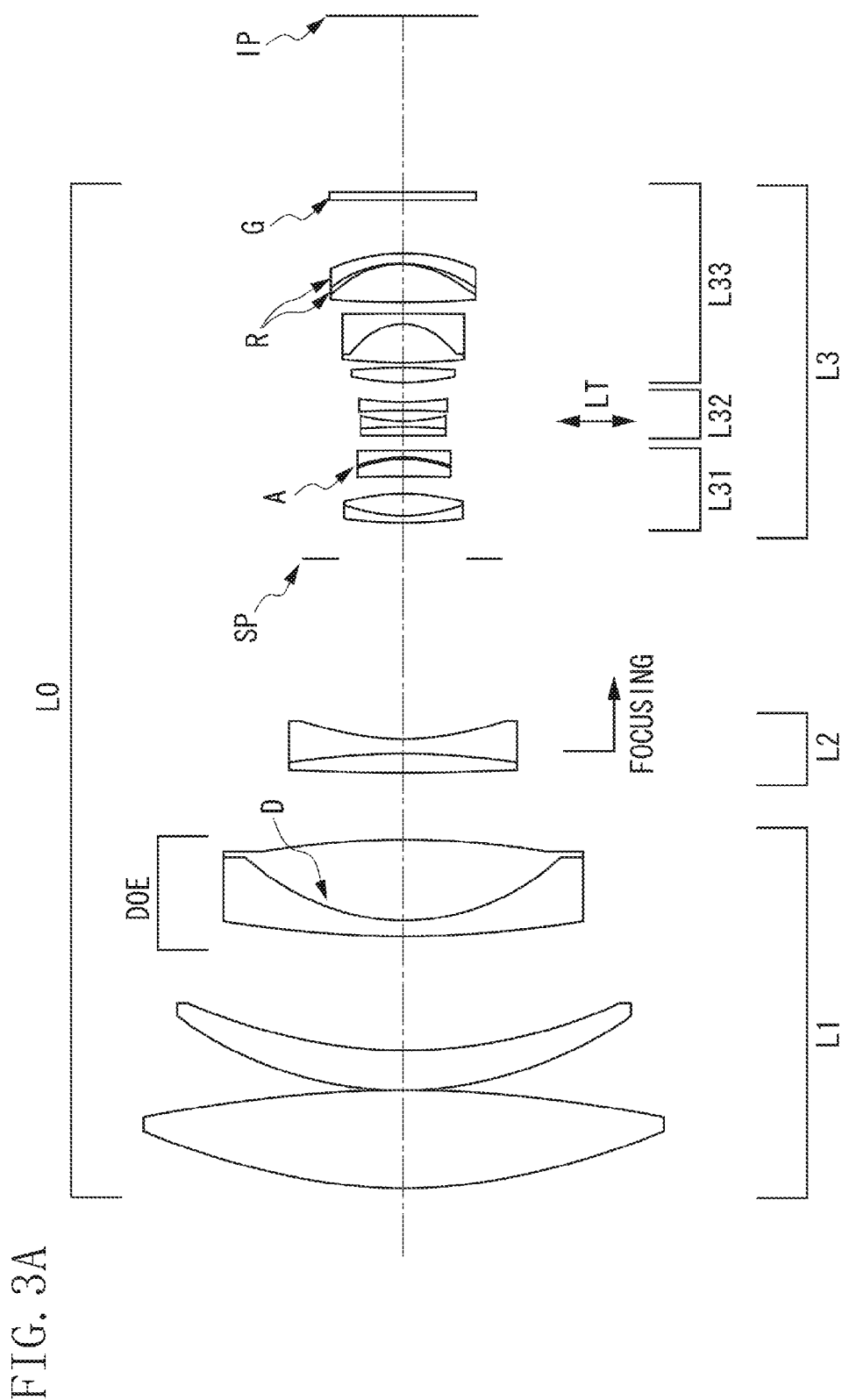
FIGS. 3A and 3B are a lens sectional view and aberration diagrams at an infinite distance of an object of a photographic optical system according to a third exemplary embodiment of the present invention.
Figure 3B:
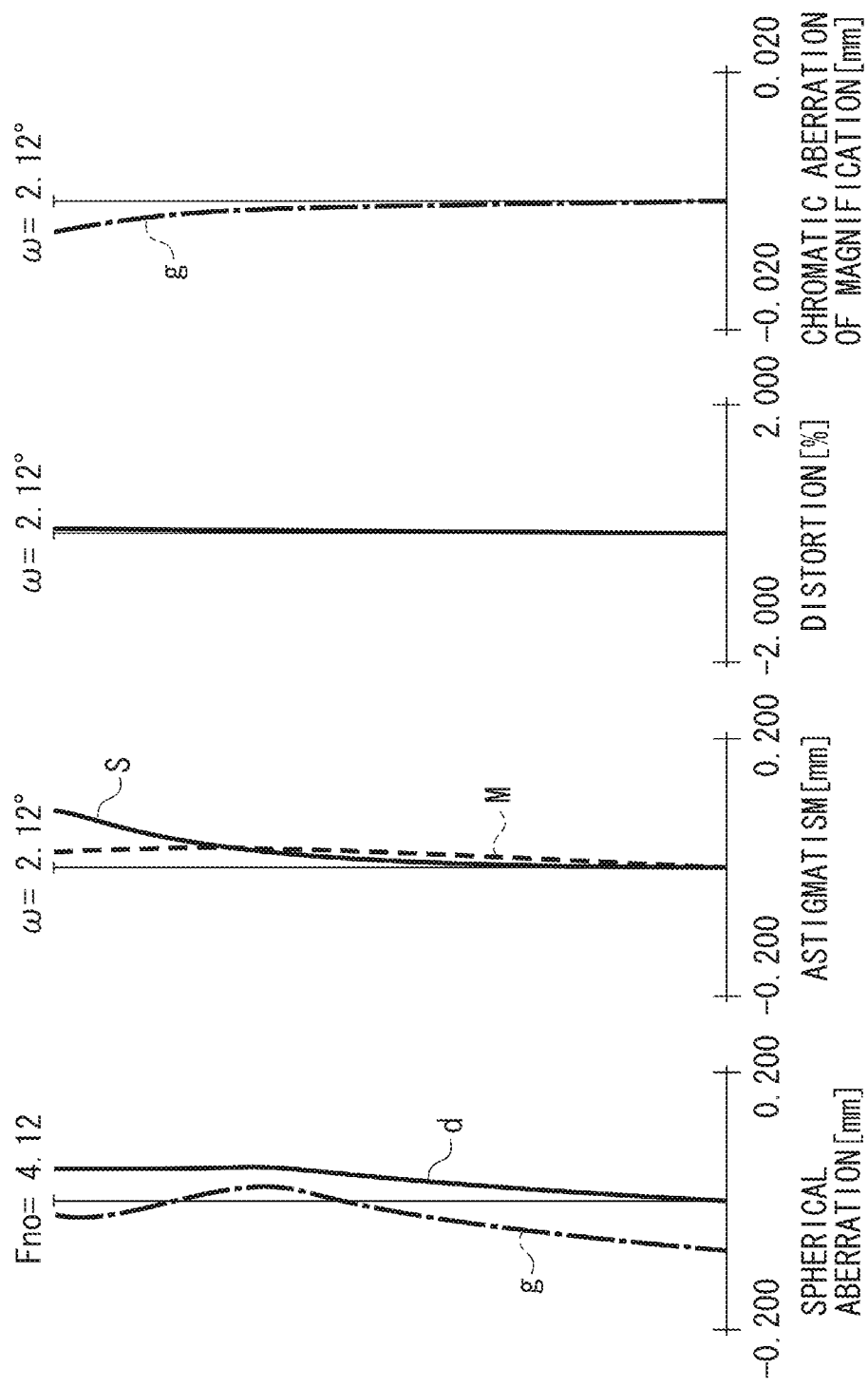

The photographic optical system L0 according to the third exemplary embodiment illustrated in FIG. 3A will be described. The first lens unit L1 includes three positive lenses, including a meniscus shape positive lens, and one negative lens. One cemented lens is provided, and the cemented lens includes a diffractive optical element DOE. The diffractive optical section D constituting the diffractive optical element DOE is disposed on a cemented surface of the cemented lens. The meniscus shape positive lens corresponding to Conditions (14) and (15) is the second positive lens when counted from the object side.

A lens surface of the positive lens closest to the object side of the first lent unit L1 and a lens surface of the meniscus shape positive lens which contact air on the object side have an aspheric shape. The second lens unit L2 includes a cemented lens composed of a positive lens and a negative lens. The aperture portion SP for determining an axial maximum light flux diameter is an aperture stop and is disposed between the second lens unit L2 and the third lens unit L3. In the third lens unit L3, the first lens subunit L31 includes two cemented lenses.

The cemented lens on the object side is a cemented lens including one negative lens and one positive lens.

The cemented lens on the image side is a cemented lens including one positive lens and two negative lenses, and the negative lens at the center corresponds to the optical element A. A surface of the cemented lens on the image side which is closest to the object side has an aspheric shape. The second lens subunit L32 includes one cemented lens where a positive lens and a negative lens are cemented to each other, and one negative lens. The third lens subunit L33 includes one positive lens and two cemented lenses. The cemented lens on the object side is a cemented lens including one positive lens and one negative lens.

The cemented lens on the image side is a cemented lens including one positive lens and two negative lenses, and both the two negative lenses correspond to the optical element R. An object-side surface of the positive lens closest to the object side of the third lens subunit L33, and a most-image-side surface of the cemented lens on the object side of the two cemented lenses have an aspheric shape. Further, focusing from an infinitely distant object to a close object is performed by moving the second lens unit L2 towards the image plane side along the optical axis.

Figure 4A:
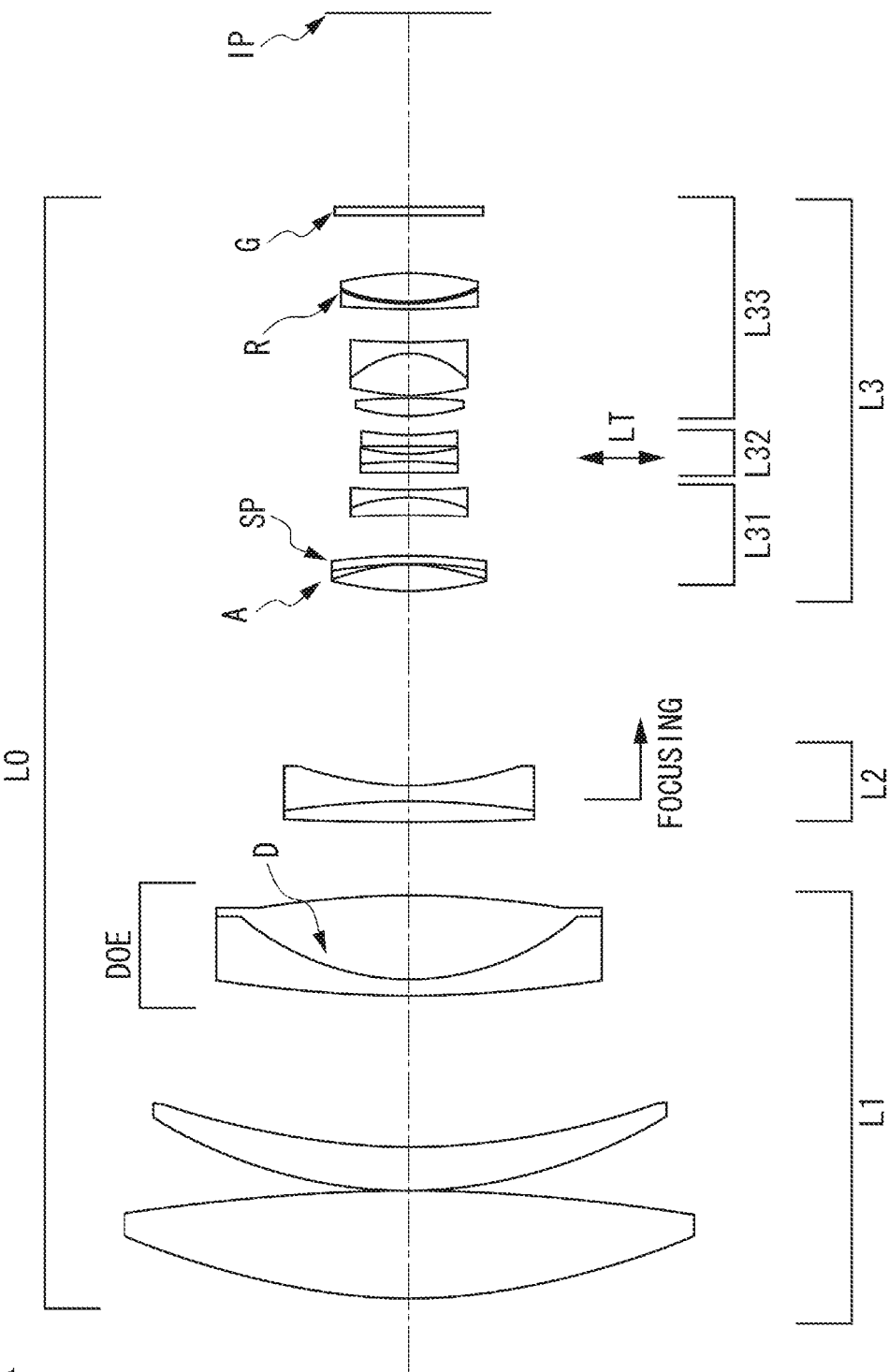
FIGS. 4A and 4B are a lens sectional view and aberration diagrams at an infinite distance of an object of a photographic optical system according to a fourth exemplary embodiment of the present invention.
Figure 4B:
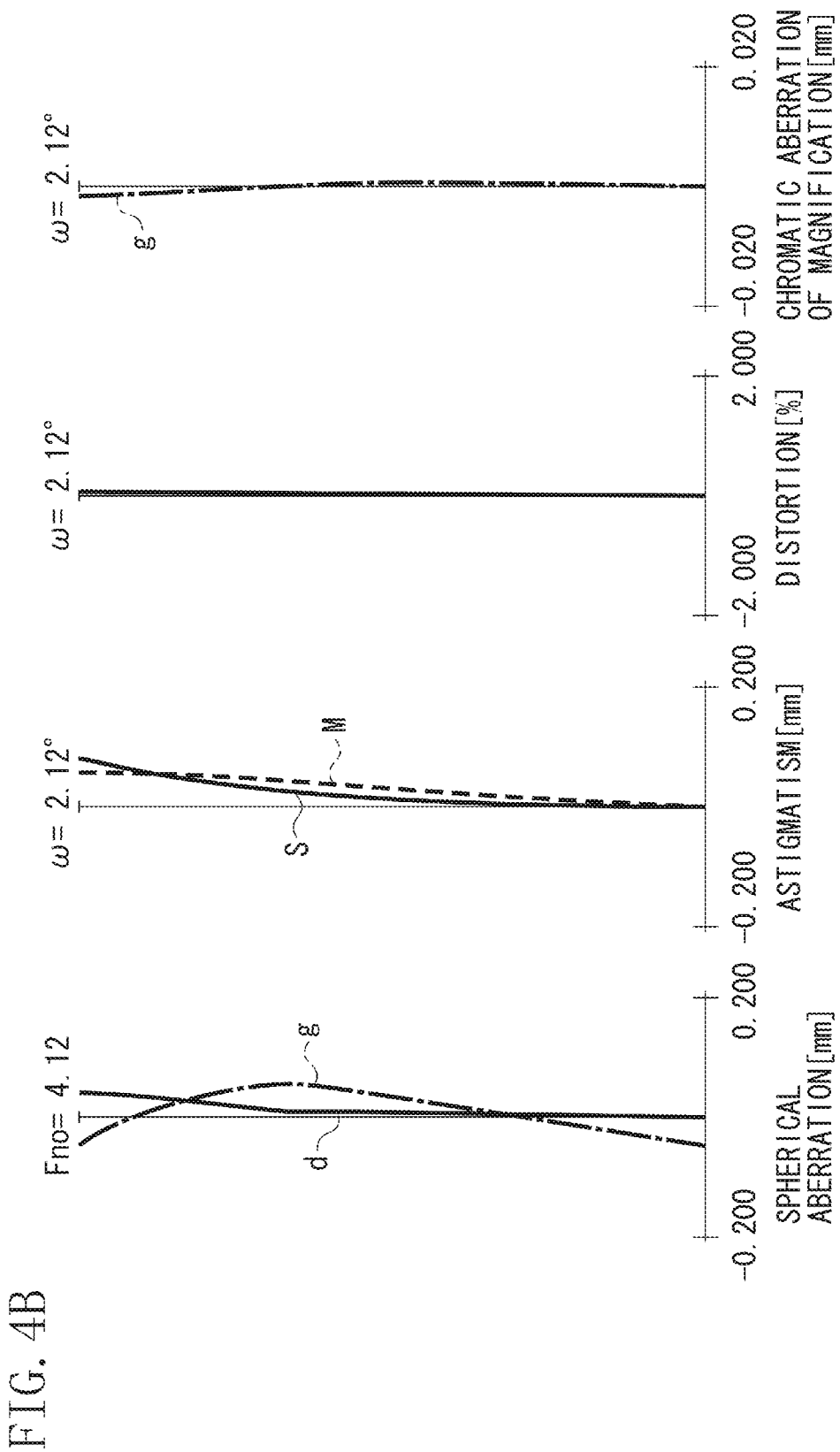

The photographic optical system L0 according to the fourth exemplary embodiment illustrated in FIG. 4A will be described. The first lens unit L1 includes three positive lenses, including a meniscus shape positive lens, and one negative lens. One cemented lens is provided, and the cemented lens includes a diffractive optical element DOE. The diffractive optical section D constituting the diffractive optical element DOE is disposed on a cemented surface of the cemented lens. The meniscus shape positive lens corresponding to Conditions (14) and (15) is the second positive lens when counted from the object side.

A lens surface of the positive lens closest to the object side of the first lens unit L1 and a lens surface of the meniscus shape positive lens which contact air on the object side have an aspheric shape. The second lens unit L2 includes a cemented lens composed of a positive lens and a negative lens. In the third lens unit L3, the first lens subunit L31 includes two cemented lenses. The cemented lens on the object side is a cemented lens including two positive lenses and one negative lens, and the negative lens corresponds to the optical element A. The cemented lens on the image side is a cemented lens where one positive lens and one negative lens are cemented to each other. A most-object-side surface of the cemented lens on the image side has an aspheric shape.

The aperture portion SP for determining an axial maximum light flux diameter is disposed on a most-image-side surface of the cemented lens on the object side, and the axial maximum light flux diameter is determined by an effective diameter of that lens. The second lens subunit L32 includes one cemented lens where a positive lens and a negative lens are cemented to each other, and one negative lens. The third lens subunit L33 includes one positive lens and two cemented lenses. The cemented lens on the object side is a cemented lens including one positive lens and one negative lens. The cemented lens on the image side is a cemented lens including two negative lenses and one positive lens, and the negative lens disposed at the center corresponds to the optical element R.

An object-side surface of the positive lens closest to the object side of the third lens subunit L33, and a most-image-side surface of the cemented lens on the object side have an aspheric shape. Further, focusing from an infinitely distant object to a close object is performed by moving the second lens unit L2 towards the image plane side along the optical axis.

Figure 5A:
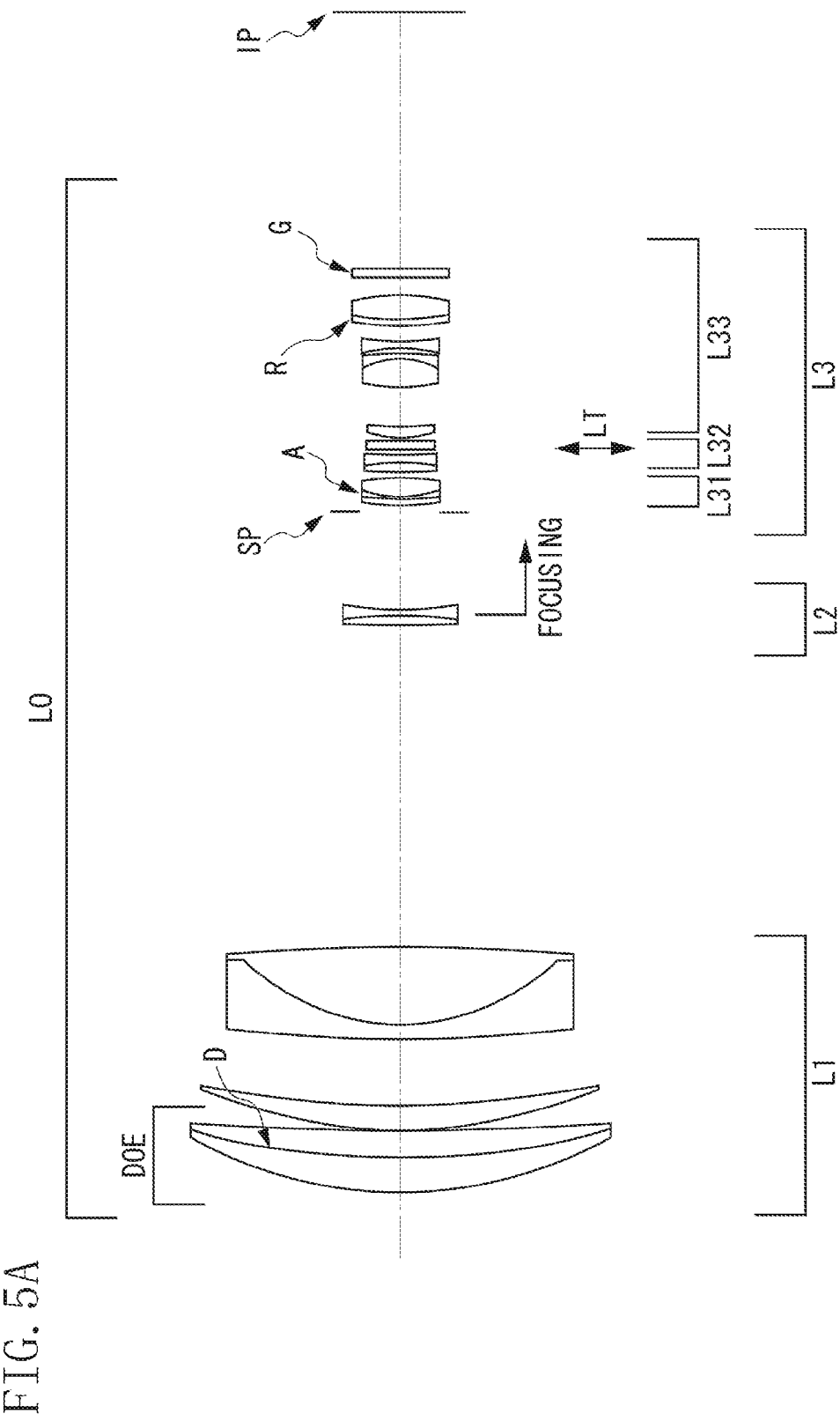
FIGS. 5A and 5B are a lens sectional view and aberration diagrams at an infinite distance of an object of a photographic optical system according to a fifth exemplary embodiment of the present invention.
Figure 5B:
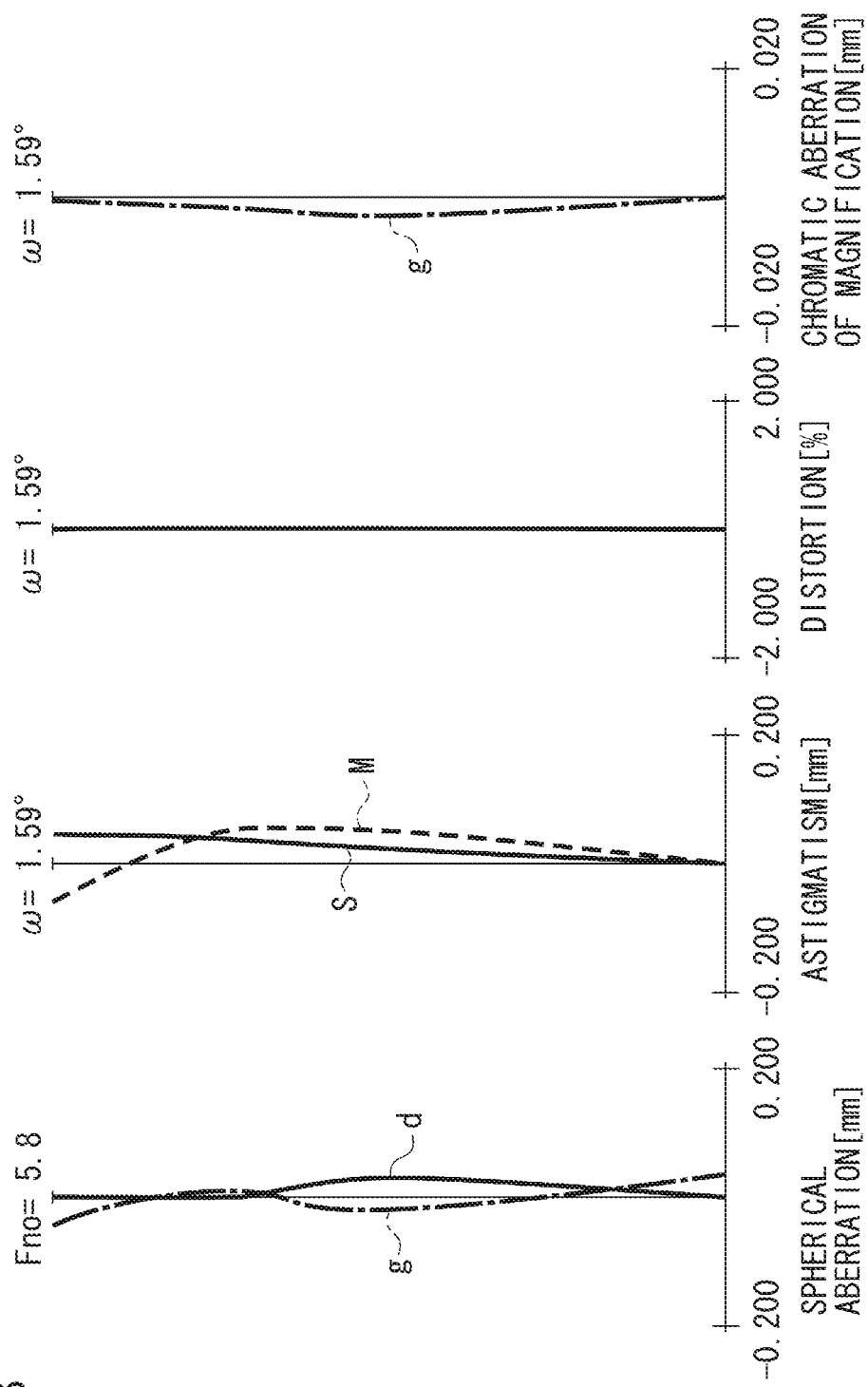

The photographic optical system L0 according to the fifth exemplary embodiment illustrated in FIG. 5A will be described. The first lens unit L1 includes four positive lenses, including a meniscus shape positive lens, and one negative lens. Two cemented lenses are provided, and the cemented lens composed of positive lenses on the object side includes a diffractive optical element DOE. The diffractive optical section D constituting the diffractive optical element DOE is disposed on a cemented surface of that cemented lens. The meniscus shape positive lenses corresponding to Condition (14) are the first and third positive lenses when counted from the object side.

The meniscus shape positive lens corresponding to Condition (15) is the third positive lens when counted from the object side. The lens surfaces of both the cemented lens and the single lens of the first lens unit L1 which contact air on the object side have an aspheric shape. The second lens unit L2 includes a cemented lens composed of a positive lens and a negative lens. The aperture portion SP for determining an axial maximum light flux diameter is an aperture stop having a variable aperture diameter and is disposed between the second lens unit L2 and the third lens unit L3.

In the third lens unit L3, the first lens subunit L31 includes one cemented lens where two negative lenses and one positive lens are cemented to each other, and the negative lens at the center of the cemented lens corresponds to the optical element A. The second lens subunit L32 includes one cemented lens where a positive lens and a negative lens are cemented to each other, and one negative lens. The third lens subunit L33 includes one positive lens, one negative lens, and two cemented lenses. The cemented lens on the object side of the two cemented lenses is a cemented lens including a positive lens and a negative lens.

The cemented lens on the image side is a cemented lens including a negative lens and a positive lens, and the negative lens corresponds to the optical element R. The object-side surface of the positive lens closest to the object side of the third lens subunit L33 has an aspheric shape. Further, focusing from an infinitely distant object to a close object is performed by moving the second lens unit L2 towards the image plane side along the optical axis.

Figure 6A:
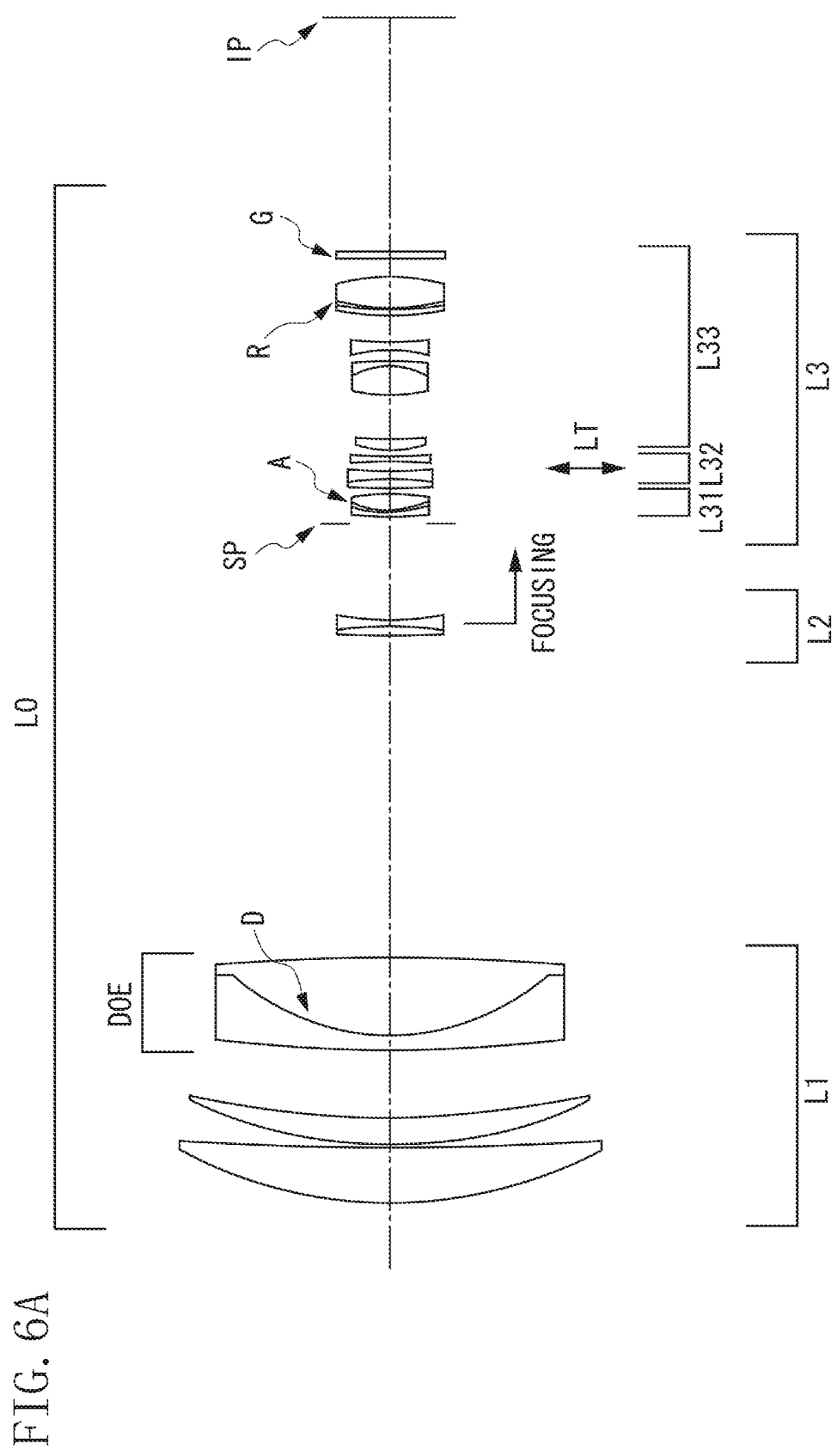

The photographic optical system L0 according to the sixth exemplary embodiment illustrated in FIG. 6A will be described. The first lens unit L1 includes three positive lenses, including a meniscus shape positive lens, and one negative lens. One cemented lens is provided, and the cemented lens includes a diffractive optical element DOE. The diffractive optical section D constituting the diffractive optical element DOE is disposed on a cemented surface of the cemented lens. The meniscus shape positive lens corresponding to Conditions (14) and (15) is the second positive lens when counted from the object side. The lens surfaces of both the cemented lens and the single lens of the first lens unit L1 which contact air on the object side have an aspheric shape.

The second lens unit L2 includes a cemented lens composed of a positive lens and a negative lens. The aperture portion SP for determining an axial maximum light flux diameter is an aperture stop having a variable aperture diameter and is disposed between the second lens unit L2 and the third lens unit L3. In the third lens unit L3, the first lens subunit L31 includes one cemented lens where two negative lenses and one positive lens are cemented to each other, and the negative lens at the center of the cemented lens corresponds to the optical element A. The second lens subunit L32 includes one cemented lens where a positive lens and a negative lens are cemented to each other, and one negative lens.

The third lens subunit L33 includes one positive lens, one negative lens, and two cemented lenses. The cemented lens on the object side of the two cemented lenses is a cemented lens including a positive lens and a negative lens. The cemented lens on the image side is a cemented lens including a positive lens, a negative lens, and a positive lens, and the negative lens of that cemented lens corresponds to the optical element R. The object-side surface of the positive lens closest to the object side of the third lens subunit L33 has an aspheric shape. Further, focusing from an infinitely distant object to a close object is performed by moving the second lens unit L2 towards the image plane side along the optical axis.

Figure 7A:
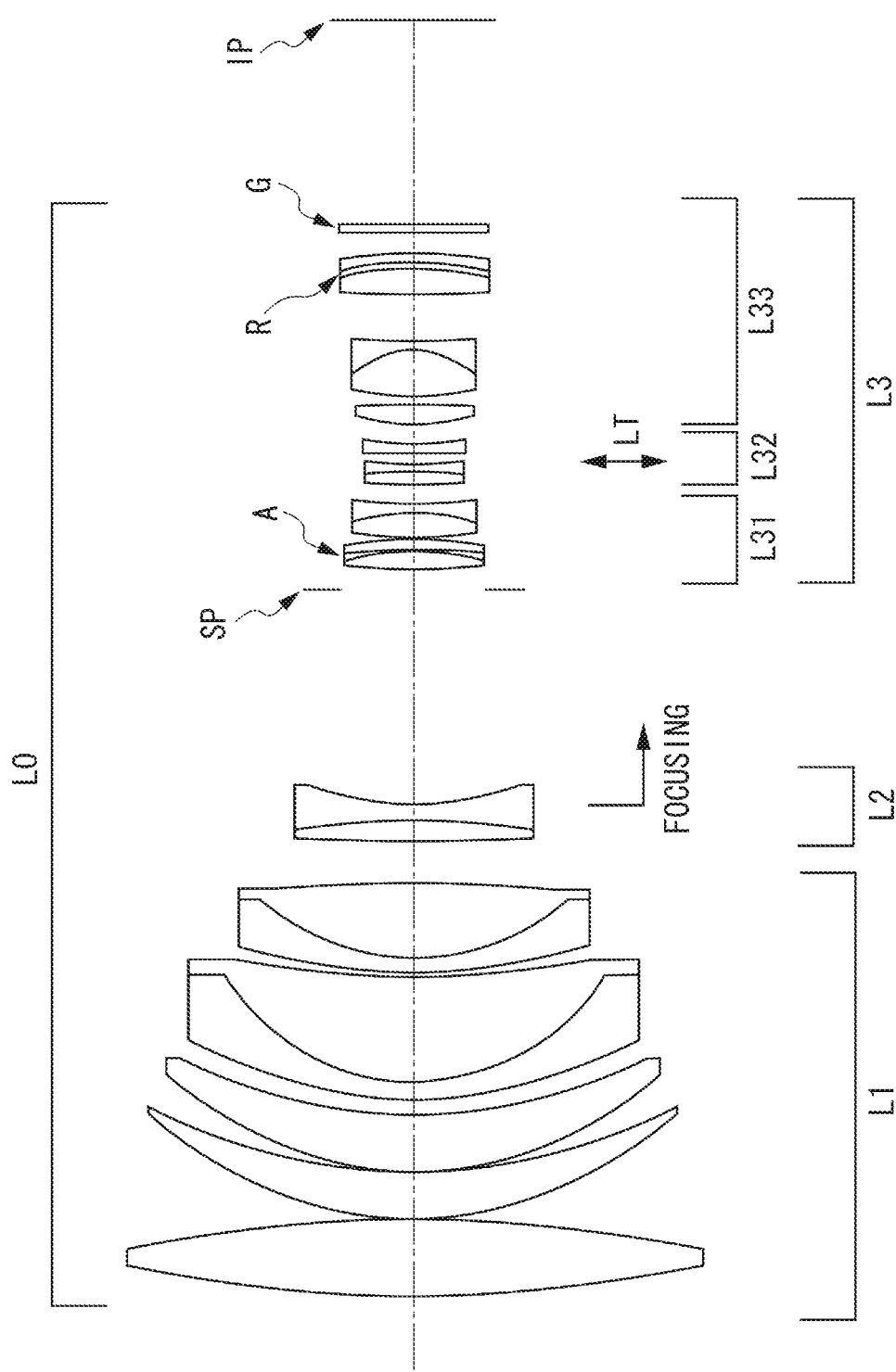
FIGS. 7A and 7B are a lens sectional view and aberration diagrams at an infinite distance of an object of a photographic optical system according to a seventh exemplary embodiment of the present invention.
Figure 7B:
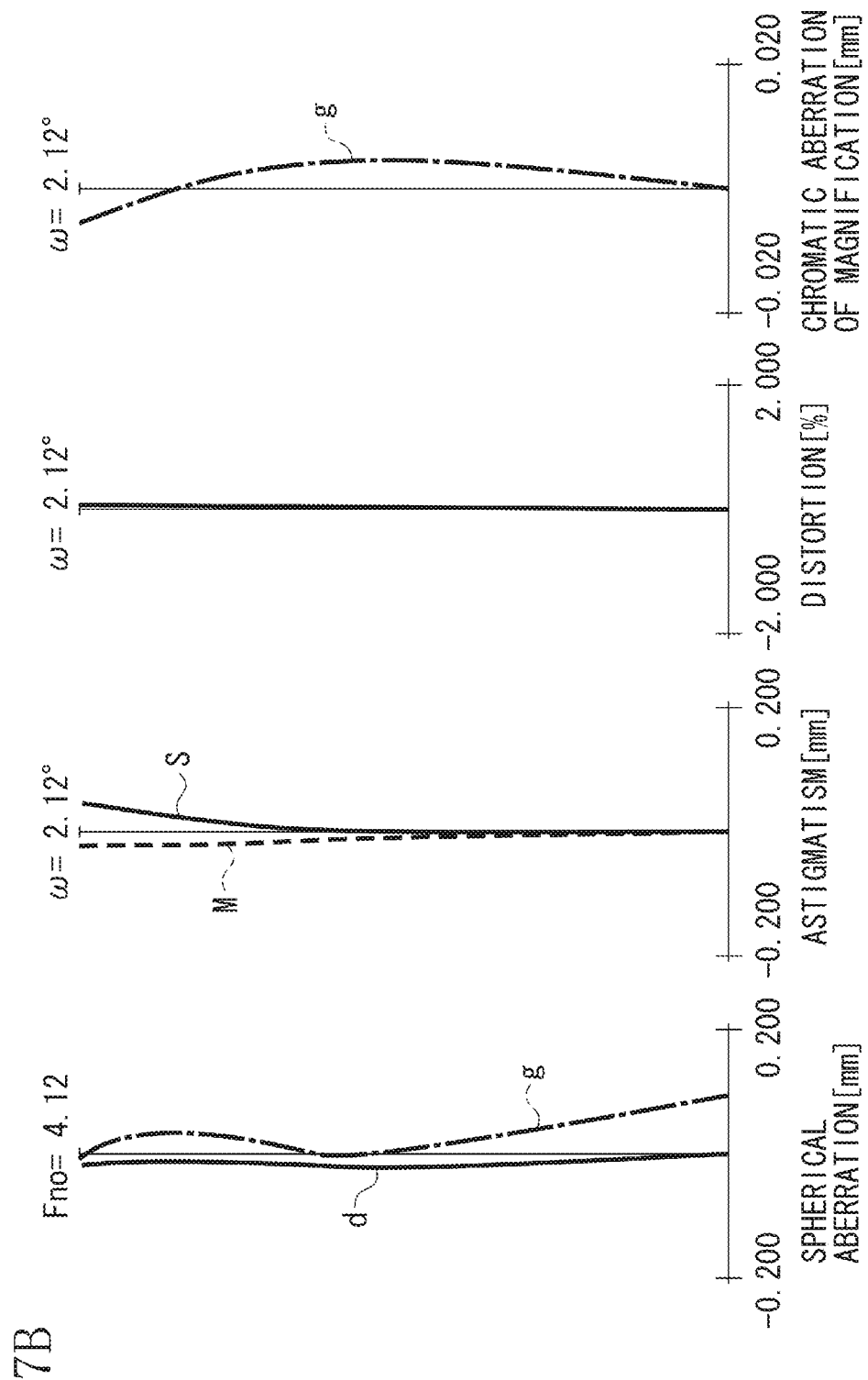

The photographic optical system L0 according to the seventh exemplary embodiment illustrated in FIG. 7A will be described. The first lens unit L1 includes five positive lenses, including a meniscus shape positive lens, and two negative lenses. Two cemented lenses are provided, and the cemented lenses are cemented lenses each including a negative lens and a positive lens. The meniscus shape positive lenses corresponding to Condition (14) are the second and third positive lenses when counted from the object side. The meniscus shape positive lens corresponding to Condition (15) is the second positive lens when counted from the object side.

A lens surface of the positive lens closest to the object side of the first lens unit L1 and a lens surface of the cemented lens closest to the object side which contact air on the object side have an aspheric shape. The second lens unit L2 includes a cemented lens composed of a positive lens and a negative lens. The aperture portion SP for determining an axial maximum light flux diameter is an aperture stop having a variable aperture diameter and is disposed between the second lens unit L2 and the third lens unit L3.

In the third lens unit L3, the first lens subunit L31 includes two cemented lenses. The cemented lens on the object side is a cemented lens including two positive lenses and one negative lens, and the negative lens corresponds to the optical element A.

The cemented lens on the image side includes a cemented lens including one positive lens and one negative lens. A surface closest to the object side of the cemented lens on the image side has an aspheric shape. The second lens subunit L32 includes one cemented lens where a positive lens and a negative lens are cemented to each other, and one negative lens. The third lens subunit L33 includes one positive lens and two cemented lenses. The cemented lens on the object side is a cemented lens including one positive lens and one negative lens. The cemented lens on the image side is a cemented lens including one positive lens and two negative lenses, and the negative lens at the center corresponds to the optical element R.

An object-side surface of the positive lens closest to the object side of the third lens subunit L33, and a most-image-side surface of the cemented lens on the object side have an aspheric shape. Further, focusing from an infinitely distant object to a close object is performed by moving the second lens unit L2 towards the image plane side along the optical axis.

Figure 8A:
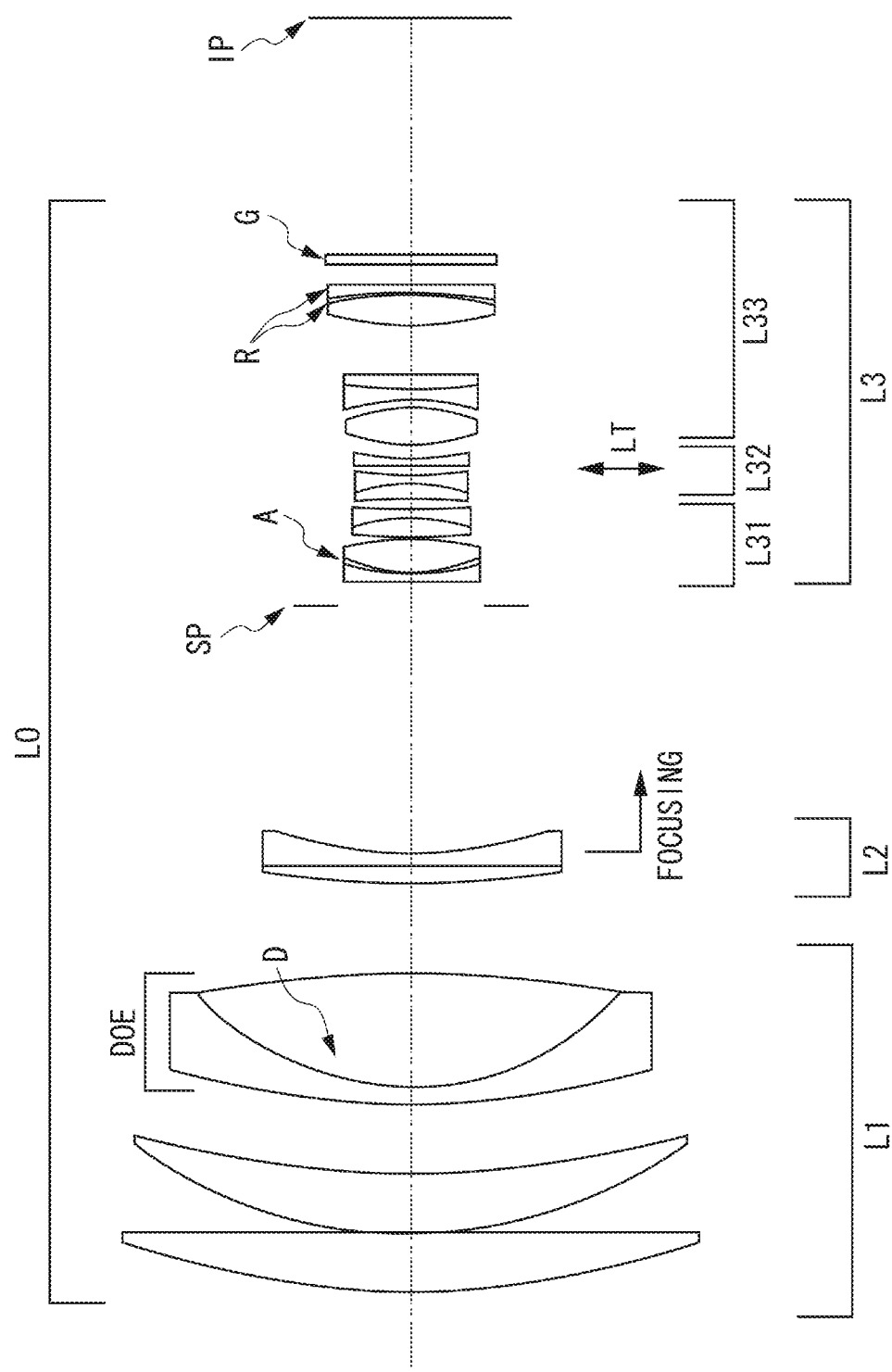
FIGS. 8A and 8B are a lens sectional view and aberration diagrams at an infinite distance of an object of a photographic optical system according to an eighth exemplary embodiment of the present invention.
Figure 8B:
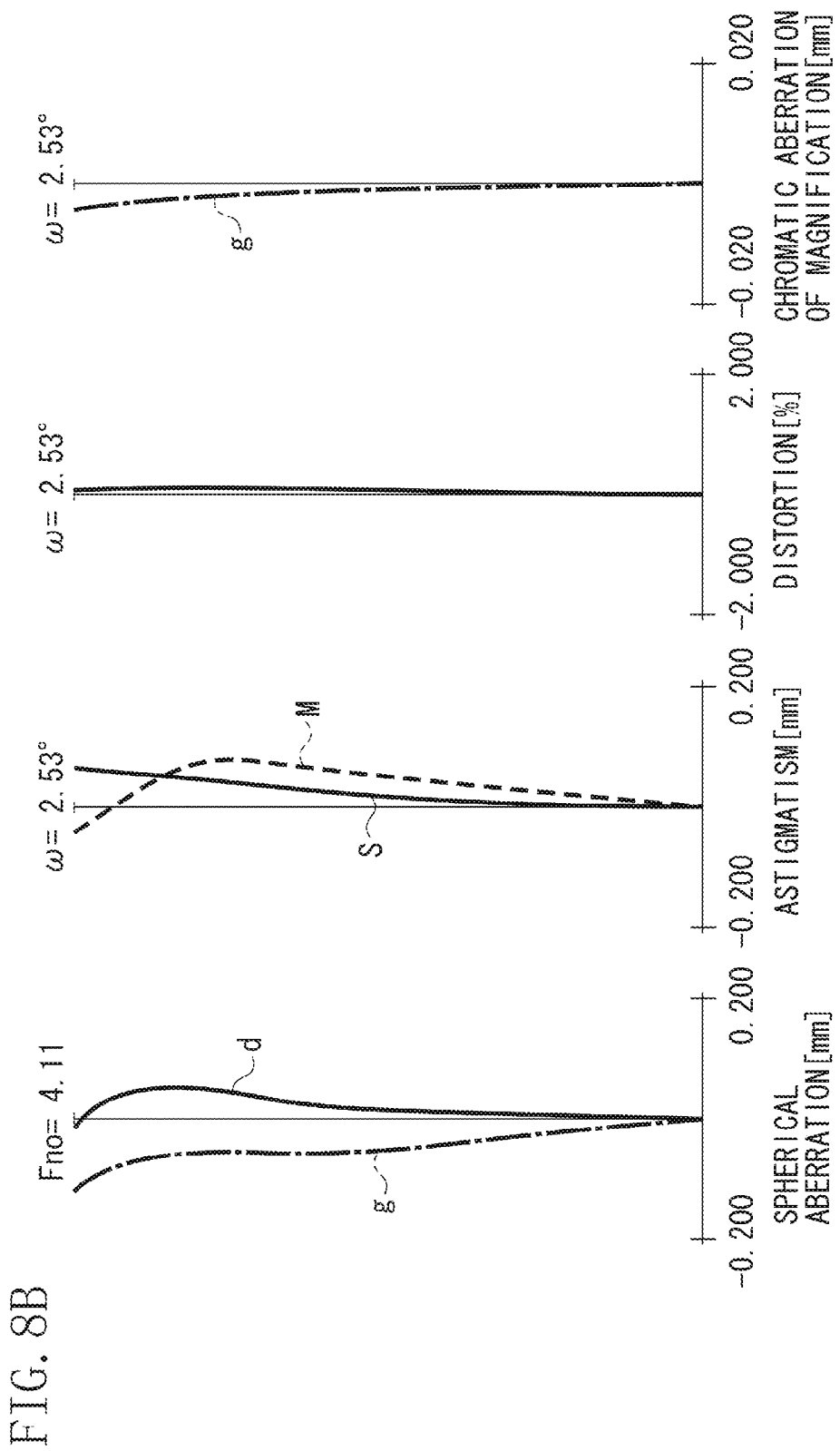

The photographic optical system L0 according to the eighth exemplary embodiment illustrated in FIG. 8A will be described. The first lens unit L1 includes three positive lenses, including a meniscus shape positive lens, and one negative lens. One cemented lens is provided, and the cemented lens includes a diffractive optical element DOE. The diffractive optical section D constituting the diffractive optical element DOE is disposed on a cemented surface of the cemented lens. The meniscus shape positive lens corresponding to Conditions (14) and (15) is the second positive lens when counted from the object side.

A lens surface of the positive lens closest to the object side of the first lens unit L1 and a lens surface of the second positive lens which contact air on the object side have an aspheric shape. The second lens unit L2 includes a cemented lens composed of a positive lens and a negative lens. The aperture portion SP for determining an axial maximum light flux diameter is an aperture stop having a variable aperture diameter and is disposed between the second lens unit L2 and the third lens unit L3.

In the third lens unit L3, the first lens subunit L31 includes two cemented lenses. The cemented lens on the object side is a cemented lens including two negative lenses and one positive lens, and the negative lens at the center corresponds to the optical element A. The cemented lens on the image side includes a cemented lens including one positive lens and one negative lens. The second lens subunit L32 includes one cemented lens where a positive lens and a negative lens are cemented to each other, and one negative lens. The third lens subunit L33 includes one positive lens and two cemented lenses.

The cemented lens on the object side is a cemented lens including one negative lens and one positive lens. The cemented lens on the image side is a cemented lens including one positive lens and two negative lenses, and both the two negative lenses correspond to the optical element R. The object-side surface of the positive lens closest to the object side of the third lens subunit L33 has an aspheric shape. Further, focusing from an infinitely distant object to a close object is performed by moving the second lens unit L2 towards the image plane side along the optical axis.

Figure 9A:
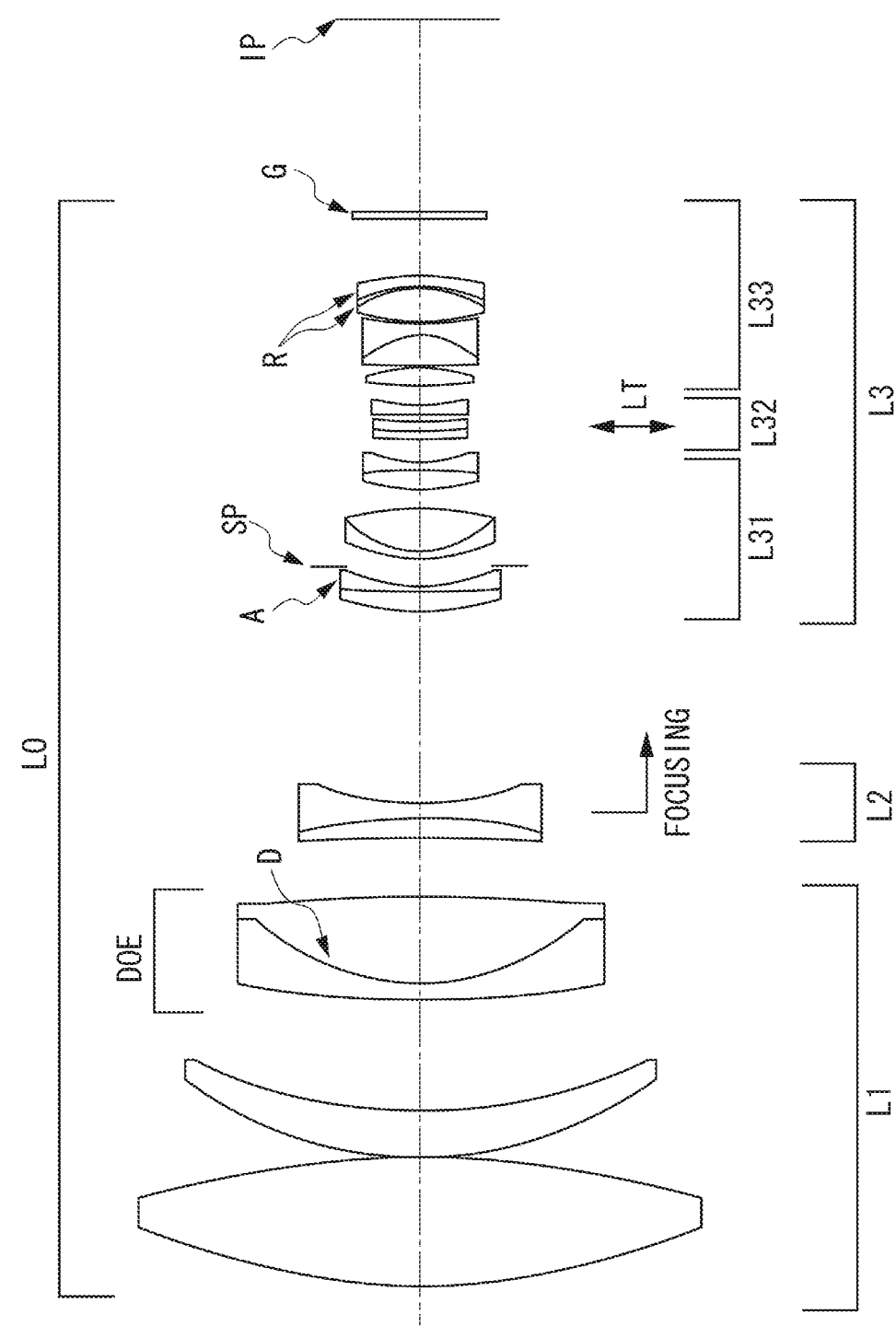
FIGS. 9A and 9B are a lens sectional view and aberration diagrams at an infinite distance of an object of a photographic optical system according to a ninth exemplary embodiment of the present invention.
Figure 9B:
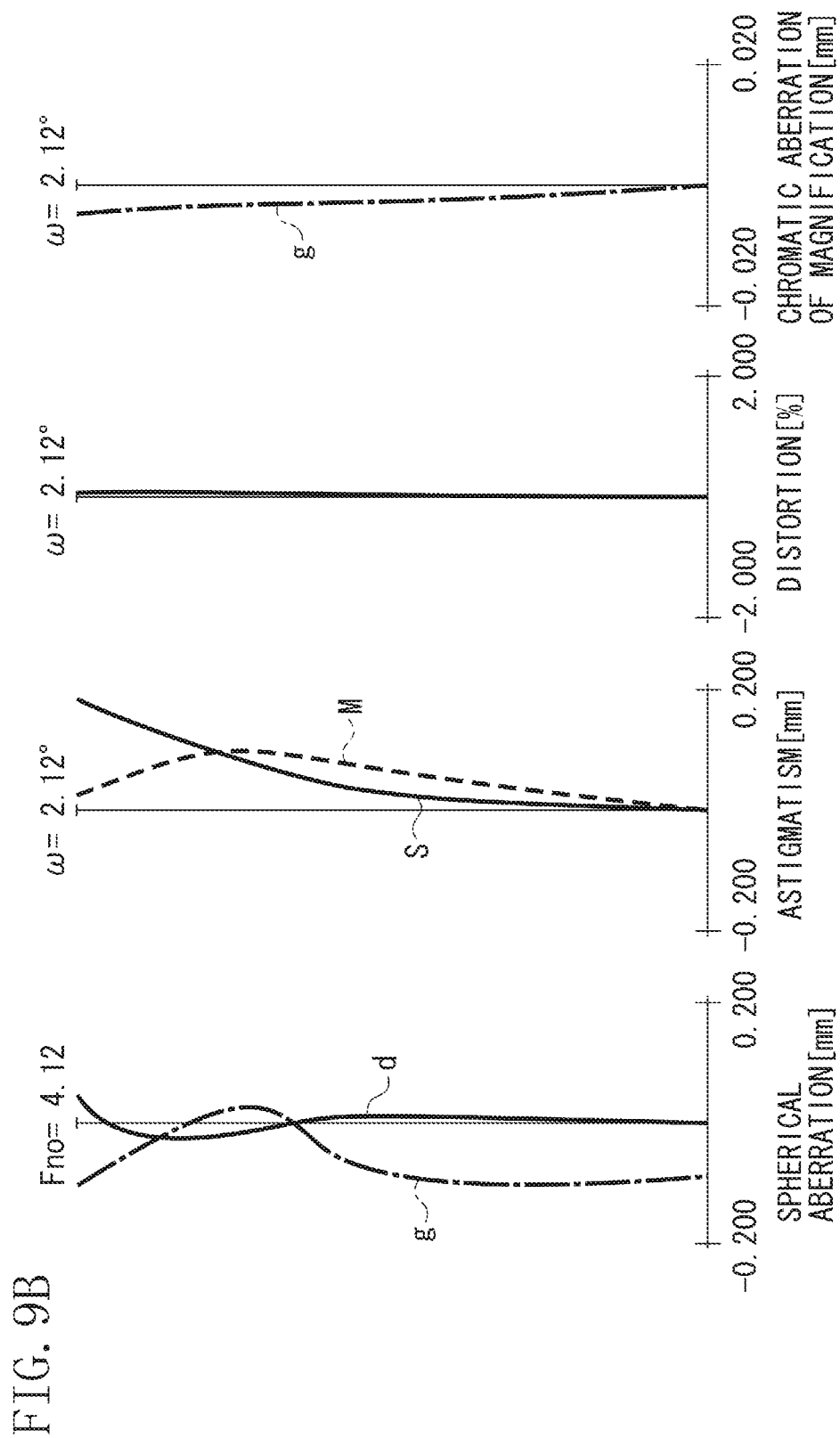

The photographic optical system L0 according to the ninth exemplary embodiment illustrated in FIG. 9A will be described. The first lens unit L1 includes three positive lenses, including a meniscus shape positive lens, and one negative lens. One cemented lens is provided, and the cemented lens includes a diffractive optical element DOE. The diffractive optical section D constituting the diffractive optical element DOE is disposed on a cemented surface of the cemented lens. The meniscus shape positive lens corresponding to Conditions (14) and (15) is the second positive lens when counted from the object side.

A lens surface of the positive lens closest to the object side of the first lens unit L1 and a lens surface of the meniscus shape positive lens which contact air on the object side have an aspheric shape. The second lens unit L2 includes a cemented lens composed of a positive lens and a negative lens. In the third lens unit L3, the first lens subunit L31 includes three cemented lenses. The cemented lens closest to the object side is a cemented lens including a positive lens and a negative lens, and the negative lens corresponds to the optical element A. The next cemented lens is a cemented lens including a negative lens and a positive lens. Further, the cemented lens closest to the image side is a cemented lens including a positive lens and a negative lens.

A surface closest to the object side of the cemented lens closest to the image side has an aspheric shape. The second lens subunit L32 includes one cemented lens where a positive lens and a negative lens are cemented to each other, and one negative lens. The third lens subunit L33 includes one positive lens and two cemented lenses. The cemented lens on the object side is a cemented lens including one positive lens and one negative lens. The cemented lens on the image side is a cemented lens including one positive lens and two negative lenses, and both the two negative lenses correspond to the optical element R.

An object-side surface of the positive lens closest to the object side of the third lens subunit L33, and a surface closest to the image side of the cemented lens on the object side of the two cemented lenses have an aspheric shape. Further, focusing from an infinitely distant object to a close object is performed by moving the second lens unit L2 towards the image plane side along the optical axis.

Figure 10A:
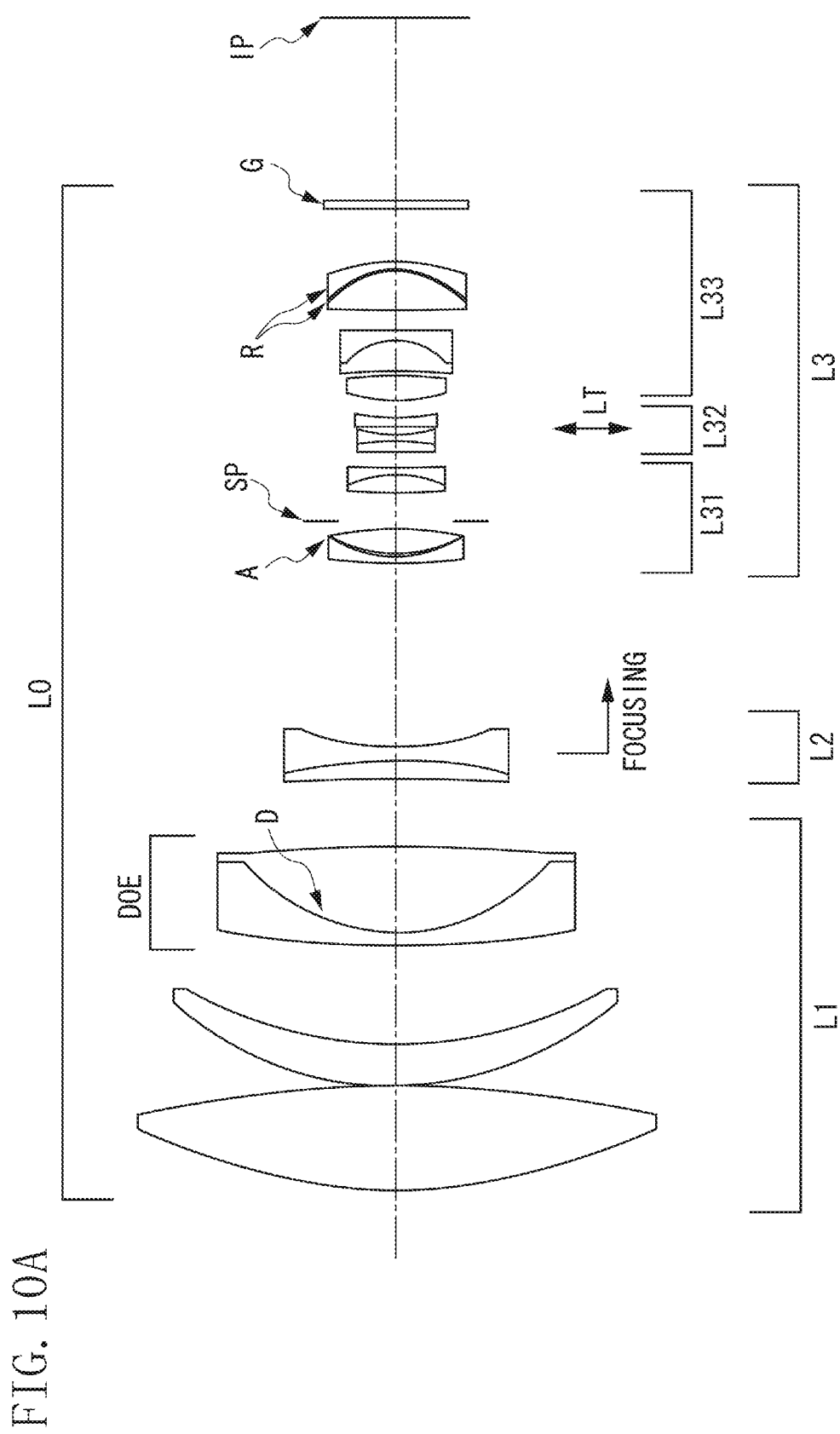

The photographic optical system L0 according to the tenth exemplary embodiment illustrated in FIG. 10A will be described. The first lens unit L1 includes three positive lenses, including a meniscus shape positive lens, and one negative lens. One cemented lens is provided, and the cemented lens includes a diffractive optical element DOE. The diffractive optical section D constituting the diffractive optical element DOE is disposed on a cemented surface of the cemented lens. The meniscus shape positive lens corresponding to Conditions (14) and (15) is the second positive lens when counted from the object side.

A lens surface of the positive lens closest to the object side of the first lens unit L1, and a lens surface of the meniscus shape positive lens which contact air on the object side have an aspheric shape. The second lens unit L2 includes a cemented lens composed of a positive lens and a negative lens. In the third lens unit L3, the first lens subunit L31 includes two cemented lenses. The cemented lens on the object side is a cemented lens including one negative lens and two positive lenses, and the positive lens at the center corresponds to the optical element A. The cemented lens on the image side is a cemented lens including one positive lens and one negative lens. A surface closest to the object side of the cemented lens on the image side has an aspheric shape.

The second lens subunit L32 includes one cemented lens where a positive lens and a negative lens are cemented to each other, and one negative lens. The aperture portion SP for determining an axial maximum light flux diameter is an aperture stop having a variable aperture diameter and is disposed between the two cemented lenses of the first lens subunit L31 of the third lens unit. The third lens subunit L33 includes one positive lens and two cemented lenses. The cemented lens on the object side is a cemented lens including one positive lens and one negative lens. The cemented lens on the image side is a cemented lens including two positive lenses and one negative lens, and the positive and negative lenses at the center correspond to the optical element R.

An object-side surface of the positive lens closest to the object side of the third lens subunit L33, and a surface closest to the image side of the cemented lens on the object side of the two cemented lenses have an aspheric shape. Further, focusing from an infinitely distant object to a close object is performed by moving the second lens unit L2 towards the image plane side along the optical axis.

Figure 11A:
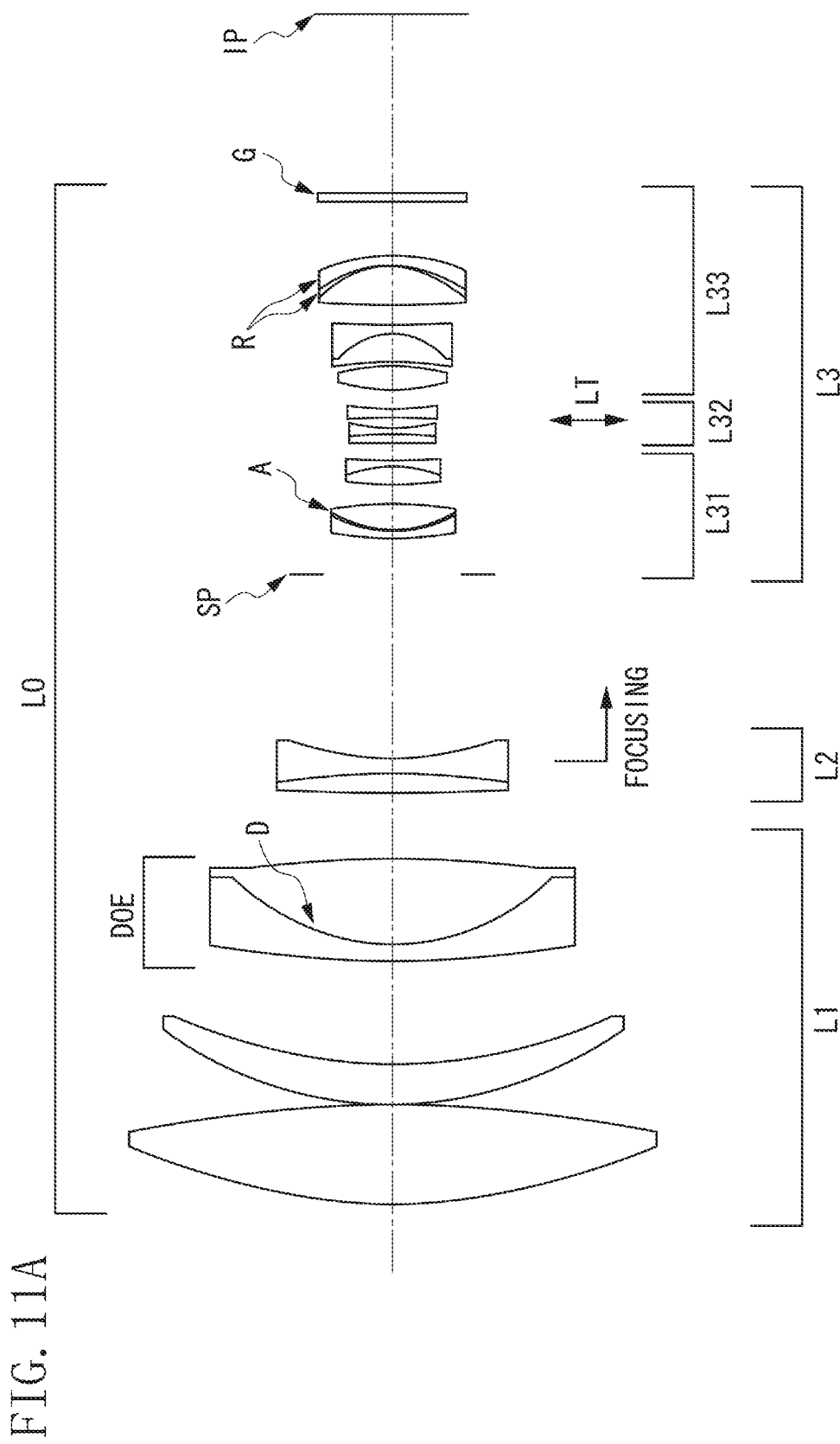

The photographic optical system L0 according to the eleventh exemplary embodiment illustrated in FIG. 11A will be described. The first lens unit L1 includes three positive lenses, including a meniscus shape positive lens, and one negative lens. One cemented lens is provided, and the cemented lens includes a diffractive optical element DOE. The diffractive optical section D constituting the diffractive optical element DOE is disposed on a cemented surface of the cemented lens. The meniscus shape positive lens corresponding to Conditions (14) and (15) is the second positive lens when counted from the object side.

A lens surface of the positive lens closest to the object side of the first lens unit L1 and a surface of the meniscus shape positive lens which contact air on the object side have an aspheric shape. The second lens unit L2 includes a cemented lens composed of a positive lens and a negative lens. The aperture portion SP for determining an axial maximum light flux diameter is an aperture stop having a variable aperture diameter and is disposed between the second lens unit L2 and the third lens unit L3.

In the third lens unit L3, the first lens subunit L31 includes two cemented lenses. The cemented lens on the object side is a cemented lens including one negative lens and two positive lenses, and the positive lens at the center corresponds to the optical element A.

The cemented lens on the image side includes a cemented lens including one positive lens and one negative lens. A surface closest to the object side of the cemented lens on the image side has an aspheric shape. The second lens subunit L32 includes one cemented lens where a positive lens and a negative lens are cemented to each other, and one negative lens. The third lens subunit L33 includes one positive lens and two cemented lenses. The cemented lens on the object side is a cemented lens including one positive lens and one negative lens. The cemented lens on the image side is a cemented lens including one positive lens and two negative lenses, and both the two negative lenses correspond to the optical element R.

An object-side surface of the positive lens closest to the object side of the third lens subunit L33, and a surface closest to the image side of the cemented lens on the object side of the two cemented lenses have an aspheric shape. Further, focusing from an infinitely distant object to a close object is performed by moving the second lens unit L2 towards the image plane side along the optical axis.

Figure 12A:
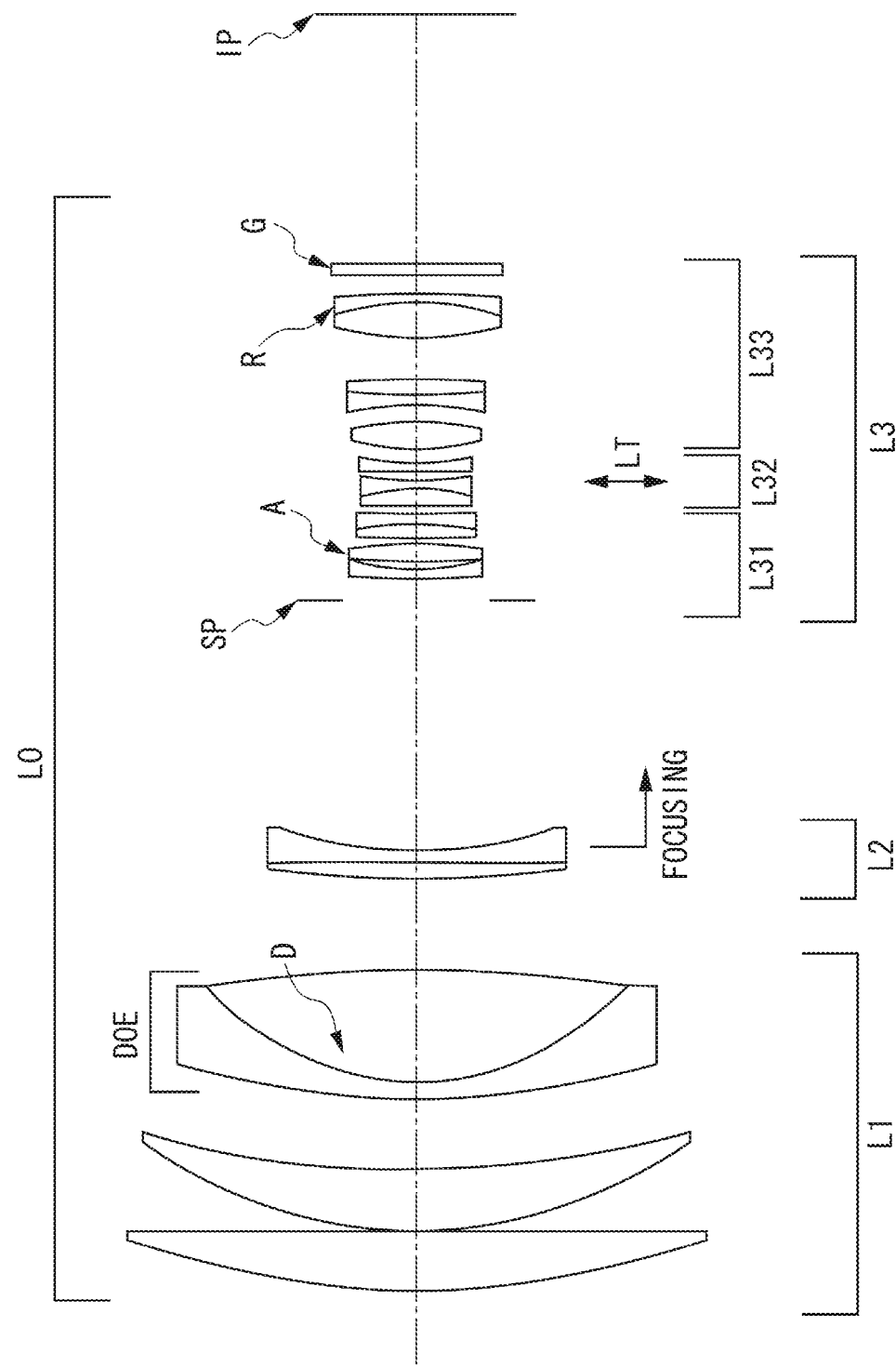

The photographic optical system L0 according to the twelfth exemplary embodiment illustrated in FIG. 12A will be described. The first lens unit L1 includes three positive lenses, including a meniscus shape positive lens, and one negative lens. One cemented lens is provided, and the cemented lens includes a diffractive optical element DOE. The diffractive optical section D constituting the diffractive optical element DOE is disposed on a cemented surface of the cemented lens. The meniscus shape positive lens corresponding to Conditions (14) and (15) is the second positive lens when counted from the object side.

A lens surface of the positive lens closest to the object side of the first lens unit L1 and a surface of the second positive lens which contact air on the object side have an aspheric shape. The second lens unit L2 includes a cemented lens composed of a positive lens and a negative lens. The aperture portion SP for determining an axial maximum light flux diameter is an aperture stop having a variable aperture diameter and is disposed between the second lens unit L2 and the third lens unit L3. In the third lens unit L3, the first lens subunit L31 includes two cemented lenses. The cemented lens on the object side is a cemented lens including one negative lens and two positive lenses, and the positive lens at the center corresponds to the optical element A.

The cemented lens on the image side includes a cemented lens including one positive lens and one negative lens. The second lens subunit L32 includes one cemented lens where a positive lens and a negative lens are cemented to each other, and one negative lens. The third lens subunit L33 includes one positive lens and two cemented lenses. The cemented lens on the object side is a cemented lens including a negative lens and a positive lens. The cemented lens on the image side is a cemented lens including a positive lens and a negative lens, and the negative lens corresponds to the optical element R. The object-side surface of the positive lens closest to the object side of the third lens subunit L33 has an aspheric shape.

Further, focusing from an infinitely distant object to a close object is performed by moving the second lens unit L2 towards the image plane side along the optical axis.

Figure 13A:
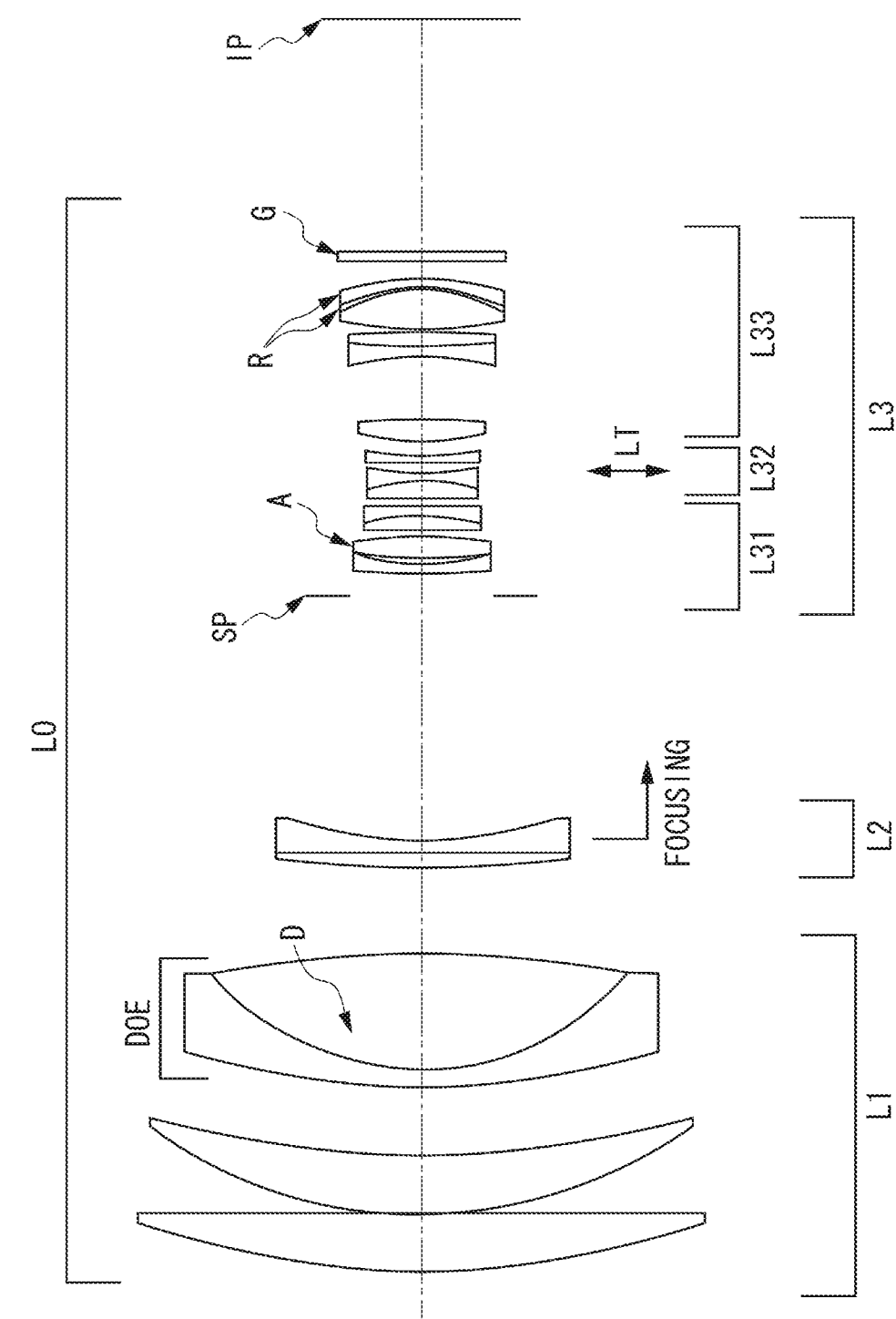
FIGS. 13A and 13B are a lens sectional view and aberration diagrams at an infinite distance of an object of a photographic optical system according to a thirteenth exemplary embodiment of the present invention.
Figure 13B:
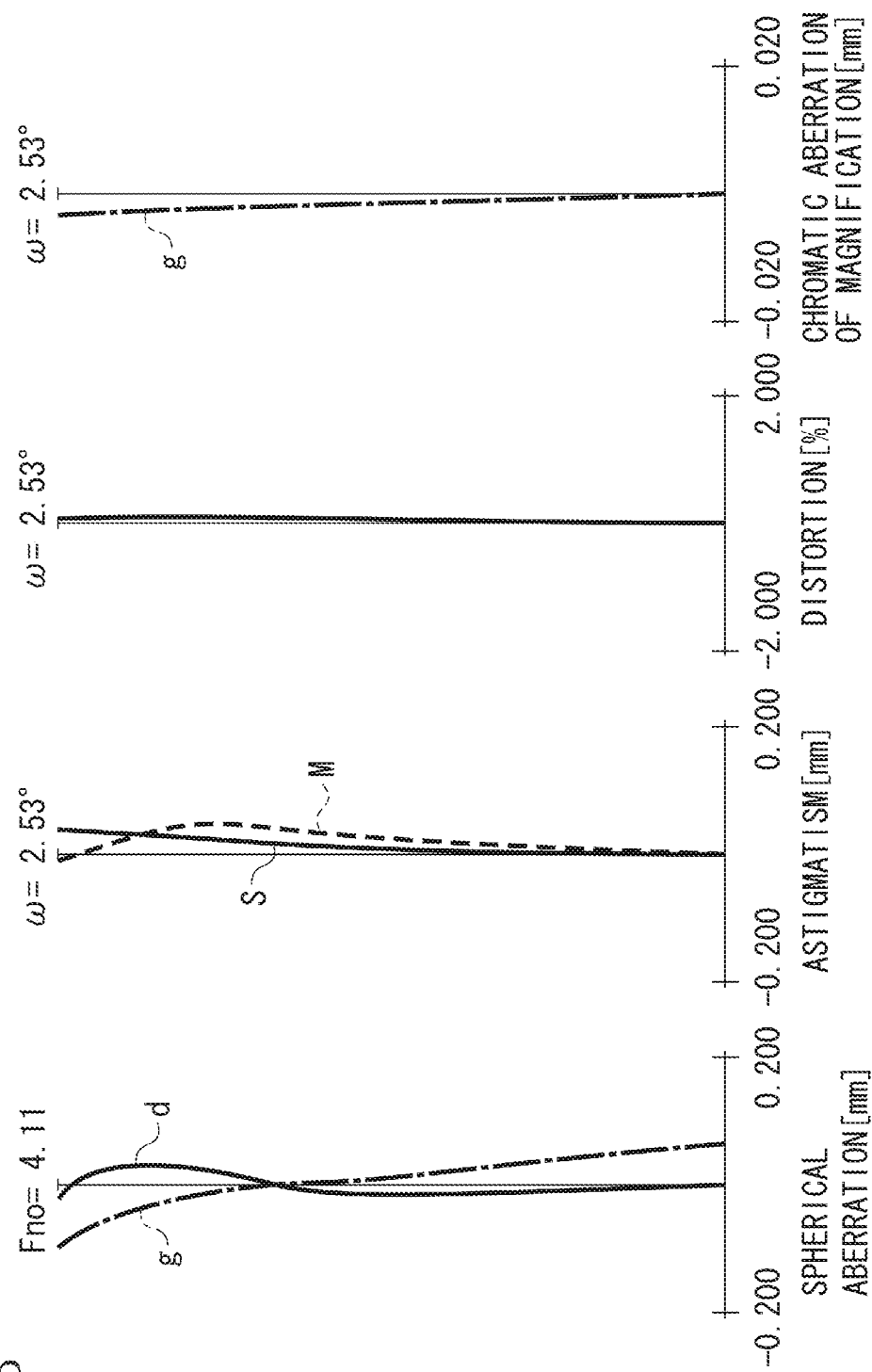

The photographic optical system L0 according to the thirteenth exemplary embodiment illustrated in FIG. 13A will be described. The first lens unit L1 includes three positive lenses, including a meniscus shape positive lens, and one negative lens. One cemented lens is provided, and the cemented lens includes a diffractive optical element DOE. The diffractive optical section D constituting the diffractive optical element DOE is disposed on a cemented surface of the cemented lens. The meniscus shape positive lens corresponding to Conditions (14) and (15) is the second positive lens when counted from the object side.

A lens surface of the positive lens closest to the object side of the first lens unit L1 and a surface of the second positive lens which contact air on the object side have an aspheric shape. The second lens unit L2 includes a cemented lens composed of a positive lens and a negative lens. The aperture portion SP for determining an axial maximum light flux diameter is an aperture stop having a variable aperture diameter and is disposed between the second lens unit L2 and the third lens unit L3. In the third lens unit L3, the first lens subunit L31 includes two cemented lenses. The cemented lens on the object side is a cemented lens including one negative lens and two positive lenses, and the positive lens at the center corresponds to the optical element A.

The cemented lens on the image side includes a cemented lens including one positive lens and one negative lens. The second lens subunit L32 includes one cemented lens where a positive lens and a negative lens are cemented to each other, and one negative lens. The third lens subunit L33 includes one positive lens and two cemented lenses. The cemented lens on the object side is a cemented lens including one negative lens and one positive lens. The cemented lens on the image side is a cemented lens including one positive lens and two negative lenses, and both the two negative lenses correspond to the optical element R.

The object-side surface of the positive lens closest to the object side of the third lens subunit L33 has an aspheric shape. Further, focusing from an infinitely distant object to a close object is performed by moving the second lens unit L2 towards the image plane side along the optical axis.

The photographic optical system L0 according to the fourteenth exemplary embodiment illustrated in FIG. 14A will be described. The first lens unit L1 includes three positive lenses, including a meniscus shape positive lens, and one negative lens. One cemented lens is provided, and the cemented lens includes a diffractive optical element DOE. The diffractive optical section D constituting the diffractive optical element DOE is disposed on a cemented surface of the cemented lens. The meniscus shape positive lens corresponding to Conditions (14) and (15) is the second positive lens when counted from the object side.

A lens surface of the positive lens closest to the object side of the first lens unit L1, and a surface of the meniscus shape positive lens which contact air on the object side have an aspheric shape. The second lens unit L2 includes a cemented lens composed of a positive lens and a negative lens. The aperture portion SP for determining an axial maximum light flux diameter is an aperture stop having a variable aperture diameter and is disposed between the second lens unit L2 and the third lens unit L3. In the third lens unit L3, the first lens subunit L31 includes two cemented lenses. The cemented lens on the object side is a cemented lens including a negative lens and a positive lens, and constitutes a diffractive optical element DOE. A diffractive optical section D is disposed on the cemented surface.

The diffractive optical element DOE corresponds to the optical element A. The cemented lens on the image side includes a cemented lens including a positive lens and a negative lens. A surface closest to the object side of the cemented lens on the image side has an aspheric shape. The second lens subunit L32 includes one cemented lens where a positive lens and a negative lens are cemented to each other, and one negative lens. The third lens subunit L33 includes one positive lens and two cemented lenses. The cemented lens on the object side is a cemented lens including one positive lens and one negative lens.

The cemented lens on the image side is a cemented lens including one positive lens and two negative lenses, and both the two negative lenses correspond to the optical element R. An object-side surface of the positive lens closest to the object side of the third lens subunit L33, and a surface closest to the image side of the cemented lens on the object side of the two cemented lenses have an aspheric shape. Further, focusing from an infinitely distant object to a close object is performed by moving the second lens unit L2 towards the image plane side along the optical axis.

Hereinafter, numerical examples 1 to 14 corresponding to the first to fourteenth exemplary embodiments of the present invention will be set forth. In the numerical examples, i represents the order of surfaces counted from the object side, ri represents a radius of curvature of the i-th surface counted from the object side, di represents a distance between the i-th and (i+1)th surfaces counted from the object side, and ndi and vdi represent a refractive index and an Abbe number of the i-th optical member, respectively. f, Fno, and 2ω represent a focal length of the entire photographic optical system when an infinitely distant object is focused, an F-number thereof, and an angle of view (degree) thereof. BF is a back focus in an air conversion value.

In the numerical examples, two surfaces closest to the image side constitute a glass block G such as a filter. A diffractive optical element (diffractive surface) gives a phase coefficient of a phase function of the above-described Equation (a). When the optical axis direction is the X-axis, a direction perpendicular to the optical axis is the H-axis, a progress direction of light is positive, R is a paraxial radius of curvature, k is an eccentricity, and A4, A6, A8, and A10 are aspheric coefficients, an aspheric shape is represented by the following equation:

$$X = \frac{\left(\frac{H^2}{R}\right)}{\left\{1 + \sqrt{1 - (1+K) \cdot \left(\frac{H}{R}\right)^2}\right\}} + A4 \cdot H^4 + A6 \cdot H^6 + A8 \cdot H^8 + A10 \cdot H^{10}$$

Further, for example, 'e-Z' means '$10^{-Z}$.' In Table-1, Table-2, and Table-3, material characteristics of the optical elements A and R and numbers of the numerical examples used are set forth. Refractive index of the particle dispersion material of $TiO_2$ or ITO is calculated by using a value using the above-described Equation (A). Further, the relationships between various values in the above conditions and numerical examples are set forth in Table-4.

Numerical Example 1

| Surface number | r | d | nd | vd | Effective diameter | θgF | ΔθgF |
|---|---|---|---|---|---|---|---|
| 1(Aspheric) | 143.500 | 27.89 | 1.48749 | 70.2 | 141.99 | 0.53026 | 0.00244 |
| 2 | −344.515 | 0.10 | | | 140.84 | | |
| 3(Aspheric) | 110.105 | 11.37 | 1.80518 | 25.4 | 124.25 | 0.61655 | 0.01623 |
| 4 | 152.607 | 29.31 | | | 120.53 | | |
| 5 | 336.541 | 4.20 | 1.80000 | 29.8 | 98.17 | 0.60187 | 0.00870 |
| 6(Diffractive) | 61.502 | 23.85 | 1.49700 | 81.5 | 85.53 | 0.53859 | 0.02916 |
| 7 | −351.226 | 19.00 | | | 83.47 | | |
| 8 | 1249.400 | 5.00 | 1.80809 | 22.8 | 62.48 | 0.63070 | 0.02607 |
| 9 | −218.694 | 4.00 | 1.74950 | 35.3 | 61.21 | 0.58180 | −0.00249 |
| 10 | 79.873 | 51.11 | | | 55.14 | | |
| 11(Aperture stop) | ∞ | 10.00 | | | 36.05 | SP | |
| 12 | 345.341 | 2.00 | 1.66998 | 39.3 | 31.76 | | |
| 13 | ∞ | 0.10 | 1.63555 | 22.7 | 31.30 | 0.68947 | 0.08477A |
| 14 | 63.047 | 5.40 | 1.48749 | 70.2 | 30.72 | | |
| 15 | −72.407 | 5.00 | | | 30.22 | | |
| 16(Aspheric) | 104.756 | 5.00 | 1.66680 | 33.0 | 25.39 | | |
| 17 | −32.741 | 2.00 | 1.88300 | 40.8 | 24.49 | | |
| 18 | 133.333 | 4.56 | | | 22.87 | | |
| 19 | 9565.297 | 2.81 | 1.84666 | 23.8 | 22.61 | | |
| 20 | −89.759 | 1.70 | 1.77250 | 49.6 | 22.61 | | |
| 21 | 49.389 | 2.56 | | | 22.56 | | |
| 22 | −616.574 | 2.50 | 1.77250 | 49.6 | 22.96 | | |
| 23 | 71.153 | 5.00 | | | 23.72 | | |
| 24(Aspheric) | 54.306 | 6.91 | 1.69895 | 30.1 | 27.67 | | |
| 25 | −56.326 | 1.00 | | | 28.18 | | |
| 26 | −85.487 | 7.70 | 1.65412 | 39.7 | 28.01 | | |
| 27 | −19.486 | 2.50 | 1.88300 | 40.8 | 28.21 | | |
| 28(Aspheric) | 214.612 | 6.94 | | | 30.86 | | |
| 29 | 315.386 | 10.88 | 1.72825 | 28.5 | 35.50 | | |
| 30 | −25.893 | 0.10 | 1.63555 | 22.7 | 36.42 | 0.68947 | 0.08477R |
| 31 | −30.938 | 2.50 | 1.80809 | 22.8 | 36.78 | 0.63070 | 0.02607R |
| 32 | −58.806 | 15.00 | | | 38.59 | | |
| 33 | ∞ | 2.00 | 1.51633 | 64.1 | 39.82 | | |
| 34 | ∞ | 50.00 | | | 39.91 | | |

-continued f = 585.00 mm Fno = 4.12 2ω = 4.24

Image plane ∞
ΔθgF = θgF − (−1.61783 × 10⁻³ × ν_d + 0.64146)

Aspheric data

First surface

K = −5.36219e−001 A4 = −4.38319e−008 A6 = −9.70226e−012
A8 = 2.00162e−016 A10 = 1.90520e−020
Third surface K = 2.67048e−001 A4 = −1.60710e−008 A6 = 5.33974e−012
A8 = 3.49742e−016 A10 = 9.38821e−020 A12 = −2.46635e−024
Sixteenth surface K = 7.12477e+000 A4 = 1.70334e−006 A6 = 1.40930e−010
A8 = 1.19656e−011 A10 = −2.80897e−014 A12 = 8.86014e−017
Twenty-fourth surface K = 6.81383e+000 A4 = −8.39426e−006 A6 = 2.76223e−011
A8 = −9.02197e−012 A10 = 3.58214e−015 A12 = −1.17645e−016
Twenty-eighth surface K = −1.08447e+002 A4 = −2.19655e−006 A6 = 1.78747e−009
A8 = 4.96486e−012 A10 = −1.33320e−014 A12 = 2.45735e−017
Sixth surface (Diffractive surface)

C2 = −5.44933e−005 C4 = 4.66718e−009 C6 = −6.04273e−012
C8 = 1.55700e−015

Data

| | |
|---|---|
| Zoom ratio | 1.00 |
| Focal length | 585.00 |
| F-number | 4.12 |
| Half angle of view | 2.12 |
| Image height | 21.64 |
| Entire length of lens | 330.00 |
| BF | 50.00 |
| Entrance pupil position | 762.88 |
| Exit pupil position | −123.97 |
| Front principal point position | −619.22 |
| Rear principal point position | −535.00 |

Lens unit data

| Unit | Starting surface | Focal length | Length of lens | Front principal point position | Rear principal point position |
|---|---|---|---|---|---|
| 1 | 1 | 159.19 | 96.73 | 0.26 | −71.67 |
| 2 | 8 | −118.58 | 9.00 | 5.53 | 0.46 |
| 3 | 11 | −336.91 | 104.16 | −57.70 | −193.60 |
| 31 | 11 | 4421.31 | 29.50 | −343.01 | −339.43 |
| 32 | 19 | −36.35 | 9.57 | 4.21 | −2.15 |
| 33 | 24 | 66.73 | 55.53 | 15.01 | −32.60 |

Single lens data

| Lens | Starting surface | Focal length |
|---|---|---|
| 1 | 1 | 211.77 |
| 2 | 3 | 438.68 |
| 3 | 5 | −95.69 |
| 4 | 6 | 106.15 |
| 5 | 8 | 230.67 |
| 6 | 9 | −77.61 |
| 7 | 12 | 515.80 |
| 8 | 13 | −99.21 |
| 9 | 14 | 70.05 |
| 10 | 16 | 37.96 |
| 11 | 17 | −29.60 |
| 12 | 19 | 105.04 |
| 13 | 20 | −41.02 |
| 14 | 22 | −82.45 |
| 15 | 24 | 40.60 |
| 16 | 26 | 36.88 |
| 17 | 27 | −20.13 |
| 18 | 29 | 33.30 |

-continued

| | | f = 585.00 mm Fno = 4.12 2ω = 4.24 | |
|---|---|---|---|
| | 19 | 30 | −251.75 |
| | 20 | 31 | −84.16 |
| | G | 33 | 0.00 |

Numerical Example 2

| | | | f = 778.98 mm Fno = 5.80 2ω = 3.18 | | | | |
|---|---|---|---|---|---|---|---|
| Surface number | r | d | nd | νd | Effective diameter | θgF | ΔθgF |
| 1(Aspheric) | 135.459 | 11.62 | 1.48749 | 70.2 | 134.31 | 0.53026 | 0.00244 |
| 2(Diffractive) | 252.103 | 8.59 | 1.48749 | 70.2 | 133.16 | 0.53026 | 0.00244 |
| 3 | 929.187 | 0.10 | | | 132.50 | | |
| 4(Aspheric) | 163.970 | 8.12 | 1.71736 | 29.5 | 127.83 | 0.60494 | 0.01124 |
| 5 | 307.697 | 23.34 | | | 126.96 | | |
| 6(Aspheric) | 433.268 | 5.50 | 1.72047 | 34.7 | 111.51 | 0.58361 | −0.00167 |
| 7 | 77.354 | 25.69 | 1.43875 | 94.9 | 100.47 | 0.53463 | 0.04681 |
| 8 | −565.823 | 105.97 | | | 98.79 | | |
| 9 | 455.352 | 3.11 | 1.80809 | 22.8 | 36.00 | 0.64947 | 0.02607 |
| 10 | −206.044 | 2.00 | 1.83400 | 37.2 | 35.30 | 0.57754 | −0.00379 |
| 11 | 77.824 | 32.79 | | | 33.73 | | |
| 12 | 97.167 | 1.88 | 1.80100 | 35.0 | 25.59 | | |
| 13 | 44.879 | 0.20 | 1.70877 | 21.6 | 24.87 | 0.81721 | 0.21074A |
| 14 | 37.519 | 4.71 | 1.51742 | 52.4 | 24.73 | | |
| 15 | −122.250 | 0.50 | | | 24.36 | | |
| 16(Aperture stop) | ∞ | 1.50 | | | 23.92 | SP | |
| 17 | 222.001 | 2.80 | 1.80809 | 22.8 | 23.20 | | |
| 18 | −70.862 | 1.94 | 1.83481 | 42.7 | 22.78 | | |
| 19 | 53.241 | 2.65 | | | 21.76 | | |
| 20 | −171.976 | 1.90 | 1.74100 | 52.6 | 21.62 | | |
| 21 | 123.601 | 1.76 | | | 21.57 | | |
| 22(Aspheric) | 36.361 | 3.58 | 1.61772 | 49.8 | 21.88 | | |
| 23 | 107.736 | 18.85 | | | 21.43 | | |
| 24 | 68.677 | 9.21 | 1.60342 | 38.0 | 22.52 | | |
| 25 | −24.760 | 2.00 | 1.88300 | 40.8 | 22.51 | | |
| 26 | −113.267 | 5.00 | | | 23.12 | | |
| 27 | −45.150 | 2.00 | 1.59282 | 68.6 | 23.51 | | |
| 28 | 77.849 | 4.04 | | | 24.69 | | |
| 29 | 85.268 | 4.50 | 1.72000 | 50.2 | 27.37 | | |
| 30 | −1955.416 | 0.10 | 1.55324 | 39.8 | 28.09 | 0.66403 | 0.08696R |
| 31 | 86.091 | 7.15 | 1.51823 | 58.9 | 28.40 | | |
| 32 | −70.219 | 6.42 | | | 29.50 | | |
| 33 | ∞ | 2.20 | 1.51633 | 64.1 | 30.75 | | |
| 34 | ∞ | 78.32 | | | 30.98 | | |
| Image plane | ∞ | | | | | | |

$\Delta\theta gF = \theta gF - (-1.61783 \times 10^{-3} \times \nu_d + 0.64146)$

| Aspheric data |
|---|
| First surface |
| K = −2.49787e−001 A4 = −1.01371e−008 A6 = −1.77123e−012 |
| A8 = 7.92508e−017 A10 = −6.54223e−020 A12 = 3.78832e−024 |
| Fourth surface |
| K = 2.35778e−001 A4 = 8.06159e−009 A6 = 1.79360e−013 |
| A8 = 4.00297e−016 A10 = −2.96120e−020 A12 = 3.66584e−024 |
| Sixth surface |
| K = −1.55835e+001 A4 = 5.43228e−010 A6 = 8.26476e−014 |
| A8 = 7.85168e−016 A10 = −2.22865e−019 A12 = 2.37124e−023 |
| Twenty-second surface |
| K = 6.93018e−001 A4 = −6.12781e−007 A6 = 4.85663e−011 |
| A8 = 2.57050e−013 A10 = −1.02830e−014 A12 = 2.95970e−017 |

-continued f = 778.98 mm Fno = 5.80 2ω = 3.18

Second surface (Diffractive surface)

C2 = −1.23591e−005 C4 = 1.39309e−009 C6 = −9.52925e−013
C8 = 4.03345e−016 C10 = −7.87781e−020 C12 = 5.66494e−024

Data

| | |
|---|---|
| Zoom ratio | 1.00 |
| Focal length | 778.98 |
| F-number | 5.80 |
| Half angle of view | 1.59 |
| Image height | 21.64 |
| Entire length of lens | 390.02 |
| BF | 78.32 |
| Entrance pupil position | 1522.98 |
| Exit pupil position | −75.28 |
| Front principal point position | 1648.57 |
| Rear principal point position | −700.66 |

Lens unit data

| Unit | Starting surface | Focal length | Length of lens | Front principal point position | Rear principal point position |
|---|---|---|---|---|---|
| 1 | 1 | 238.24 | 82.95 | −7.75 | −69.01 |
| 2 | 9 | −110.92 | 5.11 | 3.37 | 0.54 |
| 3 | 12 | −377.17 | 84.88 | −28.54 | −111.92 |
| 31 | 12 | 187.57 | 7.28 | 1.89 | −2.92 |
| 32 | 17 | −43.62 | 9.28 | 4.52 | −1.81 |
| 33 | 22 | 83.50 | 65.05 | 8.80 | −52.88 |

Single lens data

| Lens | Starting surface | Focal length |
|---|---|---|
| 1 | 1 | 573.57 |
| 2 | 2 | 694.59 |
| 3 | 4 | 478.06 |
| 4 | 6 | −131.55 |
| 5 | 7 | 157.01 |
| 6 | 9 | 175.91 |
| 7 | 10 | −67.52 |
| 8 | 12 | −105.81 |
| 9 | 13 | −326.50 |
| 10 | 14 | 56.05 |
| 11 | 17 | 66.76 |
| 12 | 18 | −36.16 |
| 13 | 20 | −96.79 |
| 14 | 22 | 87.18 |
| 15 | 24 | 31.32 |
| 16 | 25 | −36.27 |
| 17 | 27 | −47.91 |
| 18 | 29 | 113.59 |
| 19 | 30 | −149.05 |
| 20 | 31 | 75.81 |
| G | 33 | 0.00 |

Numerical Example 3 f = 584.99 mm Fno = 4.12 2ω = 4.24

| Surface number | r | d | nd | vd | Effective diameter | θgF | ΔθgF |
|---|---|---|---|---|---|---|---|
| 1(Aspheric) | 140.883 | 28.06 | 1.48749 | 70.2 | 141.99 | 0.53026 | 0.00244 |
| 2 | −357.933 | 1.13 | | | 140.78 | | |
| 3(Aspheric) | 121.537 | 10.32 | 1.80518 | 25.4 | 125.27 | 0.61655 | 0.01623 |
| 4 | 166.356 | 31.97 | | | 121.81 | | |
| 5 | 345.343 | 4.20 | 1.80000 | 29.8 | 97.77 | 0.60187 | 0.00870 |

-continued

| | | | | | | | |
|---|---|---|---|---|---|---|---|
| f = 584.99 mm Fno = 4.12 2ω = 4.24 | | | | | | | |
| 6(Diffractive) | 65.912 | 22.81 | 1.49700 | 81.5 | 86.56 | 0.53859 | 0.02916 |
| 7 | −269.985 | 19.00 | | | 85.00 | | |
| 8 | 992.843 | 5.00 | 1.80809 | 22.8 | 62.67 | 0.63070 | 0.02607 |
| 9 | −218.883 | 4.00 | 1.74950 | 35.3 | 61.42 | 0.58180 | −0.00249 |
| 10 | 75.849 | 50.84 | | | 55.03 | | |
| 11(Aperture stop) | ∞ | 10.00 | | | 36.34 | SP | |
| 12 | 69.054 | 2.00 | 1.74000 | 28.3 | 31.50 | | |
| 13 | 37.677 | 6.19 | 1.48749 | 70.2 | 30.07 | | |
| 14 | −94.121 | 5.00 | | | 29.37 | | |
| 15(Aspheric) | −415.854 | 5.07 | 1.75520 | 27.5 | 24.87 | | |
| 16 | −26.280 | 0.10 | 1.78927 | 17.6 | 23.96 | 0.79406 | 0.18112A |
| 17 | −30.240 | 2.00 | 1.88300 | 40.8 | 23.75 | | |
| 18 | 239.694 | 4.32 | | | 22.44 | | |
| 19 | −10434.681 | 2.81 | 1.84666 | 23.8 | 22.40 | | |
| 20 | −85.408 | 1.70 | 1.77250 | 49.6 | 22.39 | | |
| 21 | 48.171 | 2.47 | | | 22.33 | | |
| 22 | −1096.849 | 2.50 | 1.77250 | 49.6 | 22.72 | | |
| 23 | 65.887 | 5.00 | | | 23.46 | | |
| 24(Aspheric) | 56.454 | 4.20 | 1.63980 | 34.5 | 27.44 | | |
| 25 | −239.526 | 1.68 | | | 27.74 | | |
| 26 | 198.184 | 11.11 | 1.65412 | 39.7 | 28.16 | | |
| 27 | −16.899 | 2.50 | 1.88300 | 40.8 | 28.29 | | |
| 28(Aspheric) | 244.015 | 4.41 | | | 32.10 | | |
| 29 | −24117.750 | 10.01 | 1.75520 | 27.5 | 35.19 | | |
| 30 | −26.512 | 0.10 | 1.69591 | 17.7 | 36.34 | 0.68555 | 0.07268R |
| 31 | −31.826 | 2.50 | 1.80809 | 22.8 | 36.86 | 0.63070 | 0.02607R |
| 32 | −47.592 | 15.00 | | | 38.67 | | |
| 33 | ∞ | 2.00 | 1.51633 | 64.1 | 39.93 | | |
| 34 | ∞ | 50.00 | | | 40.01 | | |
| Image plane | ∞ | | | | | | |

$\Delta\theta gF = \theta gF - (-1.61783 \times 10^{-3} \times \nu_d + 0.64146)$ Aspheric data First surface K = −5.59268e−001 A4 = −4.44565e−008 A6 = −1.02063e−011
A8 = 9.30805e−017 A10 = 2.38128e−020
Third surface K = 2.77040e−001 A4 = −1.73358e−008 A6 = 6.07967e−012
A8 = 3.11909e−016 A10 = 1.00471e−019 A12 = −6.53323e−024
Fifteenth surface K = −4.87432e+002 A4 = 1.98461e−006 A6 = −5.20952e−011
A8 = 7.18340e−012 A10 = −2.71170e−014 A12 = 7.59721e−017
Twenty-fourth surface K = 9.21532e+000 A4 = −8.98854e−006 A6 = 4.15726e−009
A8 = −2.43337e−012 A10 = −4.88510e−015 A12 = 5.08788e−017
Twenty-eighth surface K = −7.71583e+000 A4 = −4.60850e−006 A6 = 4.14665e−009
A8 = −2.54425e−012 A10 = 4.64372e−015 A12 = 2.84033e−018
Sixth surface (Diffractive surface)

C2 = −5.31883e−005 C4 = 5.73444e−009 C6 = −5.70891e−012
C8 = 1.41962e−015

Data

| | |
|---|---|
| Zoom ratio | 1.00 |
| Focal length | 584.99 |
| F-number | 4.12 |
| Half angle of view | 2.12 |
| Image height | 21.64 |
| Entire length of lens | 330.00 |
| BF | 50.00 |
| Entrance pupil position | 758.40 |
| Exit pupil position | −124.24 |

-continued

| f = 584.99 mm Fno = 4.12 2ω = 4.24 | |
|---|---|
| Front principal point position | −620.71 |
| Rear principal point position | −535.00 |

Lens unit data

| Unit | Starting surface | Focal length | Length of lens | Front principal point position | Rear principal point position |
|---|---|---|---|---|---|
| 1 | 1 | 156.84 | 98.49 | 7.06 | −70.21 |
| 2 | 8 | −114.24 | 9.00 | 5.62 | 0.54 |
| 3 | 11 | −343.07 | 102.67 | −56.56 | −191.97 |
| 31 | 11 | 6243.13 | 30.36 | −671.81 | −627.58 |
| 32 | 19 | −35.22 | 9.48 | 4.17 | −2.10 |
| 33 | 24 | 65.67 | 53.51 | 15.58 | −29.80 |

Single lens data

| Lens | Starting surface | Focal length |
|---|---|---|
| 1 | 1 | 211.27 |
| 2 | 3 | 508.10 |
| 3 | 5 | −103.63 |
| 4 | 6 | 107.84 |
| 5 | 8 | 222.35 |
| 6 | 9 | −74.72 |
| 7 | 12 | −115.18 |
| 8 | 13 | 56.06 |
| 9 | 15 | 36.94 |
| 10 | 16 | −257.14 |
| 11 | 17 | −30.30 |
| 12 | 19 | 101.70 |
| 13 | 20 | −39.65 |
| 14 | 22 | −80.38 |
| 15 | 24 | 71.80 |
| 16 | 26 | 24.30 |
| 17 | 27 | −17.82 |
| 18 | 29 | 35.14 |
| 19 | 30 | −229.91 |
| 20 | 31 | −127.96 |
| G | 33 | 0.00 |

Numerical Example 4

| f = 585.03 mm Fno = 4.12 2ω = 4.24 | | | | | | |
|---|---|---|---|---|---|---|
| Surface number | r | d | nd | vd | Effective diameter | θgF | ΔθgF |
| 1(Aspheric) | 146.839 | 28.52 | 1.48749 | 70.2 | 142.00 | 0.53026 | 0.00244 |
| 2 | −390.488 | 0.10 | | | 140.42 | | |
| 3(Aspheric) | 135.101 | 10.12 | 1.80518 | 25.4 | 127.54 | 0.61655 | 0.01623 |
| 4 | 181.349 | 39.16 | | | 123.87 | | |
| 5 | 320.186 | 4.20 | 1.80000 | 29.8 | 95.08 | 0.60187 | 0.00870 |
| 6(Diffractive) | 70.288 | 21.57 | 1.49700 | 81.5 | 85.64 | 0.53859 | 0.02916 |
| 7 | −276.188 | 19.00 | | | 83.87 | | |
| 8 | 840.171 | 5.00 | 1.80809 | 22.8 | 62.61 | 0.63070 | 0.02607 |
| 9 | −212.282 | 4.00 | 1.74950 | 35.3 | 61.47 | 0.58180 | −0.00249 |
| 10 | 73.312 | 50.00 | | | 55.09 | | |
| 11 | 96.664 | 6.50 | 1.48749 | 70.2 | 38.21 | | |
| 12 | −61.285 | 0.10 | 1.69591 | 17.7 | 37.59 | 0.68555 | 0.07268A |
| 13 | −163.918 | 2.50 | 1.77250 | 49.6 | 37.11 | SP | |
| 14 | −103.781 | 10.00 | | | 36.68 | | |
| 15(Aspheric) | −799.707 | 5.00 | 1.84666 | 23.8 | 28.27 | | |
| 16 | −37.967 | 2.00 | 1.88300 | 40.8 | 27.32 | | |
| 17 | 146.172 | 4.33 | | | 25.54 | | |
| 18 | 310.779 | 2.81 | 1.84666 | 23.8 | 23.52 | | |
| 19 | −145.401 | 1.70 | 1.77250 | 49.6 | 22.87 | | |
| 20 | 51.639 | 2.24 | | | 22.30 | | |
| 21 | 1334.000 | 2.50 | 1.77250 | 49.6 | 22.57 | | |
| 22 | 58.871 | 5.00 | | | 23.04 | | |
| 23(Aspheric) | 48.982 | 4.68 | 1.51633 | 64.1 | 26.39 | | |
| 24 | −208.030 | 1.00 | | | 26.65 | | |

-continued f = 585.03 mm Fno = 4.12 2ω = 4.24

| | | | | | | | |
|---|---|---|---|---|---|---|---|
| 25 | 55.771 | 10.67 | 1.65412 | 39.7 | 26.98 | | |
| 26 | −18.080 | 2.50 | 1.88300 | 40.8 | 26.56 | | |
| 27(Aspheric) | 71.750 | 8.68 | | | 27.94 | | |
| 28 | 164.847 | 1.50 | 1.80400 | 46.6 | 32.65 | | |
| 29 | 49.314 | 0.10 | 1.78927 | 17.6 | 33.41 | 0.79406 | 0.18112R |
| 30 | 39.380 | 7.51 | 1.75520 | 27.5 | 33.62 | | |
| 31 | −89.201 | 15.00 | | | 34.13 | | |
| 32 | ∞ | 2.00 | 1.51633 | 64.1 | 36.36 | | |
| 33 | ∞ | 50.00 | | | 36.54 | | |
| Image plane | ∞ | | | | | | |

$\Delta\theta gF = \theta gF - (-1.61783 \times 10^{-3} \times \nu_d + 0.64146)$

Aspheric data

First surface

K = −5.30342e−001 A4 = −4.39883e−008 A6 = −9.13052e−012
A8 = 1.32962e−016 A10 = 1.49969e−020

Third surface

K = 2.89260e−001 A4 = −1.33880e−008 A6 = 5.72482e−012
A8 = 1.41313e−016 A10 = 6.18876e−020 A12 = −4.82699e−024

Fifteenth surface

K = −2.81543e+003 A4 = 8.54475e−007 A6 = −8.91254e−010
A8 = 7.74200e−012 A10 = −3.78936e−014 A12 = 6.65487e−017

Twenty-third surface

K = 6.61956e+000 A4 = −8.02166e−006 A6 = 8.26547e−009
A8 = −1.27460e−011 A10 = 6.46150e−014 A12 = −1.38360e−016

Twenty-seventh surface

K = −1.22546e+001 A4 = −1.87544e−006 A6 = 1.71134e−009
A8 = −8.54076e−013 A10 = −1.91425e−015 A12 = 1.95969e−017

Sixth surface (Diffractive surface)

C2 = −5.78816e−005 C4 = 6.06887e−009 C6 = −4.71183e−012
C8 = 1.13624e−015

Data

| | |
|---|---|
| Zoom ratio | 1.00 |
| Focal length | 585.03 |
| F-number | 4.12 |
| Half angle of view | 2.12 |
| Image height | 21.64 |
| Entire length of lens | 330.00 |
| BF | 50.00 |
| Entrance pupil position | 824.25 |
| Exit pupil position | −83.75 |
| Front principal point position | −1149.56 |
| Rear principal point position | −535.03 |

Lens unit data

| Unit | Starting surface | Focal length | Length of lens | Front principal point position | Rear principal point position |
|---|---|---|---|---|---|
| 1 | 1 | 162.94 | 103.67 | 10.05 | −74.01 |
| 2 | 8 | −111.98 | 9.00 | 5.70 | 0.61 |
| 3 | 11 | −217.95 | 98.33 | 25.65 | −65.73 |
| 31 | 11 | 651.13 | 26.10 | −80.84 | −89.12 |
| 32 | 18 | −40.65 | 9.25 | 4.70 | −1.39 |
| 33 | 23 | 76.07 | 53.64 | 7.77 | −38.85 |

Single lens data

| Lens | Starting surface | Focal length |
|---|---|---|
| 1 | 1 | 222.77 |
| 2 | 3 | 599.43 |
| 3 | 5 | −114.92 |
| 4 | 6 | 113.64 |
| 5 | 8 | 210.15 |
| 6 | 9 | −72.27 |
| 7 | 11 | 77.99 |
| 8 | 12 | −140.71 |
| 9 | 13 | 359.67 |

-continued

| | | f = 585.03 mm Fno = 4.12 2ω = 4.24 | |
|---|---|---|---|
| 10 | 15 | | 46.94 |
| 11 | 16 | | −33.96 |
| 12 | 18 | | 117.33 |
| 13 | 19 | | −49.14 |
| 14 | 21 | | −79.80 |
| 15 | 23 | | 77.27 |
| 16 | 25 | | 22.14 |
| 17 | 26 | | −16.14 |
| 18 | 28 | | −88.03 |
| 19 | 29 | | −248.80 |
| 20 | 30 | | 37.11 |
| G | 32 | | 0.00 |

15

Numerical Example 5

| | | | f = 778.99 mm Fno = 5.8 2ω = 3.18 | | | | |
|---|---|---|---|---|---|---|---|
| Surface number | r | d | nd | νd | Effective diameter | θgF | ΔθgF |
| 1(Aspheric) | 139.361 | 11.11 | 1.48749 | 70.2 | 134.31 | 0.53026 | 0.00244 |
| 2(Diffractive) | 252.103 | 8.29 | 1.48749 | 70.2 | 133.18 | 0.53026 | 0.00244 |
| 3 | 806.488 | 0.10 | | | 132.53 | | |
| 4(Aspheric) | 146.542 | 9.35 | 1.71736 | 29.5 | 127.64 | 0.60494 | 0.01124 |
| 5 | 276.031 | 20.94 | | | 126.62 | | |
| 6(Aspheric) | 420.697 | 5.50 | 1.72047 | 34.7 | 112.96 | 0.58361 | −0.00167 |
| 7 | 74.575 | 25.61 | 1.43875 | 94.9 | 101.01 | 0.53463 | 0.04681 |
| 8 | 536.941 | 105.98 | | | 99.80 | | |
| 9 | 439.294 | 3.07 | 1.80809 | 22.8 | 36.00 | 0.63070 | 0.02607 |
| 10 | 222.438 | 2.00 | 1.83400 | 37.2 | 35.29 | 0.57754 | −0.00379 |
| 11 | 77.582 | 32.50 | | | 33.71 | | |
| 12(Aperture stop) | ∞ | 2.50 | | | 25.57 | SP | |
| 13 | 126.792 | 1.88 | 1.88300 | 40.8 | 24.75 | | |
| 14 | 113.880 | 0.10 | 1.55324 | 39.8 | 24.30 | 0.66403 | 0.08696A |
| 15 | 25.509 | 6.96 | 1.48749 | 70.2 | 23.74 | | |
| 16 | 107.190 | 2.18 | | | 23.05 | | |
| 17 | 279.419 | 2.80 | 1.80809 | 22.8 | 21.79 | | |
| 18 | −66.132 | 1.94 | 1.83481 | 42.7 | 21.34 | | |
| 19 | 49.492 | 2.61 | | | 20.36 | | |
| 20 | 189.279 | 1.90 | 1.74100 | 52.6 | 20.21 | | |
| 21 | 126.905 | 1.76 | | | 20.15 | | |
| 22(Aspheric) | 32.447 | 3.58 | 1.56732 | 42.8 | 20.40 | | |
| 23 | 73.141 | 12.94 | | | 20.16 | | |
| 24 | 61.758 | 9.37 | 1.60342 | 38.0 | 22.92 | | |
| 25 | −20.178 | 2.00 | 1.88300 | 40.8 | 22.85 | | |
| 26 | −85.697 | 2.00 | | | 23.73 | | |
| 27 | −39.689 | 2.00 | 1.59282 | 68.6 | 23.84 | | |
| 28 | 98.360 | 5.00 | | | 25.22 | | |
| 29 | 92.427 | 2.00 | 1.80809 | 22.8 | 28.74 | 0.63070 | 0.02607R |
| 30 | 67.056 | 8.05 | 1.61772 | 49.8 | 29.24 | | |
| 31 | −60.214 | 6.42 | | | 30.50 | | |
| 32 | ∞ | 2.20 | 1.51633 | 64.1 | 31.62 | | |
| 33 | ∞ | 85.37 | | | 31.82 | | |
| Image plane | ∞ | | | | | | |

$\Delta\theta gF = \theta gF - (-1.61783 \times 10^{-3} \times v_d + 0.64146)$

| Aspheric data |
|---|
| First surface |

K = −2.63210e−001 A4 = −1.09126e−008 A6 = −1.89944e−012
A8 = 7.14513e−017 A10 = −6.50078e−020 A12 = 3.92826e−024

Fourth surface

K = 2.70728e−001 A4 = 9.85271e−009 A6 = 5.00092e−013
A8 = 4.17302e−016 A10 = −2.59298e−020 A12 = 4.61637e−024

-continued f = 778.99 mm Fno = 5.8 2ω = 3.18

Sixth surface

K = −1.57795e+001 A4 = 4.81264e−010 A6 = 1.37932e−013
A8 = 7.50409e−016 A10 = −2.13499e−019 A12 = 2.11355e−023
Twenty-second surface K = 8.73896e−001 A4 = 2.44599e−007 A6 = 3.21854e−009
A8 = −7.40637e−012 A10 = 4.81842e−014 A12 = −5.31090e−017
Second surface (Diffractive surface)

C2 = −1.25720e−005 C4 = 1.41526e−009 C6 = −9.00170e−013
C8 = 3.87107e−016 C10 = −7.55822e−020 C12 = 5.39578e−024

Data

| | |
|---|---|
| Zoom ratio | 1.00 |
| Focal length | 778.99 |
| F-number | 5.80 |
| Half angle of view | 1.59 |
| Image height | 21.64 |
| Entire length of lens | 390.00 |
| BF | 85.37 |
| Entrance pupil position | 1370.30 |
| Exit pupil position | −82.19 |
| Front principal point position | −1472.15 |
| Rear principal point position | −693.62 |

Lens unit data

| Unit | Starting surface | Focal length | Length of lens | Front principal point position | Rear principal point position |
|---|---|---|---|---|---|
| 1 | 1 | 235.20 | 80.90 | −7.66 | −66.74 |
| 2 | 9 | 111.45 | 5.07 | 3.36 | 0.56 |
| 3 | 12 | 410.24 | 80.18 | −52.47 | −142.37 |
| 31 | 12 | 166.33 | 11.44 | 5.93 | −2.39 |
| 32 | 17 | −40.95 | 9.24 | 4.23 | −2.05 |
| 33 | 22 | 85.33 | 55.56 | 14.04 | −38.72 |

Single lens data

| Lens | Starting surface | Focal length |
|---|---|---|
| 1 | 1 | 609.99 |
| 2 | 2 | 734.77 |
| 3 | 4 | 422.71 |
| 4 | 6 | −126.65 |
| 5 | 7 | 151.17 |
| 6 | 9 | 183.11 |
| 7 | 10 | −68.76 |
| 8 | 13 | −1359.17 |
| 9 | 14 | −59.44 |
| 10 | 15 | 43.01 |
| 11 | 17 | 66.42 |
| 12 | 18 | −33.65 |
| 13 | 20 | −102.26 |
| 14 | 22 | 99.62 |
| 15 | 24 | 26.34 |
| 16 | 25 | −30.32 |
| 17 | 27 | −47.45 |
| 18 | 29 | −313.34 |
| 19 | 30 | 52.63 |
| G | 32 | 0.00 |

Numerical Example 6

| f = 779.33 mm Fno = 5.80 2ω = 3.18 | | | | | | | |
|---|---|---|---|---|---|---|---|
| Surface number | r | d | nd | vd | Effective diameter | θgF | ΔθgF |
| 1(Aspheric) | 137.178 | 18.18 | 1.48749 | 70.2 | 134.37 | 0.53026 | 0.00244 |
| 2 | 1001.817 | 0.10 | | | 133.20 | | |
| 3(Aspheric) | 152.819 | 9.26 | 1.71736 | 29.5 | 128.07 | 0.60494 | 0.01124 |
| 4 | 278.747 | 22.06 | | | 126.77 | | |
| 5(Aspheric) | 419.649 | 5.50 | 1.72047 | 34.7 | 112.42 | 0.58361 | −0.00167 |
| 6(Diffractive) | 77.041 | 25.75 | 1.43875 | 94.9 | 101.04 | 0.53463 | 0.04681 |
| 7 | −488.569 | 105.74 | | | 99.55 | | |
| 8 | 725.622 | 2.72 | 1.80809 | 22.8 | 33.20 | 0.63070 | 0.02607 |
| 9 | −156.914 | 2.00 | 1.83400 | 37.2 | 32.61 | 0.57754 | −0.00379 |
| 10 | 62.996 | 31.99 | | | 30.98 | | |
| 11(Aperture stop) | ∞ | 2.50 | | | 24.80 | SP | |
| 12 | 97.247 | 1.88 | 1.84666 | 23.8 | 24.14 | | |
| 13 | 48.647 | 0.20 | 1.55324 | 39.8 | 23.55 | 0.66403 | 0.08696A |
| 14 | 25.267 | 5.63 | 1.54814 | 45.8 | 23.28 | | |
| 15 | −95.278 | 2.00 | | | 22.91 | | |
| 16 | 405.217 | 3.04 | 1.80809 | 22.8 | 21.75 | | |
| 17 | −82.595 | 1.94 | 1.83481 | 42.7 | 21.20 | | |
| 18 | 47.487 | 3.46 | | | 20.30 | | |
| 19 | −107.493 | 1.90 | 1.74100 | 52.6 | 20.15 | | |
| 20 | 591.860 | 1.76 | | | 20.24 | | |
| 21(Aspheric) | 33.791 | 3.60 | 1.57099 | 50.8 | 20.52 | | |
| 22 | 100.456 | 14.95 | | | 20.53 | | |
| 23 | 63.607 | 9.19 | 1.59551 | 39.2 | 23.44 | | |
| 24 | −23.338 | 2.00 | 1.88300 | 40.8 | 23.32 | | |
| 25 | −74.902 | 3.38 | | | 23.96 | | |
| 26 | −40.203 | 2.00 | 1.59282 | 68.6 | 23.97 | | |
| 27 | 66.168 | 9.50 | | | 25.13 | | |
| 28 | 88.337 | 1.64 | 1.72000 | 46.0 | 31.34 | | |
| 29 | 97.189 | 0.10 | 1.55324 | 39.8 | 31.65 | 0.66403 | 0.08696R |
| 30 | 48.439 | 10.33 | 1.53172 | 48.8 | 32.04 | | |
| 31 | −60.936 | 6.42 | | | 33.45 | | |
| 32 | ∞ | 2.20 | 1.51633 | 64.1 | 34.44 | | |
| 33 | ∞ | 77.07 | | | 34.60 | | |
| Image plane | ∞ | | | | | | |

$\Delta\theta gF = \theta gF - (-1.61783 \times 10^{-3} \times v_d + 0.64146)$

Aspheric data

First surface

K = −2.18681e−001  A4 = −1.98995e−008  A6 = −6.17126e−013
A8 = −1.96139e−016  A10 = −8.09833e−021  A12 = −1.23560e−024
A14 = −2.46605e−029

Third surface

K = 2.27325e−001  A4 = 1.15792e−008  A6 = 1.07490e−012
A8 = 1.55217e−016  A10 = −2.77967e−020  A12 = 4.25574e−024
A14 = 6.06431e−028

Fifth surface

K = −1.66522e+001  A4 = 4.87657e−009  A6 = −4.19291e−012
A8 = 1.99814e−015  A10 = −2.50840e−019  A12 = −6.90513e−026
A14 = 4.48909e−028

Twenty-first surface

K = 6.01970e−001  A4 = −3.56758e−007  A6 = −4.17119e−010
A8 = 3.38294e−011  A10 = −3.79853e−013  A12 = 2.18868e−015
A14 = −5.05275e−018

Sixth surface (Diffractive surface)

C2 = −1.95800e−005  C4 = 1.42876e−009  C6 = −1.55207e−012
C8 = 8.36962e−016  C10 = −1.44012e−019

Data
Zoom ratio 1.00

| | |
|---|---|
| Focal length | 779.33 |
| F-number | 5.80 |
| Half angle of view | 1.59 |
| Image height | 21.64 |
| Entire length of lens | 390.00 |

-continued

| | |
|---|---|
| BF | 77.07 |
| Entrance pupil position | 1495.16 |
| Exit pupil position | −104.89 |
| Front principal point position | −1063.17 |
| Rear principal point position | −702.25 |

Lens unit data

| Unit | Starting surface | Focal length | Length of lens | Front principal point position | Rear principal point position |
|---|---|---|---|---|---|
| 1 | 1 | 226.47 | 80.86 | −5.24 | −65.34 |
| 2 | 8 | −81.61 | 4.72 | 2.82 | 0.22 |
| 3 | 11 | 3189.50 | 89.61 | 700.65 | 793.00 |
| 31 | 11 | 122.32 | 10.21 | 5.11 | −2.25 |
| 32 | 16 | −40.99 | 10.34 | 4.18 | −3.06 |
| 33 | 21 | 85.12 | 65.31 | 18.11 | −50.39 |

Single lens data

| Lens | Starting surface | Focal length |
|---|---|---|
| 1 | 1 | 323.81 |
| 2 | 3 | 457.49 |
| 3 | 5 | −132.54 |
| 4 | 6 | 152.90 |
| 5 | 8 | 159.87 |
| 6 | 9 | −53.68 |
| 7 | 12 | −117.05 |
| 8 | 13 | −95.32 |
| 9 | 14 | 37.05 |
| 10 | 16 | 85.14 |
| 11 | 17 | −35.87 |
| 12 | 19 | −122.63 |
| 13 | 21 | 87.46 |
| 14 | 23 | 29.85 |
| 15 | 24 | −39.10 |
| 16 | 26 | −41.89 |
| 17 | 28 | 1250.06 |
| 18 | 29 | −174.68 |
| 19 | 30 | 52.47 |
| G | 32 | 0.00 |

Numerical Example 7

| f = 585.13 mm Fno = 4.12 2ω = 4.24 | | | | | | | |
|---|---|---|---|---|---|---|---|
| Surface number | r | d | nd | νd | Effective diameter | θgF | ΔθgF |
| 1(Aspheric) | 298.298 | 19.88 | 1.43387 | 95.1 | 142.00 | 0.53728 | 0.04975 |
| 2 | −365.050 | 0.10 | | | 141.39 | | |
| 3 | 96.302 | 11.73 | 1.75520 | 27.5 | 129.87 | 0.61020 | 0.01325 |
| 4 | 138.089 | 0.10 | | | 127.82 | | |
| 5 | 90.156 | 14.78 | 1.43387 | 95.1 | 121.30 | 0.53728 | 0.04975 |
| 6 | 132.784 | 4.20 | | | 116.15 | | |
| 7(Aspheric) | 117.863 | 4.00 | 1.72916 | 54.7 | 111.17 | 0.54423 | −0.00880 |
| 8 | 55.967 | 26.69 | 1.43387 | 95.1 | 93.82 | 0.53728 | 0.04975 |
| 9 | 229.504 | 1.27 | | | 89.27 | | |
| 10 | 141.974 | 4.00 | 1.80518 | 25.4 | 85.72 | 0.61655 | 0.01623 |
| 11 | 59.999 | 18.23 | 1.43387 | 95.1 | 76.43 | 0.53728 | 0.04975 |
| 12 | −600.539 | 11.17 | | | 74.25 | | |
| 13 | 404.192 | 5.00 | 1.80809 | 22.8 | 59.75 | 0.63070 | 0.02607 |
| 14 | −304.112 | 4.00 | 1.88300 | 40.8 | 58.19 | 0.56694 | −0.00857 |
| 15 | 62.229 | 55.13 | | | 51.72 | | |
| 16(Aperture stop) | ∞ | 5.00 | | | 36.09 | SP | |
| 17 | 112.378 | 4.78 | 1.62230 | 53.2 | 34.10 | | |
| 18 | −69.052 | 0.10 | 1.63555 | 22.7 | 33.66 | 0.68947 | 0.08477A |
| 19 | −1506.653 | 3.00 | 1.70154 | 41.2 | 33.02 | | |

-continued

| | | | | | | | |
|---|---|---|---|---|---|---|---|
| 20 | −101.737 | 0.10 | | | 32.50 | | |
| 21(Aspheric) | 84.045 | 6.61 | 1.66680 | 33.0 | 30.26 | | |
| 22 | −49.984 | 2.00 | 1.88300 | 40.8 | 28.28 | | |
| 23 | 63.317 | 5.56 | | | 25.78 | | |
| 24 | 380.257 | 2.81 | 1.84666 | 23.8 | 24.53 | | |
| 25 | −204.448 | 1.70 | 1.77250 | 49.6 | 24.38 | | |
| 26 | 51.956 | 2.90 | | | 24.11 | | |
| 27 | 852.631 | 2.50 | 1.77250 | 49.6 | 24.49 | | |
| 28 | 60.032 | 5.00 | | | 24.94 | | |
| 29(Aspheric) | 55.589 | 5.00 | 1.51633 | 64.1 | 28.21 | | |
| 30 | −315.690 | 1.96 | | | 28.62 | | |
| 31 | 61.472 | 12.00 | 1.65412 | 39.7 | 29.34 | | |
| 32 | −22.131 | 2.50 | 1.88300 | 40.8 | 28.91 | | |
| 33(Aspheric) | 151.077 | 12.00 | | | 30.02 | | |
| 33(Aspheric) | 151.077 | 12.00 | | | 30.02 | | |
| 34 | 667.986 | 6.19 | 1.75520 | 27.5 | 34.46 | | |
| 35 | −97.970 | 1.80 | 1.71270 | 13.9 | 35.30 | 0.56226 | −0.05677R |
| 36 | −67.667 | 2.50 | 1.72916 | 54.7 | 35.49 | | |
| 37 | −124.709 | 5.12 | | | 36.17 | | |
| 38 | ∞ | 2.00 | 1.51633 | 64.1 | 36.94 | | |
| 39 | ∞ | 51.99 | | | 37.09 | | |
| Image plane | ∞ | | | | | | |

$\Delta\theta gF = \theta gF - (-1.61783 \times 10^{-3} \times \nu_d + 0.64146)$ Aspheric data First surface K = 3.81698e+000   A4 = −3.02350e−008   A6 = −3.28199e−012
A8 = 9.76375e−017   A10 = −7.97848e−021

Seventh surface

K = −2.95245e−001   A4 = −2.88118e−008   A6 = 4.98757e−012
A8 = −3.53101e−016   A10 = 5.20607e−020

Twenty-first surface

K = −1.94423e+000   A4 = 1.44040e−006   A6 = −1.70926e−009
A8 = 1.39597e−011   A10 = −4.09767e−014   A12 = 5.18234e−017

Twenty-ninth surface

K = 6.55348e+000   A4 = −4.34386e−006   A6 = 4.90912e−009
A8 = −3.89558e−011   A10 = 1.46557e−013   A12 = −2.88514e−016

Thirty-third surface

K = 0.00000e+000   A4 = −2.60998e−006   A6 = 2.76807e−009
A8 = −4.66931e−012   A10 = 7.52219e−015   A12 = −2.60541e−018

Data
Zoom ratio 1.00

| | |
|---|---|
| Focal length | 585.13 |
| F-number | 4.12 |
| Half angle of view | 2.12 |
| Image height | 21.64 |
| Entire length of lens | 325.41 |
| BF | 51.99 |
| Entrance pupil position | 825.83 |
| Exit pupil position | −81.42 |
| Front principal point position | −1155.31 |
| Rear principal point position | −533.14 |

Lens unit data

| Unit | Starting surface | Focal length | Length of lens | Front principal point position | Rear principal point position |
|---|---|---|---|---|---|
| 1 | 1 | 143.92 | 104.99 | −6.99 | −73.27 |
| 2 | 13 | −81.28 | 9.00 | 5.70 | 0.75 |
| 3 | 16 | −297.76 | 93.13 | 23.40 | −59.73 |
| 31 | 16 | 275.37 | 21.59 | −22.47 | −33.69 |

-continued

| | | | | | |
|---|---|---|---|---|---|
| 32 | 24 | −40.47 | 9.91 | 4.89 | −1.84 |
| 33 | 29 | 78.52 | 51.07 | 7.23 | −35.75 |

Single lens data

| Lens | Starting surface | Focal length |
|---|---|---|
| 1 | 1 | 381.82 |
| 2 | 3 | 375.99 |
| 3 | 5 | 585.79 |
| 4 | 7 | −150.25 |
| 5 | 8 | 163.01 |
| 6 | 10 | −131.93 |
| 7 | 11 | 126.78 |
| 8 | 13 | 215.43 |
| 9 | 14 | −58.21 |
| 10 | 17 | 69.43 |
| 11 | 18 | −113.87 |
| 12 | 19 | 155.39 |
| 13 | 21 | 47.95 |
| 14 | 22 | −31.37 |
| 15 | 24 | 157.39 |
| 16 | 25 | −53.47 |
| 17 | 27 | −83.71 |
| 18 | 29 | 91.96 |
| 19 | 31 | 26.37 |
| 20 | 32 | −21.71 |
| 21 | 34 | 113.53 |
| 22 | 35 | 299.56 |
| 23 | 36 | −206.71 |
| G | 38 | 0.00 |

Numerical Example 8

| f = 489.00 mm Fno = 4.11 2ω = 5.06 | | | | | | |
|---|---|---|---|---|---|---|
| Surface number | r | d | nd | νd | Effective diameter | θgF | ΔθgF |
| 1(Aspheric) | 149.409 | 12.39 | 1.48749 | 70.2 | 119.00 | 0.53026 | 0.00244 |
| 2 | 11617.528 | 0.10 | | | 118.62 | | |
| 3(Aspheric) | 100.036 | 12.95 | 1.72825 | 28.5 | 113.51 | 0.60766 | 0.01224 |
| 4 | 219.458 | 14.49 | | | 112.01 | | |
| 5 | 176.898 | 3.70 | 1.78472 | 25.7 | 98.84 | 0.61584 | 0.01592 |
| 6(Diffractive) | 60.121 | 24.23 | 1.43875 | 94.9 | 87.08 | 0.53463 | 0.04681 |
| 7 | −261.252 | 18.88 | | | 86.06 | | |
| 8 | 225.459 | 3.60 | 1.80809 | 22.8 | 61.96 | 0.63070 | 0.02607 |
| 9 | 13341.367 | 2.50 | 1.88300 | 40.8 | 60.99 | 0.56694 | −0.00857 |
| 10 | 86.176 | 52.56 | | | 56.53 | | |
| 11(Aperture stop) | ∞ | 5.00 | | | 30.32 | SP | |
| 12 | 580.536 | 1.80 | 1.88300 | 40.8 | 27.49 | | |
| 13 | 50.619 | 0.10 | 1.69591 | 17.7 | 26.45 | 0.68555 | 0.07268A |
| 14 | 30.040 | 7.05 | 1.64769 | 33.8 | 26.08 | | |
| 15 | −73.954 | 1.00 | | | 25.29 | | |
| 16 | 337.833 | 3.56 | 1.62588 | 35.7 | 23.66 | | |
| 17 | −42.546 | 2.00 | 1.88300 | 40.8 | 22.86 | | |
| 18 | 306.753 | 2.00 | | | 22.28 | | |
| 19 | −482.181 | 3.39 | 1.80809 | 22.8 | 22.25 | | |
| 20 | −38.717 | 1.61 | 1.72916 | 54.7 | 22.26 | | |
| 21 | 52.643 | 2.08 | | | 22.18 | | |
| 22 | 394.030 | 1.50 | 1.88300 | 40.8 | 22.49 | | |
| 23 | 49.694 | 3.00 | | | 22.82 | | |
| 24(Aspheric) | 40.534 | 7.77 | 1.62004 | 36.3 | 25.46 | | |
| 25 | −38.819 | 2.00 | | | 26.03 | | |
| 26 | −40.235 | 2.00 | 1.88300 | 40.8 | 25.63 | | |
| 27 | 114.124 | 3.00 | 1.68893 | 31.1 | 26.70 | | |
| 28 | 1501.416 | 10.54 | | | 27.31 | | |
| 29 | 75.434 | 6.66 | 1.65412 | 39.7 | 33.23 | | |
| 30 | −71.104 | 0.10 | 1.63555 | 22.7 | 33.50 | 0.68947 | 0.08477R |
| 31 | −170.611 | 1.80 | 1.80809 | 22.8 | 33.62 | 0.63070 | 0.02607R |
| 32 | −1568.565 | 4.00 | | | 33.88 | | |

-continued

| 33 | ∞ | 2.20 | 1.51633 | 64.1 | 34.56 |
|---|---|---|---|---|---|
| 34 | ∞ | 50.42 | | | 34.80 |
| Image plane | ∞ | | | | |

$\Delta\theta gF = \theta gF - (-1.61783 \times 10^{-3} \times v_d + 0.64146)$

Aspheric data

First surface

K = −1.89011e+000  A4 = −2.89567e−008  A6 = −1.30050e−011
A8 = −3.32663e−016  A10 = 2.27119e−019  A12 = −2.39450e−023

Third surface

K = 4.00433e−001  A4 = −3.01010e−008  A6 = 2.00007e−012
A8 = 4.48323e−016  A10 = −2.24115e−019

Twenty-fourth surface

K = 1.20950e+000  A4 = −4.39919e−006  A6 = −3.80449e−009
A8 = 2.96087e−012  A10 = −1.33338e−014

Sixth surface (Diffractive surface)

C2 = −4.23663e−005  C4 = −7.11748e−010  C6 = −2.25513e−012
C8 = 8.99268e−016  C10 = −2.84323e−020

Data
Zoom ratio 1.00

| | |
|---|---|
| Focal length | 489.00 |
| F-number | 4.11 |
| Half angle of view | 2.53 |
| Image height | 21.64 |
| Entire length of lens | 270.00 |
| BF | 50.42 |
| Entrance pupil position | 584.61 |
| Exit pupil position | −62.70 |
| Front principal point position | −1040.33 |
| Rear principal point position | −438.58 |

Lens unit data

| Unit | Starting surface | Focal length | Length of lens | Front principal point position | Rear principal point position |
|---|---|---|---|---|---|
| 1 | 1 | 131.78 | 67.87 | 5.96 | −45.15 |
| 2 | 8 | −153.03 | 6.10 | 5.21 | 1.82 |
| 3 | 11 | −89.95 | 74.17 | 6.09 | −56.99 |
| 31 | 11 | −531.02 | 20.52 | 18.02 | 3.52 |
| 32 | 19 | −33.68 | 8.58 | 4.26 | −1.34 |
| 33 | 24 | 64.53 | 40.08 | 5.89 | −27.33 |

Single lens data

| Lens | Starting surface | Focal length |
|---|---|---|
| 1 | 1 | 310.37 |
| 2 | 3 | 241.40 |
| 3 | 5 | −118.87 |
| 4 | 6 | 112.95 |
| 5 | 8 | 283.76 |
| 6 | 9 | −98.24 |
| 7 | 12 | −62.90 |
| 8 | 13 | −106.39 |
| 9 | 14 | 33.89 |
| 10 | 16 | 60.59 |
| 11 | 17 | −42.20 |
| 12 | 19 | 51.92 |
| 13 | 20 | −30.37 |
| 14 | 22 | −64.53 |
| 15 | 24 | 33.23 |
| 16 | 26 | −33.49 |
| 17 | 27 | 179.12 |
| 18 | 29 | 56.98 |
| 19 | 30 | −191.90 |
| 20 | 31 | −237.03 |
| G | 33 | 0.00 |

Numerical Example 9

| | f = 585.01 mm Fno = 4.12 2ω = 4.24 | | | | | | |
|---|---|---|---|---|---|---|---|
| Surface number | r | d | nd | vd | Effective diameter | θgF | ΔθgF |
| 1(Aspheric) | 153.980 | 34.13 | 1.48749 | 70.2 | 141.99 | 0.53026 | 0.00244 |
| 2 | −258.727 | 0.10 | | | 139.78 | | |
| 3(Aspheric) | 100.549 | 11.73 | 1.80518 | 25.4 | 119.51 | 0.61655 | 0.01623 |
| 4 | 134.917 | 29.00 | | | 114.62 | | |
| 5 | 300.815 | 4.20 | 1.80000 | 29.8 | 92.45 | 0.60187 | 0.00870 |
| 6(Diffractive) | 60.584 | 22.98 | 1.49700 | 81.5 | 80.76 | 0.53859 | 0.02916 |
| 7 | −432.985 | 15.00 | | | 77.53 | | |
| 8 | −519.467 | 5.00 | 1.80809 | 22.8 | 61.63 | 0.63070 | 0.02607 |
| 9 | −140.855 | 4.00 | 1.74950 | 35.3 | 60.45 | 0.58180 | −0.00249 |
| 10 | 79.463 | 49.97 | | | 54.59 | | |
| 11 | 63.774 | 5.00 | 1.48749 | 70.2 | 39.86 | | |
| 12 | 271.921 | 1.50 | 1.92286 | 18.9 | 38.81 | 0.64947 | 0.03858A |
| 13 | 48.717 | 5.00 | | | 37.22 | | |
| 14 (Aperture stop) | ∞ | 2.00 | | | 37.31 | SP | |
| 15 | 43.627 | 2.00 | 1.88300 | 40.8 | 37.73 | | |
| 16 | 25.431 | 11.22 | 1.66680 | 33.0 | 35.70 | | |
| 17 | −78.701 | 5.00 | | | 35.28 | | |
| 18(Aspheric) | 62.633 | 5.00 | 1.72151 | 29.2 | 28.75 | | |
| 19 | −128.336 | 2.00 | 1.88300 | 40.8 | 27.10 | | |
| 20 | 32.438 | 5.76 | | | 24.27 | | |
| 21 | 96.020 | 2.81 | 1.84666 | 23.8 | 23.18 | | |
| 22 | 2185.445 | 1.70 | 1.77250 | 49.6 | 23.09 | | |
| 23 | 56.689 | 2.00 | | | 22.96 | | |
| 24 | 211.577 | 2.50 | 1.77250 | 49.6 | 23.24 | | |
| 25 | 52.583 | 5.00 | | | 23.56 | | |
| 26(Aspheric) | 73.616 | 4.53 | 1.69895 | 30.1 | 26.13 | | |
| 27 | −62.461 | 1.00 | | | 26.50 | | |
| 28 | 466.131 | 7.86 | 1.65412 | 39.7 | 26.51 | | |
| 29 | −19.964 | 2.50 | 1.88300 | 40.8 | 26.45 | | |
| 30(Aspheric) | 41.759 | 1.00 | | | 28.26 | | |
| 31 | 57.746 | 8.90 | 1.72825 | 28.5 | 29.04 | | |
| 32 | −27.004 | 0.10 | 1.63555 | 22.7 | 29.66 | 0.68947 | 0.08477R |
| 33 | −41.975 | 2.50 | 1.80809 | 22.8 | 29.99 | 0.63070 | 0.02607R |
| 34 | −102.518 | 15.00 | | | 30.96 | | |
| 35 | ∞ | 2.00 | 1.51633 | 64.1 | 33.92 | | |
| 36 | ∞ | 50.00 | | | 34.16 | | |
| Image plane | ∞ | | | | | | |

$\Delta\theta gF = \theta gF - (-1.61783 \times 10^{-3} \times \nu_d + 0.64146)$ Aspheric data First surface K = −2.17743e−001  A4 = −2.30311e−008  A6 = −1.10619e−011
A8 = 7.88962e−017  A10 = 2.28694e−020

Third surface

K = 1.51056e−001  A4 = −4.12655e−008  A6 = 2.51763e−012
A8 = 2.60269e−016  A10 = 1.52182e−019  A12 = 6.66399e−024

Eighteenth surface

K = 1.28349e−001  A4 = 5.99189e−007  A6 = −2.79147e−009
A8 = 2.23411e−011  A10 = −8.40769e−014  A12 = 1.89769e−016

Twenty-sixth surface

K = 8.04513e+000  A4 = −1.14848e−005  A6 = 2.27362e−008
A8 = −1.93916e−011  A10 = 8.65246e−014  A12 = −1.88359e−016

Thirtieth surface

K = −9.50032e+000  A4 = 5.69196e−007  A6 = −6.19524e−009
A8 = 4.00766e−011  A10 = −8.04695e−014  A12 = 4.64655e−017

Sixth surface (Diffractive surface)

C2 = −6.98532e−005  C4 = 1.85047e−008  C6 = −1.39678e−011
C8 = 2.84769e−015

Data
Zoom ratio 1.00

| | |
|---|---|
| Focal length | 585.01 |
| F-number | 4.12 |

-continued

| | |
|---|---|
| Half angle of view | 2.12 |
| Image height | 21.64 |
| Entire length of lens | 330.00 |
| BF | 50.00 |
| Entrance pupil position | 836.67 |
| Exit pupil position | −65.99 |
| Front principal point position | −1528.95 |
| Rear principal point position | −535.01 |

Lens unit data

| Unit | Starting surface | Focal length | Length of lens | Front principal point position | Rear principal point position |
|---|---|---|---|---|---|
| 1 | 1 | 151.87 | 102.15 | 2.12 | −72.49 |
| 2 | 8 | −94.03 | 9.00 | 4.37 | −0.65 |
| 3 | 11 | −190.93 | 103.88 | 61.33 | −25.15 |
| 31 | 11 | −517.58 | 38.72 | 118.87 | 76.41 |
| 32 | 21 | −64.67 | 9.01 | 6.80 | 0.74 |
| 33 | 26 | 92.99 | 45.39 | 0.68 | −34.09 |

Single lens data

| Lens | Starting surface | Focal length |
|---|---|---|
| 1 | 1 | 203.53 |
| 2 | 3 | 425.44 |
| 3 | 5 | −96.86 |
| 4 | 6 | 107.02 |
| 5 | 8 | 237.75 |
| 6 | 9 | −67.26 |
| 7 | 11 | 169.57 |
| 8 | 12 | −64.52 |
| 9 | 15 | −72.81 |
| 10 | 16 | 30.12 |
| 11 | 18 | 58.98 |
| 12 | 19 | −29.15 |
| 13 | 21 | 118.55 |
| 14 | 22 | −75.36 |
| 15 | 24 | −91.21 |
| 16 | 26 | 49.02 |
| 17 | 28 | 29.45 |
| 18 | 29 | −15.01 |
| 19 | 31 | 26.44 |
| 20 | 32 | −119.43 |
| 21 | 33 | −89.61 |
| G | 35 | 0.00 |

Numerical Example 10 f = 584.98 mm Fno = 4.12 2ω = 4.24

| Surface number | r | d | nd | vd | Effective diameter | θgF | ΔθgF |
|---|---|---|---|---|---|---|---|
| 1(Aspheric) | 139.696 | 29.88 | 1.48749 | 70.2 | 141.98 | 0.53026 | 0.00244 |
| 2 | −325.344 | 0.10 | | | 140.52 | | |
| 3(Aspheric) | 96.527 | 11.55 | 1.80518 | 25.4 | 121.07 | 0.61655 | 0.01623 |
| 4 | 124.016 | 27.40 | | | 116.67 | | |
| 5 | 261.820 | 4.20 | 1.80000 | 29.8 | 96.92 | 0.60187 | 0.00870 |
| 6(Diffractive) | 56.147 | 23.81 | 1.48749 | 70.2 | 83.03 | 0.53026 | 0.00244 |
| 7 | −794.631 | 19.09 | | | 80.63 | | |
| 8 | 1689.880 | 5.00 | 1.80809 | 22.8 | 62.04 | 0.63070 | 0.02607 |
| 9 | −211.052 | 4.00 | 1.74950 | 35.3 | 60.81 | 0.58180 | −0.00249 |
| 10 | 82.361 | 51.57 | | | 55.13 | | |
| 11 | 97.605 | 2.00 | 1.80000 | 29.8 | 36.67 | | |
| 12 | 33.559 | 0.75 | 1.56480 | 20.0 | 34.72 | 0.40781 | −0.20126A |
| 13 | 38.010 | 7.26 | 1.60311 | 60.6 | 34.69 | | |
| 14 | −100.766 | 2.00 | | | 34.24 | | |
| 15 (Aperture stop) | ∞ | 8.00 | | | 31.77 | SP | |
| 16(Aspheric) | 123.674 | 5.00 | 1.64769 | 33.8 | 25.53 | | |
| 17 | −34.975 | 2.00 | 1.88300 | 40.8 | 24.44 | | |

-continued

| | | | | | | | |
|---|---|---|---|---|---|---|---|
| 18 | 111.403 | 4.71 | | | 22.75 | | |
| 19 | −1753.510 | 2.81 | 1.84666 | 23.8 | 20.76 | | |
| 20 | −83.069 | 1.70 | 1.77250 | 49.6 | 20.76 | | |
| 21 | 51.920 | 2.43 | | | 20.81 | | |
| 22 | −484.952 | 2.50 | 1.77250 | 49.6 | 21.25 | | |
| 23 | 70.606 | 5.00 | | | 22.01 | | |
| 24(Aspheric) | 60.632 | 7.07 | 1.69895 | 30.1 | 25.77 | | |
| 25 | −89.313 | 1.00 | | | 26.52 | | |
| 26 | −144.851 | 8.95 | 1.65412 | 39.7 | 26.60 | | |
| 27 | −17.939 | 2.50 | 1.88300 | 40.8 | 26.99 | | |
| 28(Aspheric) | −210056.282 | 5.80 | | | 29.95 | | |
| 29 | 843.147 | 10.81 | 1.72825 | 28.5 | 33.69 | | |
| 30 | −24.638 | 0.50 | 1.56480 | 20.0 | 34.81 | 0.40781 | −0.20126R |
| 31 | −24.025 | 2.50 | 1.80809 | 22.8 | 34.85 | 0.63070 | 0.02607R |
| 32 | −49.610 | 15.00 | | | 37.39 | | |
| 33 | ∞ | 2.00 | 1.51633 | 64.1 | 38.93 | | |
| 34 | ∞ | 51.09 | | | 39.04 | | |
| Image plane | ∞ | | | | | | |

$\Delta\theta gF = \theta gF - (-1.61783 \times 10^{-3} \times \nu_d + 0.64146)$ Aspheric data First surface

| | | |
|---|---|---|
| K = −4.73316e−001 | A4 = −4.01900e−008 | A6 = −9.83428e−012 |
| A8 = 2.28766e−016 | A10 = 1.64378e−020 | |

Third surface

| | | |
|---|---|---|
| K = 2.66140e−001 | A4 = −2.87186e−008 | A6 = 3.25528e−012 |
| A8 = 5.57642e−016 | A10 = 2.27060e−020 | A12 = 1.26387e−023 |

Sixteenth surface

| | | |
|---|---|---|
| K = −1.35410e+001 | A4 = 4.05102e−006 | A6 = −1.55011e−009 |
| A8 = 4.53861e−011 | A10 = −1.94447e−013 | A12 = 4.19757e−016 |

Twenty-fourth surface

| | | |
|---|---|---|
| K = 9.93298e+000 | A4 = −5.80471e−006 | A6 = 1.48841e−009 |
| A8 = −1.31670e−011 | A10 = 2.72637e−014 | A12 = −1.20709e−016 |

Twenty-eighth surface

| | | |
|---|---|---|
| K = 0.00000e+000 | A4 = −3.25040e−006 | A6 = 2.11303e−009 |
| A8 = −1.00982e−012 | A10 = −1.86048e−015 | A12 = 1.07401e−017 |

Sixth surface (Diffractive surface)

| | | |
|---|---|---|
| C2 = −7.34647e−005 | C4 = 3.27876e−009 | C6 = −8.19383e−012 |
| C8 = 1.75578e−015 | | |

Data
Zoom ratio 1.00

| | |
|---|---|
| Focal length | 584.98 |
| F-number | 4.12 |
| Half angle of view | 2.12 |
| Image height | 21.64 |
| Entire length of lens | 329.99 |
| BF | 51.09 |
| Entrance pupil position | 911.06 |
| Exit pupil position | −109.28 |
| Front principal point position | −637.75 |
| Rear principal point position | −533.89 |

Lens unit data

| Unit | Starting surface | Focal length | Length of lens | Front principal point position | Rear principal point position |
|---|---|---|---|---|---|
| 1 | 1 | 165.86 | 96.94 | −9.08 | −76.16 |
| 2 | 8 | −120.23 | 9.00 | 5.43 | 0.37 |
| 3 | 11 | −386.52 | 102.30 | −56.08 | −186.66 |
| 31 | 11 | 3570.34 | 27.01 | −594.46 | −526.41 |

-continued

| | | | | | |
|---|---|---|---|---|---|
| 32 | 19 | −36.10 | 9.45 | 4.13 | −2.10 |
| 33 | 24 | 67.89 | 56.14 | 16.70 | −30.51 |

Single lens data

| Lens | Starting surface | Focal length |
|---|---|---|
| 1 | 1 | 204.79 |
| 2 | 3 | 455.49 |
| 3 | 5 | −91.36 |
| 4 | 6 | 106.88 |
| 5 | 8 | 232.45 |
| 6 | 9 | −78.58 |
| 7 | 11 | −64.83 |
| 8 | 12 | 478.35 |
| 9 | 13 | 46.68 |
| 10 | 16 | 42.62 |
| 11 | 17 | −29.95 |
| 12 | 19 | 102.91 |
| 13 | 20 | −41.13 |
| 14 | 22 | −79.63 |
| 15 | 24 | 52.69 |
| 16 | 26 | 30.45 |
| 17 | 27 | −20.32 |
| 18 | 29 | 33.04 |
| 19 | 30 | 1321.25 |
| 20 | 31 | −60.28 |
| G | 33 | 0.00 |

Numerical Example 11

| f = 585.00 mm Fno = 4.12 2ω = 4.24 | | | | | | |
|---|---|---|---|---|---|---|
| Surface number | r | d | nd | vd | Effective diameter | θgF | ΔθgF |
| 1(Aspheric) | 145.868 | 27.70 | 1.48749 | 70.2 | 141.99 | 0.53026 | 0.00244 |
| 2 | −337.314 | 0.10 | | | 140.88 | | |
| 3(Aspheric) | 107.809 | 11.51 | 1.80518 | 25.4 | 123.87 | 0.61655 | 0.01623 |
| 4 | 150.092 | 28.39 | | | 120.16 | | |
| 5 | 332.925 | 4.20 | 1.80000 | 29.8 | 98.55 | 0.60187 | 0.00870 |
| 6(Diffractive) | 60.928 | 23.60 | 1.49700 | 81.5 | 85.59 | 0.53859 | 0.02916 |
| 7 | −411.853 | 19.00 | | | 83.59 | | |
| 8 | 1989.327 | 5.00 | 1.80809 | 22.8 | 63.39 | 0.63070 | 0.02607 |
| 9 | −215.855 | 4.00 | 1.74950 | 35.3 | 62.13 | 0.58180 | −0.00249 |
| 10 | 83.677 | 51.23 | | | 56.22 | | |
| 11(Aperture stop) | ∞ | 10.00 | | | 37.64 | SP | |
| 12 | 91.382 | 2.00 | 1.80000 | 29.8 | 33.03 | | |
| 13 | 31.325 | 0.50 | 1.59630 | 13.9 | 31.23 | 0.34651 | −0.27252A |
| 14 | 33.740 | 7.05 | 1.62041 | 60.3 | 31.18 | | |
| 15 | −95.829 | 5.00 | | | 30.57 | | |
| 16(Aspheric) | 132.281 | 5.00 | 1.63980 | 34.5 | 25.35 | | |
| 17 | −34.626 | 2.00 | 1.88300 | 40.8 | 24.19 | | |
| 18 | 99.935 | 4.77 | | | 22.45 | | |
| 19 | −2759.093 | 2.81 | 1.84666 | 23.8 | 22.43 | | |
| 20 | −83.717 | 1.70 | 1.77250 | 49.6 | 22.44 | | |
| 21 | 47.825 | 2.55 | | | 22.41 | | |
| 22 | −705.750 | 2.50 | 1.77250 | 49.6 | 22.82 | | |
| 23 | 72.025 | 5.00 | | | 23.61 | | |
| 24(Aspheric) | 57.397 | 7.23 | 1.69895 | 30.1 | 27.59 | | |
| 25 | −53.242 | 1.00 | | | 28.21 | | |
| 26 | −74.258 | 8.04 | 1.65412 | 39.7 | 28.06 | | |
| 27 | −18.486 | 2.50 | 1.88300 | 40.8 | 28.32 | | |
| 28(Aspheric) | 356.823 | 5.66 | | | 31.52 | | |
| 29 | 675.214 | 10.37 | 1.69895 | 30.1 | 35.40 | | |
| 30 | −26.258 | 0.10 | 1.63555 | 22.7 | 36.41 | 0.68947 | 0.08477R |
| 31 | −29.942 | 2.50 | 1.80809 | 22.8 | 36.76 | 0.63070 | 0.02607R |
| 32 | −48.563 | 15.00 | | | 38.74 | | |

-continued

| 33 | ∞ | 2.00 | 1.51633 | 64.1 | 39.96 |
| 34 | ∞ | 50.00 | | | 40.05 |
| Image plane | ∞ | | | | |

$\Delta\theta gF = \theta gF - (-1.61783 \times 10^{-3} \times \nu_d + 0.64146)$ Aspheric data First surface K = −5.02302e−001  A4 = −4.21255e−008  A6 = −9.53729e−012
A8 = 2.39409e−016  A10 = 1.55076e−020

Third surface

K = 2.62676e−001  A4 = −1.75134e−008  A6 = 4.93264e−012
A8 = 3.78423e−016  A10 = 7.49520e−020  A12 = 5.99854e−025

Sixteenth surface

K = 1.40612e+001  A4 = 2.49984e−006  A6 = 2.82101e−010
A8 = 1.48412e−011  A10 = −2.97781e−014  A12 = 8.86014e−017

Twenty-fourth surface

K = 7.65441e+000  A4 = −8.46561e−006  A6 = 3.07691e−009
A8 = −1.76417e−011  A10 = 4.90975e−014  A12 = −1.17645e−016

Twenty-eighth surface

K = −5.84225e+002  A4 = −2.57457e−006  A6 = 5.88749e−010
A8 = 3.20697e−012  A10 = 3.03265e−016  A12 = 1.15860e−018

Sixth surface (Diffractive surface)

C2 = −5.61629e−005  C4 = 4.23259e−009  C6 = −6.05548e−012
C8 = 1.45938e−015

Data
Zoom ratio 1.00

| | |
|---|---|
| Focal length | 585.00 |
| F-number | 4.12 |
| Half angle of view | 2.12 |
| Image height | 21.64 |
| Entire length of lens | 330.00 |
| BF | 50.00 |
| Entrance pupil position | 729.46 |
| Exit pupil position | −124.96 |
| Front principal point position | −641.56 |
| Rear principal point position | −535.00 |

Lens unit data

| Unit | Starting surface | Focal length | Length of lens | Front principal point position | Rear principal point position |
|---|---|---|---|---|---|
| 1 | 1 | 161.04 | 95.50 | −2.05 | −71.75 |
| 2 | 8 | −121.13 | 9.00 | 5.39 | 0.32 |
| 3 | 11 | −336.93 | 105.27 | −48.25 | −181.28 |
| 31 | 11 | −6122.19 | 31.55 | 866.09 | 738.33 |
| 32 | 19 | −35.57 | 9.56 | 4.10 | −2.25 |
| 33 | 24 | 65.88 | 54.40 | 15.45 | −30.81 |

Single lens data

| Lens | Starting surface | Focal length |
|---|---|---|
| 1 | 1 | 212.89 |
| 2 | 3 | 423.82 |
| 3 | 5 | −94.86 |
| 4 | 6 | 107.31 |
| 5 | 8 | 241.21 |
| 6 | 9 | −80.00 |
| 7 | 12 | −60.48 |
| 8 | 13 | 681.38 |
| 9 | 14 | 41.08 |
| 10 | 16 | 43.40 |
| 11 | 17 | −28.92 |
| 12 | 19 | 101.92 |
| 13 | 20 | −39.18 |
| 14 | 22 | −84.48 |
| 15 | 24 | 40.61 |
| 16 | 26 | 35.60 |

-continued

| | | |
|---|---|---|
| 17 | 27 | −19.84 |
| 18 | 29 | 36.38 |
| 19 | 30 | −339.41 |
| 20 | 31 | −102.80 |
| G | 33 | 0.00 |

Numerical Example 12

| f = 489.00 mm Fno = 4.11 2ω = 5.06 | | | | | | | |
|---|---|---|---|---|---|---|---|
| Surface number | r | d | nd | vd | Effective diameter | θgF | ΔθgF |
| 1(Aspheric) | 150.077 | 12.49 | 1.48749 | 70.2 | 119.00 | 0.53026 | 0.00244 |
| 2 | 113942.803 | 0.10 | | | 118.62 | | |
| 3(Aspheric) | 100.641 | 12.94 | 1.72825 | 28.5 | 113.41 | 0.60766 | 0.01224 |
| 4 | 222.478 | 14.97 | | | 111.91 | | |
| 5 | 177.374 | 3.70 | 1.78472 | 25.7 | 98.18 | 0.61584 | 0.01592 |
| 6(Diffractive) | 59.455 | 23.88 | 1.43875 | 94.9 | 86.37 | 0.53463 | 0.04681 |
| 7 | −277.848 | 18.84 | | | 85.34 | | |
| 8 | 235.357 | 3.31 | 1.80809 | 22.8 | 62.01 | 0.63070 | 0.02607 |
| 9 | 1958.776 | 2.50 | 1.88300 | 40.8 | 61.06 | 0.56694 | −0.00857 |
| 10 | 89.478 | 52.88 | | | 56.89 | | |
| 11(Aperture stop) | ∞ | 5.00 | | | 30.45 | SP | |
| 12 | 138.882 | 1.80 | 1.88300 | 40.8 | 27.34 | | |
| 13 | 43.292 | 1.94 | 1.54250 | 29.0 | 26.15 | 0.43316 | −0.16137A |
| 14 | 158.705 | 3.77 | 1.51742 | 52.4 | 26.00 | | |
| 15 | −90.459 | 1.00 | | | 25.23 | | |
| 16 | 219.506 | 2.95 | 1.60311 | 60.6 | 23.72 | | |
| 17 | −62.395 | 2.00 | 1.88300 | 40.8 | 23.00 | | |
| 18 | 161.496 | 2.00 | | | 22.10 | | |
| 19 | −3261.794 | 3.44 | 1.80809 | 22.8 | 22.09 | | |
| 20 | −40.186 | 1.61 | 1.72916 | 54.7 | 22.09 | | |
| 21 | 56.754 | 2.16 | | | 21.99 | | |
| 22 | 6173.830 | 1.50 | 1.88300 | 40.8 | 22.26 | | |
| 23 | 49.202 | 3.00 | | | 22.62 | | |
| 24(Aspheric) | 47.254 | 6.22 | 1.63980 | 34.5 | 25.08 | | |
| 25 | −57.328 | 3.36 | | | 25.68 | | |
| 26 | −52.347 | 2.00 | 1.88300 | 40.8 | 25.78 | | |
| 27 | 147.333 | 3.00 | 1.75520 | 27.5 | 26.84 | | |
| 28 | −834.112 | 9.26 | | | 27.49 | | |
| 29 | 72.432 | 7.49 | 1.65412 | 39.7 | 32.92 | | |
| 30 | −54.116 | 1.80 | 1.80809 | 22.8 | 33.20 | 0.63070 | 0.02607R |
| 31 | −311.338 | 4.00 | | | 33.74 | | |
| 32 | ∞ | 2.20 | 1.51633 | 64.1 | 34.46 | | |
| 33 | ∞ | 52.87 | | | 34.70 | | |
| Image plane | ∞ | | | | | | |

$\Delta\theta gF = \theta gF - (-1.61783 \times 10^{-3} \times v_d + 0.64146)$

Aspheric data

First surface

K = −1.90977e+000  A4 = −2.92743e−008  A6 = −1.26299e−011
A8 = −2.81226e−016  A10 = 2.24544e−019  A12 = −2.28584e−023

Third surface

K = 4.09681e−001  A4 = −2.70929e−008  A6 = 2.39007e−012
A8 = 4.67149e−016  A10 = −2.24984e−019

Twenty-fourth surface

K = 1.61157e+000  A4 = −3.00890e−006  A6 = −2.58502e−009
A8 = 3.23267e−012  A10 = −9.36563e−015

Sixth surface (Diffractive surface)

C2 = −4.80212e−005  C4 = −1.93247e−009  C6 = −2.33078e−012
C8 = 1.03629e−015  C10 = −9.33193e−020

Data
Zoom ratio 1.00

| | |
|---|---|
| Focal length | 489.00 |
| F-number | 4.11 |

-continued

| | |
|---|---|
| Half angle of view | 2.53 |
| Image height | 21.64 |
| Entire length of lens | 270.00 |
| BF | 52.87 |
| Entrance pupil position | 583.30 |
| Exit pupil position | −62.12 |
| Front principal point position | −1007.10 |
| Rear principal point position | −436.13 |

Lens unit data

| Unit | Starting surface | Focal length | Length of lens | Front principal point position | Rear principal point position |
|---|---|---|---|---|---|
| 1 | 1 | 133.45 | 68.08 | 5.21 | −45.94 |
| 2 | 8 | −159.00 | 5.81 | 4.95 | 1.73 |
| 3 | 11 | −92.23 | 71.51 | 4.99 | −57.39 |
| 31 | 11 | −340.92 | 18.46 | 20.50 | 6.65 |
| 32 | 19 | −33.92 | 8.72 | 4.67 | −1.07 |
| 33 | 24 | 62.04 | 39.33 | 6.37 | −26.17 |

Single lens data

| Lens | Starting surface | Focal length |
|---|---|---|
| 1 | 1 | 308.25 |
| 2 | 3 | 241.54 |
| 3 | 5 | −116.85 |
| 4 | 6 | 112.88 |
| 5 | 8 | 330.74 |
| 6 | 9 | −106.25 |
| 7 | 12 | −71.87 |
| 8 | 13 | 109.09 |
| 9 | 14 | 111.93 |
| 10 | 16 | 80.88 |
| 11 | 17 | −50.76 |
| 12 | 19 | 50.33 |
| 13 | 20 | −32.04 |
| 14 | 22 | −56.18 |
| 15 | 24 | 41.45 |
| 16 | 26 | −43.54 |
| 17 | 27 | 166.02 |
| 18 | 29 | 48.49 |
| 19 | 30 | −81.31 |
| G | 32 | 0.00 |

Numerical Example 13 f = 489.00 mm Fno = 4.11 2ω = 5.06

| Surface number | r | d | nd | vd | Effective diameter | θgF | ΔθgF |
|---|---|---|---|---|---|---|---|
| 1(Aspheric) | 146.439 | 12.42 | 1.48749 | 70.2 | 119.00 | 0.53026 | 0.00244 |
| 2 | 5386.932 | 0.10 | | | 118.61 | | |
| 3(Aspheric) | 98.923 | 13.11 | 1.72825 | 28.5 | 113.46 | 0.60766 | 0.01224 |
| 4 | 214.005 | 14.41 | | | 111.93 | | |
| 5 | 169.769 | 3.70 | 1.78472 | 25.7 | 98.56 | 0.61584 | 0.01592 |
| 6(Diffractive) | 57.983 | 24.56 | 1.43875 | 94.9 | 86.26 | 0.53463 | 0.04681 |
| 7 | −274.106 | 19.01 | | | 85.23 | | |
| 8 | 231.804 | 3.34 | 1.80809 | 22.8 | 61.48 | 0.63070 | 0.02607 |
| 9 | 2234.348 | 2.50 | 1.88300 | 40.8 | 60.52 | 0.56694 | −0.00857 |
| 10 | 85.145 | 52.46 | | | 56.21 | | |
| 11(Aperture stop) | ∞ | 5.00 | | | 30.84 | SP | |
| 12 | 226.758 | 1.80 | 1.80000 | 29.8 | 27.95 | | |
| 13 | 41.907 | 1.20 | 1.71270 | 13.9 | 26.72 | 0.56226 | −0.05677A |
| 14 | 70.608 | 4.95 | 1.48749 | 70.2 | 26.63 | | |
| 15 | −74.210 | 1.00 | | | 25.81 | | |
| 16 | 200.567 | 3.22 | 1.51823 | 58.9 | 24.07 | | |
| 17 | −56.363 | 2.00 | 1.88300 | 40.8 | 23.26 | | |
| 18 | 253.964 | 2.00 | | | 22.55 | | |

-continued

| | | | | | | | |
|---|---|---|---|---|---|---|---|
| 19 | −22621.770 | 3.70 | 1.80809 | 22.8 | 22.53 | | |
| 20 | −38.579 | 1.61 | 1.72916 | 54.7 | 22.52 | | |
| 21 | 58.136 | 2.14 | | | 22.37 | | |
| 22 | 3367.845 | 1.50 | 1.88300 | 40.8 | 22.61 | | |
| 23 | 47.844 | 3.00 | | | 22.96 | | |
| 24(Aspheric) | 49.299 | 5.16 | 1.63980 | 34.5 | 25.32 | | |
| 25 | −114.549 | 13.51 | | | 25.89 | | |
| 26 | −54.725 | 2.00 | 1.88300 | 40.8 | 28.21 | | |
| 27 | 225.620 | 3.00 | 1.75520 | 27.5 | 29.71 | | |
| 28 | −521.325 | 0.50 | | | 30.59 | | |
| 29 | 91.135 | 8.97 | 1.65412 | 39.7 | 31.97 | | |
| 30 | −33.028 | 0.10 | 1.6355 | 22.7 | 32.70 | 0.68947 | 0.08477R |
| 31 | −38.195 | 1.80 | 1.80809 | 22.8 | 32.85 | 0.63070 | 0.02607R |
| 32 | −80.221 | 4.00 | | | 33.90 | | |
| 33 | ∞ | 2.20 | 1.51633 | 64.1 | 34.85 | | |
| 34 | ∞ | 50.00 | | | 35.09 | | |
| Image plane | ∞ | | | | | | |

$\Delta\theta gF = \theta gF - (-1.61783 \times 10^{-3} \times \nu_d + 0.64146)$ Aspheric data First surface

| | | |
|---|---|---|
| K = −1.89568e+000 | A4 = −2.94245e−008 | A6 = −1.33953e−011 |
| A8 = −3.21333e−016 | A10 = 2.51019e−019 | A12 = −2.63415e−023 |

Third surface

| | | |
|---|---|---|
| K = 4.03939e−001 | A4 = −2.58237e−008 | A6 = 2.64099e−012 |
| A8 = 5.02960e−016 | A10 = −2.47890e−019 | |

Twenty-fourth surface

| | | |
|---|---|---|
| K = 1.95622e+000 | A4 = −2.84763e−006 | A6 = −3.09697e−009 |
| A8 = 4.45058e−012 | A10 = −1.18137e−014 | |

Sixth surface (Diffractive surface)

| | | |
|---|---|---|
| C2 = −4.41600e−005 | C4 = −2.06451e−009 | C6 = −2.20218e−012 |
| C8 = 9.75313e−016 | C10 = −7.74152e−020 | |

Data
Zoom ratio 1.00

| | |
|---|---|
| Focal length | 489.00 |
| F-number | 4.11 |
| Half angle of view | 2.53 |
| Image height | 21.64 |
| Entire length of lens | 270.00 |
| BF | 50.00 |
| Entrance pupil position | 580.69 |
| Exit pupil position | −64.66 |
| Front principal point position | −1015.82 |
| Rear principal point position | −439.00 |

Lens unit data

| Unit | Starting surface | Focal length | Length of lens | Front principal point position | Rear principal point position |
|---|---|---|---|---|---|
| 1 | 1 | 132.49 | 68.30 | 5.25 | −45.95 |
| 2 | 8 | −148.46 | 5.84 | 4.88 | 1.65 |
| 3 | 11 | −95.55 | 74.38 | 6.81 | −58.30 |
| 31 | 11 | −430.50 | 19.18 | 23.38 | 8.86 |
| 32 | 19 | −34.21 | 8.96 | 4.88 | −0.99 |
| 33 | 24 | 62.07 | 41.25 | 5.72 | −29.58 |

Single lens data

| Lens | Starting surface | Focal length |
|---|---|---|
| 1 | 1 | 308.55 |
| 2 | 3 | 241.03 |
| 3 | 5 | −115.02 |
| 4 | 6 | 110.54 |
| 5 | 8 | 319.82 |
| 6 | 9 | −100.30 |
| 7 | 12 | −64.54 |
| 8 | 13 | 142.18 |
| 9 | 14 | 75.06 |
| 10 | 16 | 85.27 |

-continued

| | | |
|---|---|---|
| 11 | 17 | −52.08 |
| 12 | 19 | 47.82 |
| 13 | 20 | −31.58 |
| 14 | 22 | −54.98 |
| 15 | 24 | 54.54 |
| 16 | 26 | −49.71 |
| 17 | 27 | 208.88 |
| 18 | 29 | 38.15 |
| 19 | 30 | −387.06 |
| 20 | 31 | −91.99 |
| G | 33 | 0.00 |

Numerical Example 14

| f = 585.00 mm Fno = 4.12 2 ω = 4.24 | | | | | | | |
|---|---|---|---|---|---|---|---|
| Surface number | r | d | nd | vd | Effective diameter | θgF | ΔθgF |
| 1(Aspheric) | 144.577 | 28.92 | 1.48749 | 70.2 | 141.99 | 0.53026 | 0.00244 |
| 2 | −326.618 | 0.10 | | | 140.66 | | |
| 3(Aspheric) | 105.477 | 12.22 | 1.80518 | 25.4 | 123.03 | 0.61655 | 0.01623 |
| 4 | 138.198 | 28.77 | | | 118.03 | | |
| 5 | 317.057 | 4.20 | 1.80000 | 29.8 | 97.21 | 0.60187 | 0.00870 |
| 6(Diffractive) | 60.869 | 23.51 | 1.49700 | 81.5 | 84.72 | 0.53859 | 0.02916 |
| 7 | −422.986 | 19.00 | | | 82.51 | | |
| 8 | 1526.600 | 5.00 | 1.80809 | 22.8 | 62.61 | 0.63070 | 0.02607 |
| 9 | −217.946 | 4.00 | 1.74950 | 35.3 | 61.36 | 0.58180 | −0.00249 |
| 10 | 84.253 | 51.49 | | | 55.58 | | |
| 11(Aperture stop) | ∞ | 10.00 | | | 36.44 | SP | |
| 12 | 89.927 | 2.00 | 1.75520 | 27.5 | 31.77 | | |
| 13(Diffractive) | 39.959 | 6.23 | 1.51633 | 64.1 | 30.38 | A | |
| 14 | −84.236 | 5.00 | | | 29.78 | | |
| 15(Aspheric) | 176.846 | 5.00 | 1.72342 | 38.0 | 24.90 | | |
| 16 | −28.671 | 2.00 | 1.88300 | 40.8 | 23.99 | | |
| 17 | 111.774 | 4.64 | | | 22.36 | | |
| 18 | 3099.487 | 2.81 | 1.84666 | 23.8 | 22.37 | | |
| 19 | −88.382 | 1.70 | 1.77250 | 49.6 | 22.37 | | |
| 20 | 49.833 | 2.57 | | | 22.32 | | |
| 21 | −360.181 | 2.50 | 1.77250 | 49.6 | 22.71 | | |
| 22 | 68.112 | 5.00 | | | 23.52 | | |
| 23(Aspheric) | 54.095 | 6.38 | 1.64769 | 33.8 | 27.65 | | |
| 24 | −40.714 | 1.00 | | | 28.04 | | |
| 25 | −46.304 | 6.48 | 1.65412 | 39.7 | 27.80 | | |
| 26 | −19.732 | 2.50 | 1.88300 | 40.8 | 28.19 | | |
| 27(Aspheric) | 96378.936 | 5.87 | | | 31.15 | | |
| 28 | 329.798 | 11.52 | 1.75520 | 27.5 | 35.46 | | |
| 29 | −24.296 | 0.10 | 1.63555 | 22.7 | 36.37 | 0.68947 | 0.08477R |
| 30 | −27.105 | 2.50 | 1.80809 | 22.8 | 36.59 | 0.63070 | 0.02607R |
| 31 | −60.115 | 15.00 | | | 38.74 | | |
| 32 | ∞ | 2.00 | 1.51633 | 64.1 | 39.93 | | |
| 33 | ∞ | 50.00 | | | 40.02 | | |
| Image plane | ∞ | | | | | | |

$\Delta\theta gF = \theta gF - (-1.61783 \times 10^{-3} \times v_d + 0.64146)$

Aspheric data

First surface

K = −5.10132e−001    A4 = −4.25048e−008    A6 = −9.66374e−012
A8 = 2.59674e−016    A10 = 1.40035e−020

Third surface

K = 2.59011e−001    A4 = −1.98983e−008    A6 = 4.70543e−012
A8 = 3.67982e−016    A10 = 7.65698e−020    A12 = 1.90243e−024

Fifteenth surface

K = −5.29241e+001    A4 = 3.47396e−006    A6 = −5.23493e−010
A8 = 1.31695e−011    A10 = −3.27087e−014    A12 = 8.86014e−017

Twenty-third surface

K = 6.39842e+000    A4 = −7.38270e−006    A6 = 2.59918e−010
A8 = −9.45303e−012    A10 = 1.38553e−014    A12 = −1.17645e−016

-continued

Twenty-seventh surface

K = 0.00000e+000　　A4 = −2.04375e−006　　A6 = 3.12075e−009
A8 = −1.90304e−013　　A10 = 6.45879e−015　　A12 = 7.13646e−019

Sixth surface (Diffractive)

C2 = −5.69441e−005　　C4 = 5.50613e−009　　C6 = −7.42160e−012
C8 = 1.87437e−015

Thirteenth surface (Diffractive surface)

C2 = 1.25211e−004　　C4 = 6.44682e−008　　C6 = 7.19382e−012
C8 = −1.48734e−013　　C10 = −6.00755e−016

Data
Zoom ratio 1.00

| | |
|---|---|
| Focal length | 585.00 |
| F-number | 4.12 |
| Half angle of view | 2.12 |
| Image height | 21.64 |
| Entire length of lens | 330.00 |
| BF | 50.00 |
| Entrance pupil position | 760.16 |
| Exit pupil position | −123.48 |
| Front principal point position | −627.56 |
| Rear principal point position | −535.00 |

Lens unit data

| Unit | Starting surface | Focal length | Length of lens | Front principal point position | Rear principal point position |
|---|---|---|---|---|---|
| 1 | 1 | 163.04 | 97.72 | −2.72 | −73.69 |
| 2 | 8 | −123.93 | 9.00 | 5.48 | 0.41 |
| 3 | 11 | −335.50 | 102.80 | −54.17 | −188.09 |
| 31 | 11 | −26733.10 | 30.23 | 3079.02 | 2740.48 |
| 32 | 18 | −34.97 | 9.59 | 4.32 | −2.06 |
| 33 | 23 | 64.79 | 53.35 | 15.31 | −29.44 |

Single lens data

| Lens | Starting surface | Focal length |
|---|---|---|
| 1 | 1 | 209.80 |
| 2 | 3 | 474.30 |
| 3 | 5 | −95.89 |
| 4 | 6 | 107.51 |
| 5 | 8 | 236.31 |
| 6 | 9 | −80.61 |
| 7 | 12 | −94.62 |
| 8 | 13 | 54.11 |
| 9 | 15 | 34.46 |
| 10 | 16 | −25.67 |
| 11 | 18 | 101.54 |
| 12 | 19 | −41.03 |
| 13 | 21 | −73.96 |
| 14 | 23 | 36.84 |
| 15 | 25 | 47.94 |
| 16 | 26 | −22.34 |
| 17 | 28 | 30.39 |
| 18 | 29 | −374.04 |
| 19 | 30 | −63.22 |
| G | 32 | 0.00 |

TABLE 1

| | Optical element A Numerical Example | | | | | | |
|---|---|---|---|---|---|---|---|
| | 1 and 7 | 3 | 2 | 4 and 8 | 5 and 6 | | 9 |
| | Optical element R Numerical Example | | | | | | |
| | 1, 8, 9, 11, 13 and 14 UV curable resin 1 | 4 TiO$_2$ 20%-UV curable resin 1 | TiO$_2$ 20%-UV curable resin 2 | 3 N-polyvinyl-carbazole | 2 and 6 TiO$_2$ 3%-UV curable resin 2 | 1, 3, and 5 Product name S-NPH1 (OHARA INC.) | Product name S-NPH2 (OHARA INC.) |
| d line refractive index | 1.63555 | 1.78927 | 1.70877 | 1.69591 | 1.55324 | 1.80809 | 1.92286 |
| g line refractive index | 1.67532 | 1.85809 | 1.75988 | 1.75164 | 1.57249 | 1.85590 | 1.98972 |
| C line refractive index | 1.62807 | 1.77777 | 1.70033 | 1.68528 | 1.54936 | 1.79801 | 1.90916 |
| F line refractive index | 1.65604 | 1.82254 | 1.7331 | 1.72465 | 1.56326 | 1.83351 | 1.95800 |
| $\nu_d$ | 22.7 | 17.6 | 21.6 | 17.7 | 39.8 | 22.8 | 18.9 |
| $\theta_{gF}$ | 0.68947 | 0.79406 | 0.81721 | 0.68555 | 0.66403 | 0.63070 | 0.64947 |
| $A_{\theta 1}, R_{\theta 1}$ | 0.0885 | 0.1730 | 0.2122 | 0.0647 | 0.1022 | 0.0298 | 0.0338 |
| $\Delta\theta_{gF}$ | 0.08477 | 0.18112 | 0.21074 | 0.07268 | 0.08696 | 0.02607 | 0.03857 |

TABLE 2

| | Optical element A Numerical Example | | | |
|---|---|---|---|---|
| | 1, 2, 7 and 8 | 3 | 4 | 6 |
| | Optical element R Numerical Example | | | |
| | 10 ITO 14.2%-UV curable resin 2 | ITO 20%-UV curable resin 2 | ITO 5%-UV curable resin 2 | 7 ITO 10%-N-polyvinyl-carbazole |
| d line refractive index | 1.56480 | 1.59630 | 1.54250 | 1.71270 |
| g line refractive index | 1.59410 | 1.63830 | 1.56300 | 1.77720 |
| C line refractive index | 1.55440 | 1.58040 | 1.53620 | 1.69690 |
| F line refractive index | 1.58260 | 1.62340 | 1.55490 | 1.74830 |
| $\nu_d$ | 20.0 | 13.9 | 29.0 | 13.9 |
| $\theta_{gF}$ | 0.40780 | 0.34651 | 0.43316 | 0.56226 |
| $A_{\theta 2}, R_{\theta 2}$ | −0.2263 | −0.3124 | −0.1704 | −0.0967 |
| $\Delta\theta_{gF}$ | −0.20126 | −0.27252 | −0.16137 | −0.05677 |

TABLE 3

| | UV curable resin 2 | TiO$_2$ | ITO | DOE |
|---|---|---|---|---|
| d line refractive index | 1.52415 | 2.30377 | 1.8571 | — |
| g line refractive index | 1.53706 | 2.45676 | 1.9924 | — |
| C line refractive index | 1.52116 | 2.28032 | 1.7979 | — |
| F line refractive index | 1.53133 | 2.37452 | 1.9487 | — |
| $\nu_d$ | 51.6 | 13.8 | 5.68 | −3.45 |
| $A_{\theta 1}, R_{\theta 1}$ | 0.0042 | 0.2345 | — | — |
| $A_{\theta 2}, R_{\theta 2}$ | — | — | −0.4075 | −0.4524 |
| $\theta_{gF}$ | 0.56300 | 0.87300 | 0.29000 | 0.29560 |
| $\Delta\theta_{gF}$ | 0.00534 | 0.25397 | −0.34248 | −0.35145 |

TABLE 4

| Condition | Numerical Example | | | | | | |
|---|---|---|---|---|---|---|---|
| | 1 | 2 | 3 | 4 | 5 | 6 | 7 |
| (1) | 5.39 | 5.29 | 5.38 | 4.92 | 5.50 | 5.72 | 5.50 |
| (2) | 0.036 | 0.014 | 0.086 | 0.008 | 0.011 | 0.011 | 0.030 |
| (3) | −0.022 | −0.023 | −0.023 | −0.017 | −0.029 | −0.018 | −0.019 |
| (4) | 0.0885 | 0.2122 | 0.1730 | 0.0647 | 0.1022 | 0.1022 | 0.0885 |
| (5) | — | — | — | — | — | — | — |
| (6) | 22.7 | 21.6 | 17.6 | 17.7 | 39.8 | 39.8 | 22.7 |
| (7) | 3.05 | 3.00 | 3.02 | 2.71 | 3.11 | 2.45 | 2.47 |
| (8) | 1.545 | 1.525 | 1.655 | 1.684 | 1.511 | 1.553 | 1.476 |
| (9) | 0.549 | 0.396 | 0.544 | 0.464 | 0.628 | 0.423 | 0.563 |
| (10) | 3.66E−04 | 2.65E−04 | 3.67E−04 | 4.13E−04 | 8.15E−05 | 1.74E−04 | 1.53E−04 |
| (11) | 0.0885 0.0298 | 0.1022 | 0.0647 0.0298 | 0.1730 | 0.0298 | 0.1022 | — |
| (12) | — | — | — | — | — | — | −0.0967 |
| (13) | 22.7 22.8 | 39.8 | 17.7 22.8 | 17.6 | 22.8 | 39.8 | 13.9 |
| (14) | 0.16 | 0.30 | 0.16 | 0.15 | 0.31 | 0.29 | 0.18 |
| (15) | 25.4 | 29.5 | 25.4 | 25.4 | 29.5 | 29.5 | 27.5 |
| (16) | 0.0110 | 0.0116 | 0.0110 | 0.0117 | 0.0116 | 0.0137 | 0.0093 |
| (17) | 5.90 | 6.65 | 5.85 | 5.44 | 6.93 | 6.97 | 5.84 |

| Condition | Numerical Example | | | | | | |
|---|---|---|---|---|---|---|---|
| | 8 | 9 | 10 | 11 | 12 | 13 | 14 |
| (1) | 6.51 | 5.35 | 5.17 | 5.40 | 6.40 | 6.43 | 5.21 |
| (2) | 0.025 | 0.020 | 0.030 | 0.036 | 0.025 | 0.025 | 0.036 |
| (3) | −0.019 | −0.019 | −0.012 | −0.017 | −0.025 | −0.014 | −0.015 |
| (4) | 0.0647 | 0.0338 | — | — | — | — | — |
| (5) | — | — | −0.2263 | −0.3124 | −0.1704 | −0.0967 | −0.4524 |
| (6) | 17.7 | 18.9 | 20.0 | 13.9 | 29.0 | 13.9 | −3.453 |
| (7) | 3.97 | 2.47 | 2.86 | 2.99 | 3.98 | 3.86 | 3.03 |
| (8) | 1.899 | 1.574 | 1.469 | 1.527 | 1.866 | 1.862 | 1.524 |
| (9) | 0.530 | 0.511 | 0.497 | 0.552 | 0.511 | 0.533 | 0.545 |
| (10) | 2.24E−04 | 4.77E−04 | 1.91E−04 | 2.18E−04 | 1.72E−04 | 1.52E−04 | 2.45E−04 |
| (11) | 0.0885 0.0298 | 0.0885 0.0298 | 0.0298 | 0.0885 0.0298 | 0.0298 | 0.0885 0.0298 | 0.0885 0.0298 |
| (12) | — | — | −0.2263 | — | — | — | — |
| (13) | 22.7 22.8 | 22.7 22.8 | 20.0 22.8 | 22.7 22.8 | 22.8 | 22.7 22.8 | 22.7 22.8 |
| (14) | 0.37 | 0.15 | 0.12 | 0.16 | 0.38 | 0.37 | 0.13 |
| (15) | 28.5 | 25.4 | 25.4 | 25.4 | 28.5 | 28.5 | 25.4 |
| (16) | 0.0073 | 0.0129 | 0.0114 | 0.0114 | 0.0079 | 0.0076 | 0.0111 |
| (17) | 6.09 | 5.53 | 5.50 | 5.94 | 6.08 | 6.08 | 5.85 |

* "—" of the tables represents that the condition does not correspond to the numerical example.

Next, an example where the photographic optical system according to an exemplary embodiment of the present invention is applied to an image pickup apparatus (a camera system) will be described with reference to FIG. 15. FIG. 15 is a schematic view of main portions of a single lens reflex camera. In FIG. 15, reference numeral 10 denotes a photographic lens including a photographic optical system 1 according to any one of the first to fourteenth exemplary embodiments. The photographic optical system 1 is supported by a lens barrel 2, which is a holding member. Reference numeral 20 denotes a camera body. The camera body 20 includes a quick return mirror 3 for reflecting a light flux from the photographic lens 10 upward, a focusing screen 4 disposed at an image forming position of the photographic lens 10, and a pentagonal roof prism 5 for converting a reverse image formed on the focusing screen 4 into an erect image. In addition, the camera body 20 includes an eyepiece lens for observing the erect image.

Reference numeral 7 denotes a photosensitive surface. An image sensor (a photoelectric conversion element), such as a CCD sensor or a CMOS sensor, or a silver-halide film is disposed on the photosensitive surface 7. During a photographing operation, the quick return mirror 3 retracts from an optical path and an image is formed on the photosensitive surface 7 by the photographic lens 10. In this way, an image pickup apparatus having a light weight and a high optical performance can be realized by applying the photographic optical system according to any one of the first to fourteenth exemplary embodiments to an image pickup apparatus, such as a photographic camera, a video camera, a digital still camera, and the like.

The photographic optical systems according to the exemplary embodiments of the present invention can also be applied to an image pickup apparatus without a quick return mirror.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-159788 filed Jul. 21, 2011, which is hereby incorporated by reference herein in its entirety.

What is claimed is:

1. A photographic optical system comprising, in order from an object side to an image side:
   a first lens unit having positive refractive power;
   a second lens unit having negative refractive power configured to move in an optical axis direction to perform focusing;
   a third lens unit having positive or negative refractive power;
   an aperture portion (SP) disposed on the image side as compared with the first lens unit to determine an axial maximum light flux diameter; and
   an optical element (A) in which at least an object-side surface vertex thereof is located within the range of a distance ($d_{sp-A}$) satisfying following condition, where the distance ($d_{sp-A}$) is a distance in the optical axis direction from the aperture portion (SP) to the object-side surface vertex of the optical element (A) and a length on an optical axis from an object-side surface vertex of a lens closest to the object side to an image plane is L, $$0.00 < d_{sp-A}/L < 0.12$$

wherein, when a focal length of the entire photographic optical system is f, an optical power of the entire photographic optical system is $\phi$, a focal length of the first lens unit is $f_1$, a full-aperture F-number when an infinitely distant object is focused is Fno, a length on the optical axis from an object-side surface vertex of a lens closest to the object side in the first lens unit to an image-side surface vertex of a lens closest to the image side in the first lens unit is $d_1$, an optical power of the optical element (A) is $\phi_A$, a d-line-based Abbe number of a material constituting the optical element (A) is $\nu_{dA}$, and a partial dispersion ratio difference of the material constituting the optical element (A) is $\Delta\theta_{gFA}$, following conditions are satisfied:

$$4.0 < f^2/(f_1 \times Fno \times d_1) < 10.0$$

$$-0.10 < \Delta\theta_{gFA} \times \phi_A / (\nu_{dA} \times \phi) < -0.01.$$

2. The photographic optical system according to claim 1, wherein when a partial dispersion ratio of the material constituting the optical element (A) is $\theta_{gFA}$ and an optical characteristic ($A_{\theta 1}$) of the material constituting the optical element (A) is $$A_{\theta 1} = \theta_{gFA} - \theta_{gFB1},$$

where $\theta_{gFB1} = -1 \times 10^{-9} \times \nu_{dA}^4 + 5 \times 10^{-8} \times \nu_{dA}^3 + 7.5 \times 10^{-5} \times \nu_{dA}^2 \times 7 \times 10^{-3} \times \nu_{dA} + 0.721$,
following condition is satisfied:

$$0.0272 < A_{\theta 1} < 0.3000.$$

3. The photographic optical system according to claim 1, wherein, when a partial dispersion ratio of the material constituting the optical element (A) is $\theta_{gFA}$ and an optical characteristic ($A_{\theta 2}$) of the material constituting the optical element (A) is $$A_{\theta 2} = \theta_{gFA} - \theta_{FB2},$$

where $\theta_{gFB2} = -1.67 \times 10^{-7} \times \nu_{dA}^3 + 5.21 \times 10^{-5} \times \nu_{dA}^2 - 5.66 \times 10^{-3} \times \nu_{dA} + 0.7278$,
following condition is satisfied:

$$-0.5000 < A_{\theta 2} < -0.0272.$$

4. The photographic optical system according to claim 1, wherein the Abbe number ($\nu_{dA}$) satisfies following condition:

$$5 < \nu_{dA} < 60.$$

5. The photographic optical system according to claim 1, wherein the optical element (A) includes a diffractive optical element.

6. The photographic optical system according to claim 1, wherein, when a composite focal length of the first lens unit and the second lens unit during focusing on an indefinitely distant object is $f_{12}$, following condition is satisfied:

$$2.0 < f^2/(f_{12} \times L) < 10.0.$$

7. The photographic optical system according to claim 1, wherein a sum of optical powers of positive lenses included in the first lens unit is $\phi_{PSUM}$ and a sum of optical powers of negative lenses included in the first lens unit is $\phi_{NSUM}$, following condition is satisfied:

$$1.4 < \phi_{PSUM}/|\phi_{NSUM}| < 3.0.$$

8. The photographic optical system according to claim 1, further comprising at least one optical element (R) in which at least an object-side surface vertex thereof is located within the range of a distance ($d_{sp-R}$) satisfying following condition, where the distance ($d_{sp-R}$) is a distance in the optical axis direction from the aperture portion (SP) to the object-side surface vertex of the optical element (R) $d_{sp-R}$ and a length on the optical axis from the aperture portion (SP) to the image plane is $d_{sp-img}$, $$0.30 < d_{sp-R}/d_{sp-img} < 1.00,$$

wherein, when an optical power of the optical element (R) is $\phi_R$, a d-line-based Abbe number of a material constituting the optical element (R) is $\phi_R$, and a partial dispersion ratio difference of the material constituting the optical element (R) is $\Delta\theta_{gFR}$, if a plurality of the optical elements (A) is provided, an optical power of an i-th optical element (Ai) when counted from an object side is $\phi_{Ai}$, an Abbe number of a material of the i-th optical element (Ai) is $\nu_{dAi}$, and a partial dispersion ratio difference of the material of the i-th optical element (Ai) is $\Delta\theta_{gFAi}$, and, if a plurality of optical elements (R) is provided, an optical power of a k-th optical element (Rk) when counted from the object side is $\phi_{Rk}$, an Abbe number of a material of the k-th optical element (Rk) is $\nu_{dRk}$, and a partial dispersion ratio difference of the material of the k-th optical element (Rk) is $\Delta\theta_{gFRk}$, following condition is satisfied:

$$1.0 \times 10^{-5} < \sum_{i=1}^{n} \frac{\Delta\theta_{gFAi} \times \phi_{Ai}}{\nu_{dAi} \times \phi} \times \prod_{k=1}^{m} \frac{\Delta\theta_{gFRk} \times \phi_{Rk}}{\nu_{dRk} \times \phi} < 1.0 \times 10^{-3}.$$

9. The photographic optical system according to claim 8, wherein, when a partial dispersion ratio of the material constituting the optical element (R) is $\theta_{gFR}$ and an optical characteristic ($R_{\theta 1}$) of the material constituting the optical element (R) is $$R_{\theta 1} = \theta_{gFR} - \theta_{FBR1},$$

where $\theta_{gFB1} = -1 \times 10^{-9} \times \nu dR^4 5 \times 10^{-8} \times \nu_{dR}^3 + 7.5 \times 10^{-5} \times \nu_{dR}^2 \times 7 \times 10^3 \times \nu_{dR} + 0.721$,
following condition is satisfied:

$$0.0272 < R_{\theta 1} < 0.3000.$$

10. The photographic optical system according to claim 8, wherein, when a partial dispersion ratio of the material constituting the optical element (R) is $\theta_{gFR}$ and an optical characteristic ($R_{\theta2}$) of the material constituting the optical element (R) is $R_{\theta2}=\theta_{gFR}-\theta_{gFBR2}$, where $\theta_{gFBR2}=-1.67\times10^{-7}\times v_{dR}^3+5.21\times10^{-5}\times v_{dR}^2-5.66\times10^{-3}\times v_{dR}+0.7278$, following condition is satisfied:

$-0.5000<R_{\theta2}<-0.0272$.

11. The photographic optical system according to claim 8, wherein following condition is satisfied:

$5<v_{dR}<60$.

12. The photographic optical system according to claim 1, wherein the first lens unit includes, in order from the object side to the image side, a positive lens, a positive lens of meniscus shape having a convex surface facing the object side, and a cemented lens, and wherein, when a radius of curvature of an object-side surface of the positive lens of meniscus shape is RM1, a radius of curvature of an image-side surface of the positive lens of meniscus shape is RM2, and an Abbe number of a material of the positive lens of meniscus shape is $v_M$, following conditions are satisfied:

$0.1<(RM2-RM1)/(RM1+RM2)<0.5$ $15<v_M<30$.

13. The photographic optical system according to claim 1, wherein, when a partial dispersion ratio difference of a material of an i-th lens (Gi) when counted from the object side included in the first lens unit and the second lens unit is $\Delta\theta_{gFGi}$, an Abbe number of the material of the i-th lens (Gi) is $v_{dGi}$, and an optical power of the i-th lens (Gi) is $\phi_{Gi}$, following condition is satisfied:

$$0.005 < \sum_{i=1}^{n} \frac{\Delta\theta_{gFGi} \times \phi_{Gi}}{v_{dGi} \times \phi} < 0.020.$$

14. The photographic optical system according to claim 1, wherein, when a length on the optical axis from the object-side surface vertex of the lens closest to the object side to the aperture portion (SP) is $d_{sp}$, following condition is satisfied:

$4.0<f^2/(d_{sp}\times L)<8.0$.

15. The photographic optical system according to claim 1, wherein the third lens unit includes, in order from the object side to the image side, a stationary first lens subunit, a second lens subunit configured to move to have a component perpendicular to the optical axis to displace an image perpendicularly to the optical axis direction, and a stationary third lens subunit.

16. An image pickup apparatus comprising:

a photographic optical system comprising, in order from an object side to an image side:

a first lens unit having positive refractive power;

a second lens unit having negative refractive power configured to move in an optical axis direction to perform focusing;

a third lens unit having positive or negative refractive power;

an aperture portion (SP) disposed on the image side as compared with the first lens unit to determine an axial maximum light flux diameter; and an optical element (A) in which at least an object-side surface vertex thereof is located within the range of a distance ($d_{sp-A}$) satisfying following condition, where the distance ($d_{sp-A}$) is a distance in the optical axis direction from the aperture portion (SP) to the object-side surface vertex of the optical element (A) and a length on an optical axis from an object-side surface vertex of a lens closest to the object side to an image plane is L, $0.00<d_{sp-A}/L<0.12$ wherein, when a focal length of the entire photographic optical system is f, an optical power of the entire photographic optical system is $\phi$, a focal length of the first lens unit is $f_1$, a full-aperture F-number when an infinitely distant object is focused is Fno, a length on the optical axis from an object-side surface vertex of a lens closest to the object side in the first lens unit to an image-side surface vertex of a lens closest to the image side in the first lens unit is $d_1$, an optical power of the optical element (A) is $\phi_A$, a d-line-based Abbe number of a material constituting the optical element (A) is $v_{dA}$, and a partial dispersion ratio difference of the material constituting the optical element (A) is $\Delta\theta_{gFA}$, following conditions are satisfied:

$4.0<f^2/(f_1\times Fno\times d_1)<10.0$ $-0.10<\Delta\theta_{gFA}\times\phi_A/(v_{dA}\times\phi)<-0.01$; and an image sensor configured to receive an image formed by the photographic optical system.

* * * * *